(12) United States Patent
Kim et al.

(10) Patent No.: US 11,463,023 B2
(45) Date of Patent: Oct. 4, 2022

(54) TRIBOELECTRIC GENERATOR

(71) Applicants: Samsung Electronics Co., Ltd., Suwon-si (KR); UNIST (ULSAN NATIONAL INSTITUTE OF SCIENCE AND TECHNOLOGY), Ulsan (KR)

(72) Inventors: Jae-Young Kim, Suwon-si (KR); Kyungeun Byun, Seongnam-si (KR); Minsu Seol, Suwon-si (KR); Hyeonjin Shin, Suwon-si (KR); Jeongmin Baik, Ulsan (KR); Jinsung Chun, Seoul (KR); Byeonguk Ye, Daegu (KR)

(73) Assignees: Samsung Electronics Co., Ltd., Gyeonggi-do (KR); UNIST (Ulsan National Institute of Science and Technology), Ulsan (KR)

( * ) Notice: Subject to any disclaimer, the term of this patent is extended or adjusted under 35 U.S.C. 154(b) by 0 days.

(21) Appl. No.: 17/097,232

(22) Filed: Nov. 13, 2020

(65) Prior Publication Data
US 2021/0083600 A1 Mar. 18, 2021

Related U.S. Application Data

(63) Continuation of application No. 15/498,897, filed on Apr. 27, 2017, now Pat. No. 10,873,277.

(30) Foreign Application Priority Data

May 10, 2016 (KR) .................. 10-2016-0057136

(51) Int. Cl.
*H02N 2/18* (2006.01)
*H02N 1/04* (2006.01)

(52) U.S. Cl.
CPC .............. *H02N 2/18* (2013.01); *H02N 1/04* (2013.01)

(58) Field of Classification Search
CPC ................................ H02N 2/18; H02N 1/04
(Continued)

(56) References Cited

U.S. PATENT DOCUMENTS

| 7,578,580 B2 | 8/2009 | Ito et al. |
| 8,519,596 B1 | 8/2013 | Kim et al. |

(Continued)

FOREIGN PATENT DOCUMENTS

| CN | 103023371 A | 4/2013 |
| CN | 103684035 A | 3/2014 |

(Continued)

OTHER PUBLICATIONS

Yang, et al. "Single-Electrode-Based Sliding Triboelectric Nanogenerator for Self-Powered Displacement Vector Sensor System," ACS Nano, vol. 7, No. 8, pp. 7342-7351 (2013).

(Continued)

*Primary Examiner* — Ahmed Elnakib
(74) *Attorney, Agent, or Firm* — Harness, Dickey & Pierce, P.L.C.

(57) ABSTRACT

A triboelectric generator includes first and second electrodes spaced apart from each other, a first charging object on a surface of the first electrode facing the second electrode, a second charging object provided between the first charging object and the second electrode, and a grounding unit configured to intermittently interconnect the second charging object and a charge reservoir due to motion of the second charging object. The first charging object is configured to be positively charged due to contact. The second charging object is configured to be negatively charged due to contact.

16 Claims, 48 Drawing Sheets

(58) Field of Classification Search
USPC .................................................. 310/309, 310
See application file for complete search history.

(56) References Cited

U.S. PATENT DOCUMENTS

| | | | |
|---|---|---|---|
| 9,178,446 | B2 | 11/2015 | Wang et al. |
| 9,812,993 | B2 | 11/2017 | Wang et al. |
| 2002/0047492 | A1 | 4/2002 | Jones |
| 2004/0211250 | A1* | 10/2004 | Adamson ................. H02N 2/18 73/146 |
| 2009/0061663 | A1 | 3/2009 | Chang |
| 2013/0049531 | A1 | 2/2013 | Wang et al. |
| 2013/0057110 | A1 | 3/2013 | Aoyagi et al. |
| 2014/0084748 | A1 | 3/2014 | Wang et al. |
| 2014/0246950 | A1 | 9/2014 | Wang et al. |
| 2014/0246951 | A1 | 9/2014 | Wang et al. |
| 2015/0097465 | A1 | 4/2015 | Karagozler et al. |
| 2015/0311823 | A1 | 10/2015 | Wang et al. |
| 2015/0372620 | A1 | 12/2015 | Zhang et al. |
| 2016/0028327 | A1 | 1/2016 | Aliane |
| 2016/0076621 | A1 | 3/2016 | Green |
| 2016/0105538 | A1 | 4/2016 | Olah et al. |
| 2016/0149518 | A1 | 5/2016 | Wang et al. |
| 2016/0218640 | A1 | 7/2016 | Wang et al. |
| 2017/0063256 | A1 | 3/2017 | Wu et al. |
| 2017/0317611 | A1 | 11/2017 | Baik et al. |
| 2017/0331396 | A1 | 11/2017 | Byun et al. |
| 2017/0331397 | A1 | 11/2017 | Kim et al. |
| 2018/0013358 | A1 | 1/2018 | Turng et al. |

FOREIGN PATENT DOCUMENTS

| | | | |
|---|---|---|---|
| CN | 103780132 | A | 5/2014 |
| CN | 105099260 | * | 11/2015 |
| CN | 105099260 | A | 11/2015 |
| CN | 105337526 | A | 2/2016 |
| JP | 2017219420 | A | 12/2017 |
| KR | 10-1743674 | B1 | 5/2017 |
| WO | WO-2014082561 | A1 | 6/2014 |
| WO | WO-2015003497 | A1 | 1/2015 |
| WO | WO-2016076621 | A2 | 5/2016 |

OTHER PUBLICATIONS

Huang, et al. "Enhanced Power Output of a Triboelectric Nanogenerator Composed of Electrospun Nanofiber Mats Doped with Graphene Oxide," Scientific Reports, pp. 1-8, (2015).

Bhavanasi, et al. "Enhanced Piezoelectric Energy Harvesting Performance of Flexible PVDF-TrFE Bilayer Films with Graphene Oxide," ACS Applied Materials & Interfaces, vol. 8, pp. 521-529 (2016).

Wang, et al. "Freestanding Triboelectric-Layer-Based Nanogenerators for Harvesting Energy from a Moving Object or Human Motion in Contact and Non-contact Modes," Advanced Materials, vol. 26, pp. 2818-2824 (2014).

Wang, et al. "Sliding-Triboelectric Nanogenerators Based on In-Plane Charge-Separation Mechanism," Nano Letters, vol. 13, pp. 2226-2233 (2013).

Zhu, et al. "Radial-arrayed rotary electrification for high performance triboelectric generator," Nature Communications, pp. 1-9, (2014).

Extended European Search Report dated Oct. 19, 2017 issued in corresponding European Application No. 17168266.9.

Extended European Search Report issued Oct. 19, 2017 for European Application No. 17170444.8.

Guo, et al. "A Water-Proof Triboelectric-Electromagnetic Hybrid Generator for Energy Harvesting in Harsh Environments," Advanced Energy Materials, 1501593, pp. 1-7 (2015).

Guo, et al. "Spiral-interdigital-electrode-based multifunctional device: Dual-functional triboelectric generator and duel-functional self-powered sensor," Nano Energy, vol. 12, pp. 626-635 (2015).

Zhu, et al. "Toward Large-Scale Energy Harvesting by a Nanoparticle-Enhanced Triboelectric Nanogenerator," Nano Letters, vol. 13, pp. 847-853 (2013).

Zhu, et al. "A Shape-Adaptive Thin-Film-Based Approach for 50% High-Efficiency Energy Generation Through Micro-Grating Sliding Electrification," Advanced Materials, vol. 26, pp. 3788-3796 (2014).

Office Action dated Oct. 25, 2019, issued in corresponding Chinese Patent Application No. 201710303449.9.

Office Action dated Jan. 24, 2020, issued in co-pending U.S. Appl. No. 15/589,091.

Y. Zi et al., 'Effective energy storage from a triboelectric nanogenerator' *Nature Communications*, 7:109987, Mar. 2016.

G.Cheng et al. 'Pulsed Nanogenerator with Huge Instantaneous Output Power Density' *ACS Nano*, vol. 7, No. 8, 2013, pp. 7383-7391.

Notice of Allowance dated Apr. 30, 2020, issued in corresponding U.S. Appl. No. 15/589,091.

* cited by examiner

TRIBOELECTRIC GENERATOR

CROSS-REFERENCE TO RELATED APPLICATION

This application is a continuation of U.S. application Ser. No. 15/498,897, filed on Apr. 27, 2017, which claims priority under 35 U.S.C. § 119 to Korean Patent Application No. 10-2016-0057136, filed on May 10, 2016, in the Korean Intellectual Property Office, the disclosure of each of which is incorporated herein in its entirety by reference.

BACKGROUND

1. Field

The present disclosure relates to triboelectric generators, and more particularly, to triboelectric generators having grounding structures.

2. Description of Related Art

Energy harvesting technology is currently prominent all over the world. Energy harvesting devices are new environment-friendly energy generating devices configured to (or capable of) transforming mechanical energy generated from wind or vibration in nature, motion of people, or the like into electrical energy.

A triboelectric generator is an energy harvesting device for generating electrical energy by using charge transfer occurring due to friction between two charging objects. The triboelectric generator has a high energy transformation efficiency and thus may have a high output by using a small external force. In addition, the triboelectric generator does not have temporal and spatial restrictions compared to energy harvesting devices using heat or sunlight, and may continuously generate electrical energy compared to energy harvesting devices that use a piezoelectric material to generate electrical energy based on transformation of the piezoelectric material.

SUMMARY

Provided are triboelectric generators having grounding structures.

Additional aspects will be set forth in part in the description which follows and, in part, will be apparent from the description, or may be learned by practice of example embodiments.

According to some example embodiments of inventive concepts, a triboelectric generator includes first and second electrodes spaced apart from each other, a first charging object and a second charging object, and a grounding unit. The first charging object may be on a surface of the first electrode facing the second electrode and may be configured to be positively charged due to contact with a second charging object. The second charging object may be between the first charging object and the second electrode and the second charging object may be configured to be negatively charged due to contact with the first charging object. The grounding unit may be configured to intermittently interconnect the second charging object and a charge reservoir due to motion of the second charging object.

In example embodiments, the first charging object may contact the surface of the first electrode, and the second charging object may be spaced apart from the first charging object and the second electrode.

In example embodiments, the first and second charging objects may be configured to contact each other in response to a first force being applied to one of the first and second electrodes, and the second charging object and the second electrode may be configured to contact each other in response to a second force being applied to one of the first and second electrodes.

In example embodiments, the second charging object may be electrically connected via the grounding unit to the charge reservoir in response to the second charging object moving toward the second electrode.

In example embodiments, the triboelectric generator may further include first elastic supporters between the first and second charging objects, and second elastic supporters may be between the second charging object and the second electrode.

In example embodiments, each of the first elastic supporters may have a modulus of elasticity less than a modulus of elasticity of each of the second elastic supporters.

In example embodiments, the first charging object may include at least one of polyformaldehyde, ethylcellulose, polyamide, melamine formol, wool, silk, mica, and nylon.

In example embodiments, the second charging object may include a conductive material.

In example embodiments, the second charging object may include at least one of aluminum (Al), copper (Cu), silver (Ag), gold (Au), and steel.

In example embodiments, at least one of the first and second charging objects may be doped with a dopant to control charge characteristics thereof.

In example embodiments, at least one of a contact surface of the first charging object and a contact surface of the second charging object may include a plurality of protrusions.

In example embodiments, each of the first and second electrodes may include at least one of graphene, carbon nanotubes (CNT), indium tin oxide (ITO), metal, and conductive polymer.

In example embodiments, the first and second electrodes may be on first and second substrates, respectively.

In example embodiments, each of the first and second substrates may include one of a hard material and a flexible material.

In example embodiments, the grounding unit may include a conductive member and an elastic member. The conductive member may be provided between the second charging object and the second electrode, and may be configured to intermittently contact the second charging object. The elastic member may be configured to elastically support the conductive member.

In example embodiments, the grounding unit may include a switching device configured to intermittently interconnect the second charging object and the charge reservoir.

In example embodiments, the grounding unit may include a conductive member and an insulating member. The conductive member may be configured to electrically connect the second charging object and the charge reservoir to each other. The insulating member may be configured to insulate the second charging object and the charge reservoir from each other.

In example embodiments, the charge reservoir may include ground or a conductive member.

In example embodiments, the conductive member may include a metal film.

According to some example embodiments of inventive concepts, a triboelectric generator may include a first substrate and a second substrate spaced apart from each other, a first electrode and a second electrode spaced apart from each other between the first substrate and the second substrate, a first charging object and a second charging object between the first electrode and the second electrode, a supporting structure, and a grounding unit configured to intermittently connect the second charging object and a charge reservoir due in response to motion of the second charging object towards the grounding unit. The first electrode may be connected to the first substrate. The second electrode may be connected to the second substrate. The first charging object may be connected to the first electrode. The first charging object and the second charging object may face each other. The first charging object and the second charging object may be configured to be charged a first type and a second type, respectively, in response to the first charging object and the second charging object contacting each other. The first type may be opposite the second type.

In example embodiments, the first charging object may include at least one of polyformaldehyde, ethylcellulose, polyamide, melamine formol, wool, silk, mica, and nylon. The second charging object may include at least one of aluminum (Al), copper (Cu), silver (Ag), gold (Au), and steel.

In example embodiments, the triboelectric generator may further include a supporting structure. The supporting structure may couple the second charging object to one of the first substrate, the first charging object, and the second substrate.

In example embodiments, the grounding unit may include a switching device configured to intermittently interconnect the second charging object and the charge reservoir.

In example embodiments, the grounding unit may include a conductive member and an insulating member. The conductive member may be configured to electrically connect the second charging object and the charge reservoir to each other. The insulating member may be configured to insulate the second charging object and the charge reservoir from each other.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
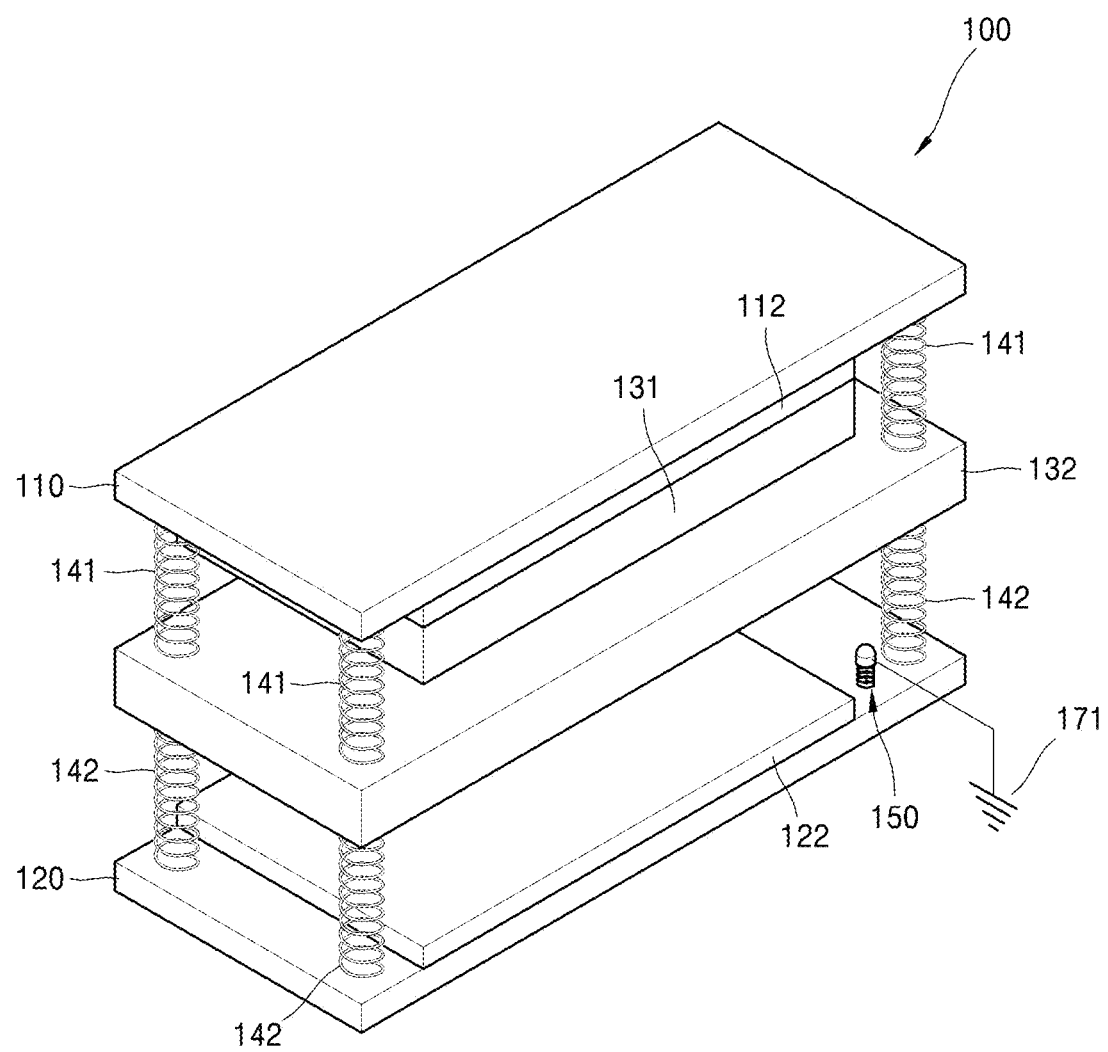
FIG. 1 is a perspective view of a triboelectric generator according to some example embodiments.

Reference will now be made in detail to example embodiments illustrated in the accompanying drawings, wherein like reference numerals refer to like elements throughout. In this regard, example embodiments should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Figure 2:
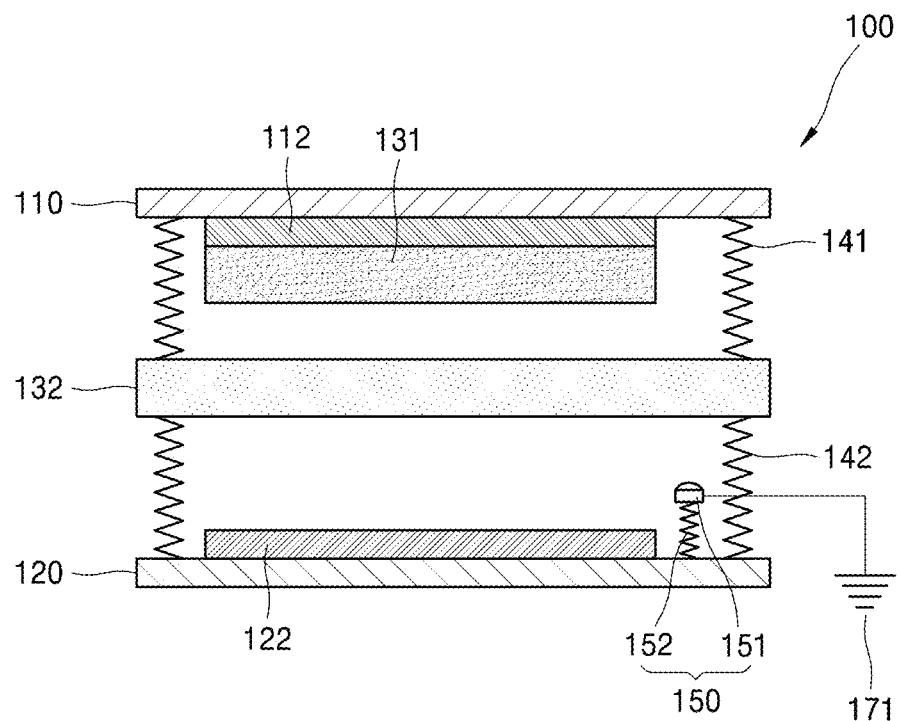
FIG. 2 is a cross-sectional view of the triboelectric generator illustrated in FIG. 1.

FIG. 1 is a perspective view of a triboelectric generator 100 according to some example embodiments. FIG. 2 is a cross-sectional view of the triboelectric generator 100 illustrated in FIG. 1.

Referring to FIGS. 1 and 2, the triboelectric generator 100 includes first and second electrodes 112 and 122, a first charging object 131 provided on a surface of the first electrode 112, a second charging object 132 provided between the first charging object 131 and the second electrode 122, and a grounding unit 150 configured to intermittently interconnect the second charging object 132 and a charge reservoir 171.

First and second substrates 110 and 120 are spaced apart from each other by a certain distance. For example, the first substrate 110 may be an upper substrate, and the second substrate 120 may be a lower substrate. Each of the first and second substrates 110 and 120 may have a flat structure, but is not limited thereto.

Each of the first and second substrates 110 and 120 may include a hard material, e.g., a silicon wafer or glass. However, each of the first and second substrates 110 and 120 is not limited thereto and may include a variety of materials. For example, each of the first and second substrates 110 and 120 may include a flexible material such as polyester (PE), polyethersulfone (PES), polyethylene naphthalate (PEN), or Kapton.

The first electrode 112 is provided on a bottom surface of the first substrate 110, and the second electrode 122 is provided on a top surface of the second substrate 120. Each of the first and second electrodes 112 and 122 may include a material having an excellent electrical conductivity. For example, each of the first and second electrodes 112 and 122 may include at least one of graphene, carbon nanotubes (CNT), indium tin oxide (ITO), metal, and conductive polymer. Herein, the metal may include at least one of, for example, silver (Ag), aluminum (Al), copper (Cu), gold (Au), nickel (Ni), chromium (Cr), and platinum (Pt), but is not limited thereto. Each of the first and second electrodes 112 and 122 may have a monolayer structure or a multilayer structure.

The first charging object 131 is provided on a bottom surface of the first electrode 112 facing the second electrode 122, and may be a positively charged object. Herein, the first charging object 131 is provided to contact the bottom surface of the first electrode 112. The first charging object 131 is positively charged due to contact with the second charging object 132, and may include a material having a lower electrical conductivity compared to the second charging object 132. For example, the first charging object 131 may include a dielectric material or an insulating material such as polyformaldehyde, ethylcellulose, polyamide, melamine formol, wool, silk, mica, or nylon. However, the first charging object 131 is not limited thereto and may include a variety of materials configured to (or capable of) being positively charged due to contact with the second charging object 132.

The second charging object 132 is provided between the first charging object 131 and the second electrode 122, and may be a negatively charged object. Herein, the second charging object 132 may be provided to be spaced apart from the first charging object 131 and the second electrode 122 when no external force is applied to the triboelectric generator 100.

The second charging object 132 is negatively charged due to contact with the first charging object 131, and may include a conductive material having a higher electrical conductivity compared to the first charging object 131 in order to facilitate charge transfer between the second charging object 132 and the charge reservoir 171 as will be described below. The second charging object 132 may include a metallic material such as Al, Cu, Ag, Au, or steel. However, the second charging object 132 is not limited thereto and may include a variety of conductive materials configured to (or capable of) being negatively charged due to contact with the first charging object 131.

For example, the first and second charging objects 131 and 132 may be made of nylon and Al, or mica and Au, respectively. However, the above-mentioned combinations of materials are merely examples and the first and second charging objects 131 and 132 may be made of various combinations of materials.

At least one of the first and second charging objects 131 and 132 may be doped with a p-type dopant or an n-type dopant to control surface charge characteristics thereof. A source of the p-type dopant may include, for example, an ionic liquid such as $NO_2BF_4$, $NOBF_4$, or $NO_2SbF_6$, an acidic compound such as HCl, $H_3PO_4$, $CH_3COOH$, $H_2SO_4$, or $HNO_3$, or an organic compound such as dichlorodicyanoquinone (DDQ), Oxone, dimyristoylphosphatidylinositol (DMPI), or trifluoromethanesulfonimide. Otherwise, the source of the p-type dopant may include $HPtCl_4$, $AuCl_3$, $HAuCl_4$, silver trifluoromethanesulfonate (AgOTf), $AgNO_3$, $H_2PdCl_6$, $Pd(OAc)_2$, or $Cu(CN)_2$.

A source of the n-type dopant may include, for example, a reduction product of a substituted or unsubstituted nicotinamide, a reduction product of a compound which is chemically bound to a substituted or unsubstituted nicotinamide, or a compound comprising at least two pyridinium moieties in which a nitrogen atom of at least one of the pyridinium moieties is reduced. For example, the source of the n-type dopant may include nicotinamide mononucleotide-H (NMNH), nicotinamide adenine dinucleotide-H (NADH), nicotinamide adenine dinucleotide phosphate-H (NADPH), or viologen. Otherwise, the source of the n-type dopant may include polymer such as polyethylenimine (PEI). Alternatively, the n-type dopant may include alkali metal such as potassium (K) or lithium (Li). The above-mentioned materials of the p-type and n-type dopants are merely examples, and a variety of other materials may be used as the dopants.

The grounding unit 150 is provided to intermittently contact the second charging object 132 due to motion of the second charging object 132. The grounding unit 150 is electrically connected to the charge reservoir 171. Herein, the charge reservoir 171 may be, for example, the ground. Accordingly, the grounding unit 150 may intermittently interconnect the second charging object 132 and the charge reservoir 171 due to motion of the second charging object 132.

The grounding unit 150 may be provided between the second charging object 132 and the second substrate 120 to be intermittently connected to the second charging object 132 due to motion of the second charging object 132. In this regard, the grounding unit 150 may include a conductive member 151 configured to intermittently contact the second charging object 132 due to motion of the second charging object 132, and an elastic member 152 configured to elastically support motion of the conductive member 151. Herein, the conductive member 151 is electrically connected to the charge reservoir 171. The grounding unit 150 may be provided on the second substrate 120 serving as a lower substrate, but is not limited thereto.

In the above-described configuration of the grounding unit 150, when the second charging object 132 moves toward the second electrode 122 and contacts the conductive member 151 of the grounding unit 150, the second charging object 132 may be electrically connected to the charge reservoir 171. As such, electrons in the second charging object 132 may move through the grounding unit 150 to the charge reservoir 171, or electrons in the charge reservoir 171 may move through the grounding unit 150 to the second charging object 132. Otherwise, when the second charging object 132 moves away from the second electrode 122 and is separated from the conductive member 151 of the grounding unit 150, the second charging object 132 may be insulated from the charge reservoir 171.

One or more first elastic supporters 141 may be provided between the first substrate 110 and the second charging object 132, and one or more second elastic supporters 142 may be provided between the second charging object 132 and the second substrate 120. Herein, the first and second elastic supporters 141 and 142 may include, for example, first and second springs, respectively. However, the first and second elastic supporters 141 and 142 are not limited thereto and may include a variety of other elastic members. FIG. 1 illustrates an example in which four first springs are provided between the first substrate 110 and the second charging object 132 at corners thereof, and four second springs are provided between the second charging object 132 and the second substrate 120 at corners thereof.

Each of the first elastic supporters 141 may have a modulus of elasticity less than that of each of the second elastic supporters 142. For example, when the first and second elastic supporters 141 and 142 are implemented as first and second springs, respectively, the first springs may have a spring constant less than that of the second springs. As such, when the first substrate 110 is pressed, the distance between the first substrate 110 and the second charging object 132 is reduced and then the distance between the second charging object 132 and the second substrate 120 is reduced. Subsequently, the first and second charging objects 131 and 132 contact each other and then the second charging object 132 sequentially contact the conductive member 151 of the grounding unit 150 and the second electrode 122.

A description is now given of an operating mechanism of the triboelectric generator 100 illustrated in FIGS. 1 and 2.

FIGS. 3A to 3H are cross-sectional views for describing a first cycle operating mechanism of the triboelectric generator 100.

Figure 3A:
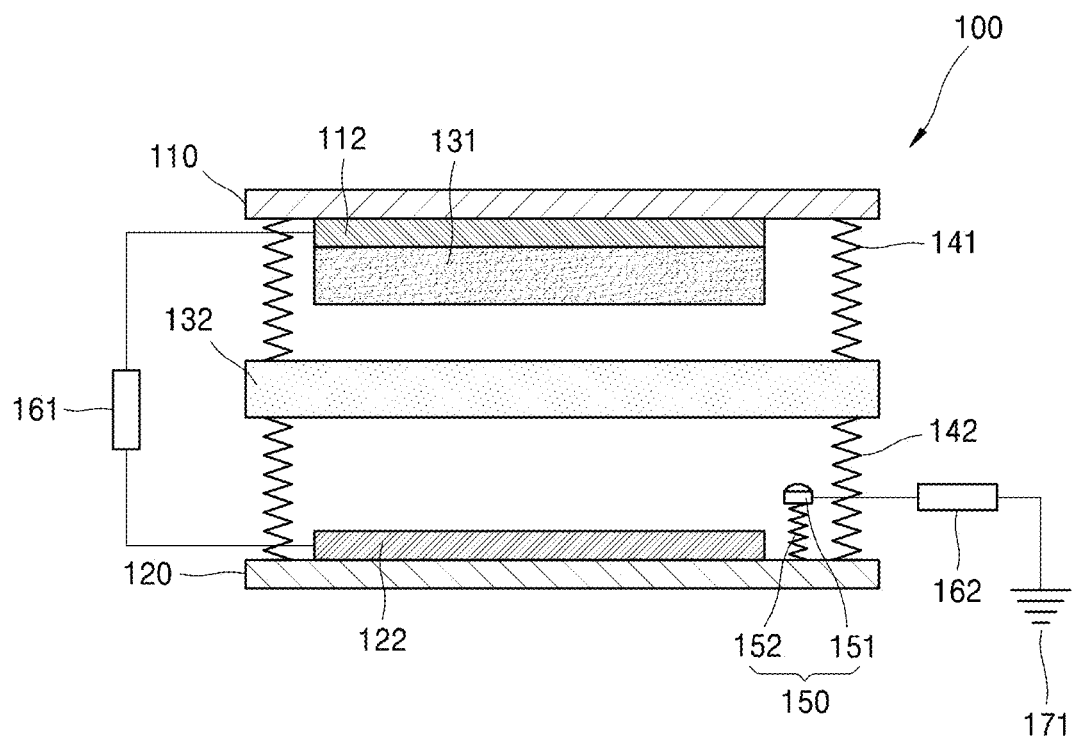
FIGS. 3A to 3H are cross-sectional views for describing a first cycle operating mechanism of the triboelectric generator illustrated in FIG. 1.

FIG. 3A illustrates a state when no external force is applied to the triboelectric generator 100. In FIG. 3A, reference numeral 161 denotes a first load for detecting the flow of electrons between the first and second electrodes 112 and 122, and reference numeral 162 denotes a second load for detecting the flow of electrons between the grounding unit 150 and the charge reservoir 171.

Figure 3B:
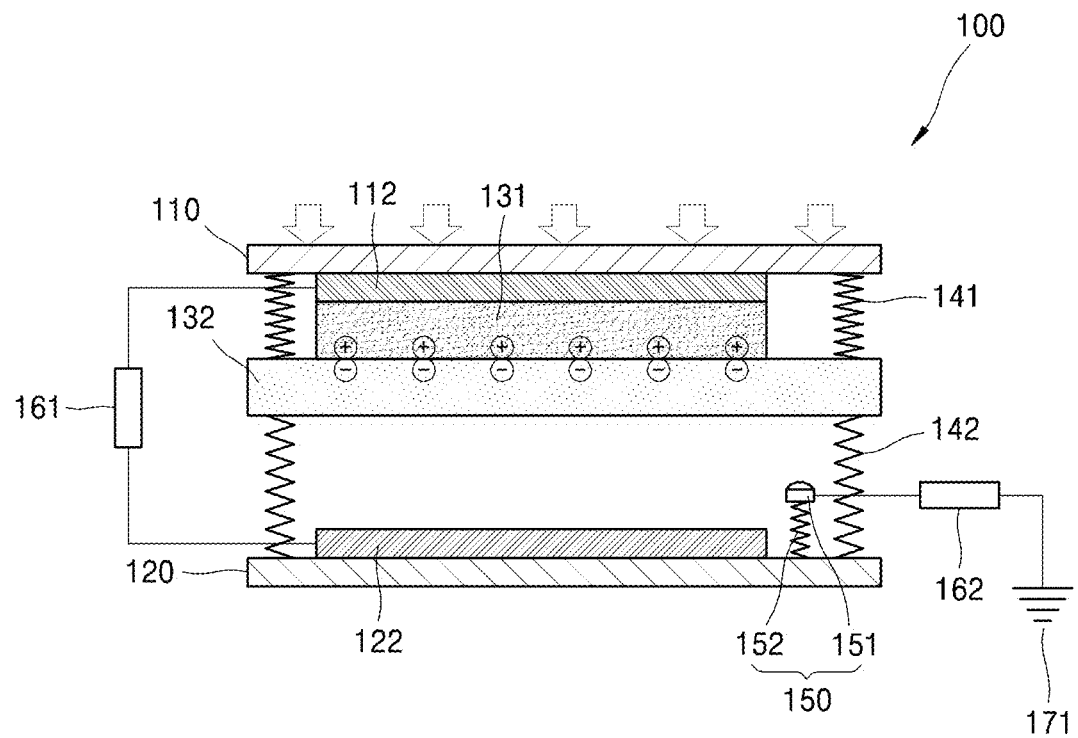
Figure 3C:
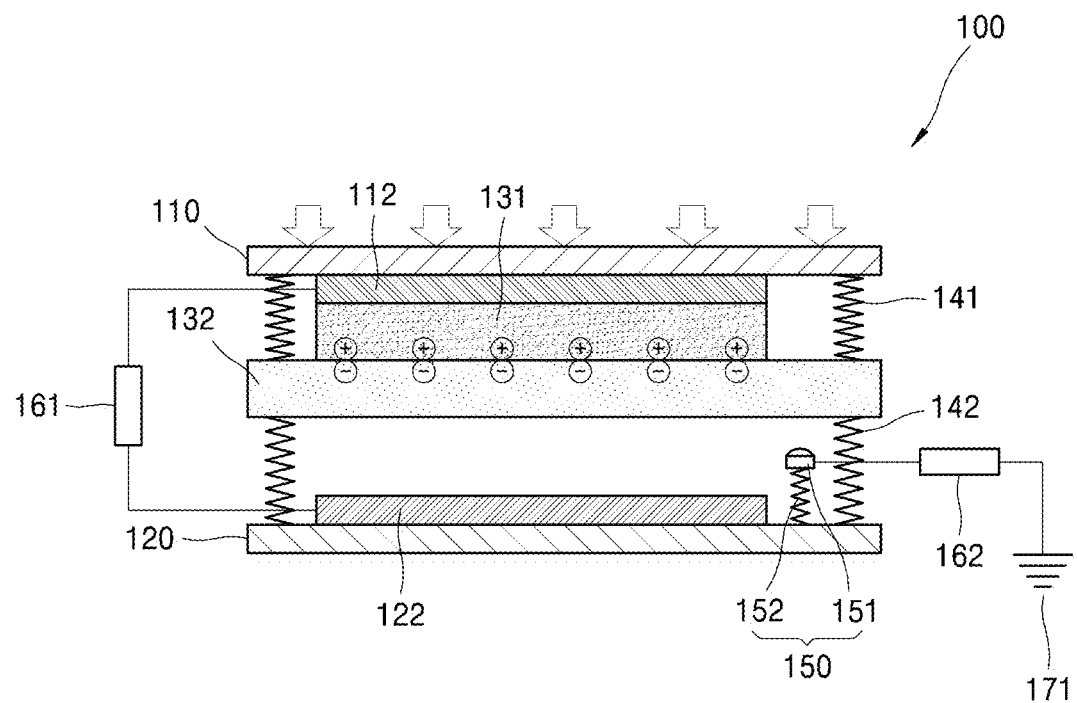

FIG. 3B illustrates a state in which the first and second charging objects 131 and 132 contact each other. Referring to FIG. 3B, since each of the first elastic supporters 141 has a modulus of elasticity less than that of each of the second elastic supporters 142 as described above, when a pressing force is applied to the first substrate 110, initially, the distance between the first substrate 110 and the second charging object 132 is reduced and thus the first and second charging objects 131 and 132 contact each other. Herein, as described above, the first and second charging objects 131 and 132 are positively and negatively charged objects, respectively. Accordingly, when the first and second charging objects 131 and 132 contact each other, a contact surface of the first charging object 131 may be positively charged, and a contact surface of the second charging object 132 may be negatively charged. Subsequently, when the pressing force is continuously applied to the first substrate 110, as illustrated in FIG. 3C, the second charging object 132 moves toward the second electrode 122 while the first and second charging objects 131 and 132 contact each other.

Figure 3D:
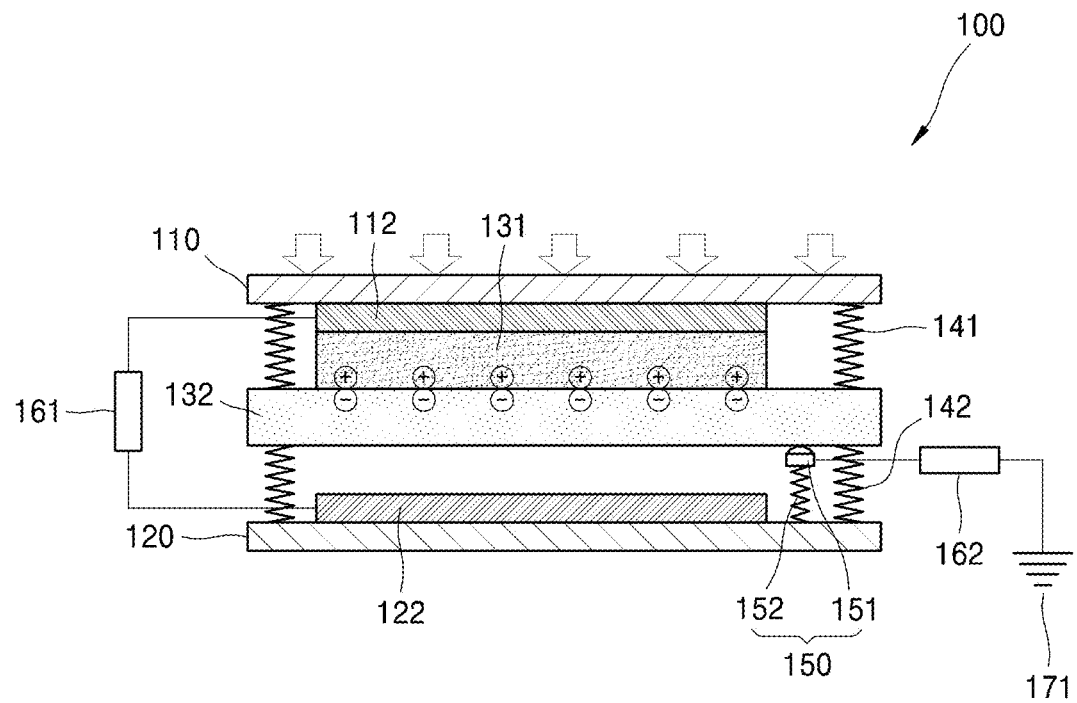

FIG. 3D illustrates a state in which the second charging object 132 contacts the grounding unit 150 while the first and second charging objects 131 and 132 contact each other. Referring to FIG. 3D, when the pressing force is continuously applied to the first substrate 110 while the first and second charging objects 131 and 132 contact each other, the second charging object 132 contacts the conductive member 151 of the grounding unit 150. Herein, the conductive member 151 is electrically connected to the charge reservoir 171, e.g., the ground. In this state, since the first and second charging objects 131 and 132 achieve charge equilibration therebetween, charge transfer does not occur between the second charging object 132 and the charge reservoir 171.

Figure 3E:
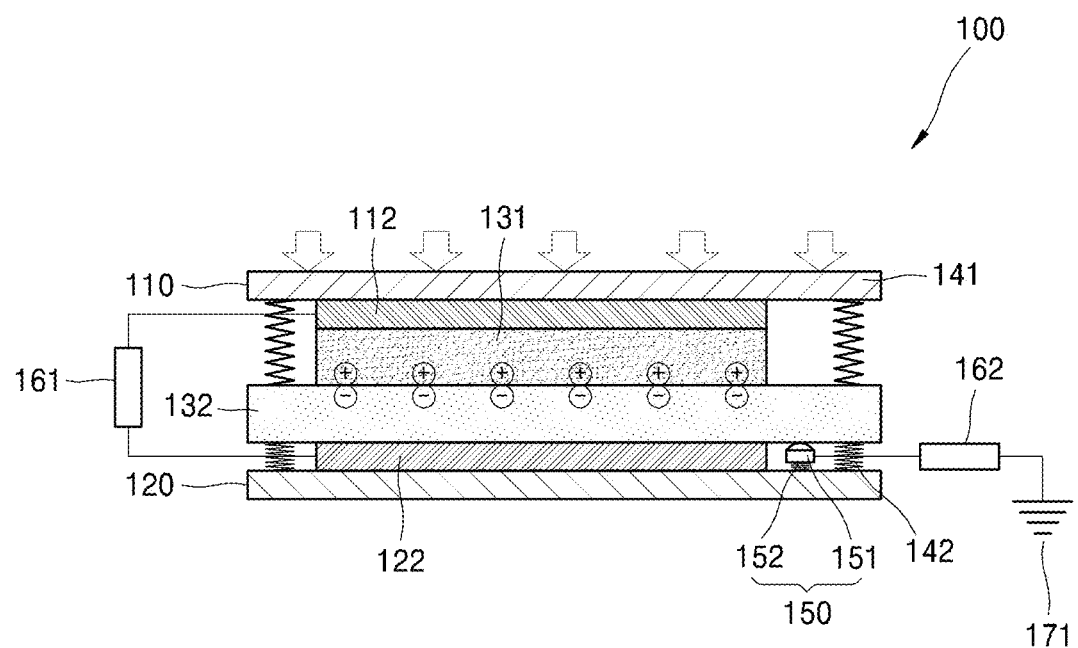

FIG. 3E illustrates a state in which the second charging object 132 contacts the second electrode 122 while the first and second charging objects 131 and 132 contact each other. Referring to FIG. 3E, when the pressing force is continuously applied to the first substrate 110 while the second charging object 132 contacts the conductive member 151 of the grounding unit 150, the second charging object 132 contacts the second electrode 122. Herein, the second charging object 132 constantly contacts the conductive member 151 of the grounding unit 150. In this state, although the first and second charging objects 131 and 132 contact each other and the second charging object 132 contacts the second electrode 122 and the conductive member 151 of the grounding unit 150, since charge equilibration is achieved, charge transfer does not occur between the second charging object 132 and the charge reservoir 171.

Figure 3F:
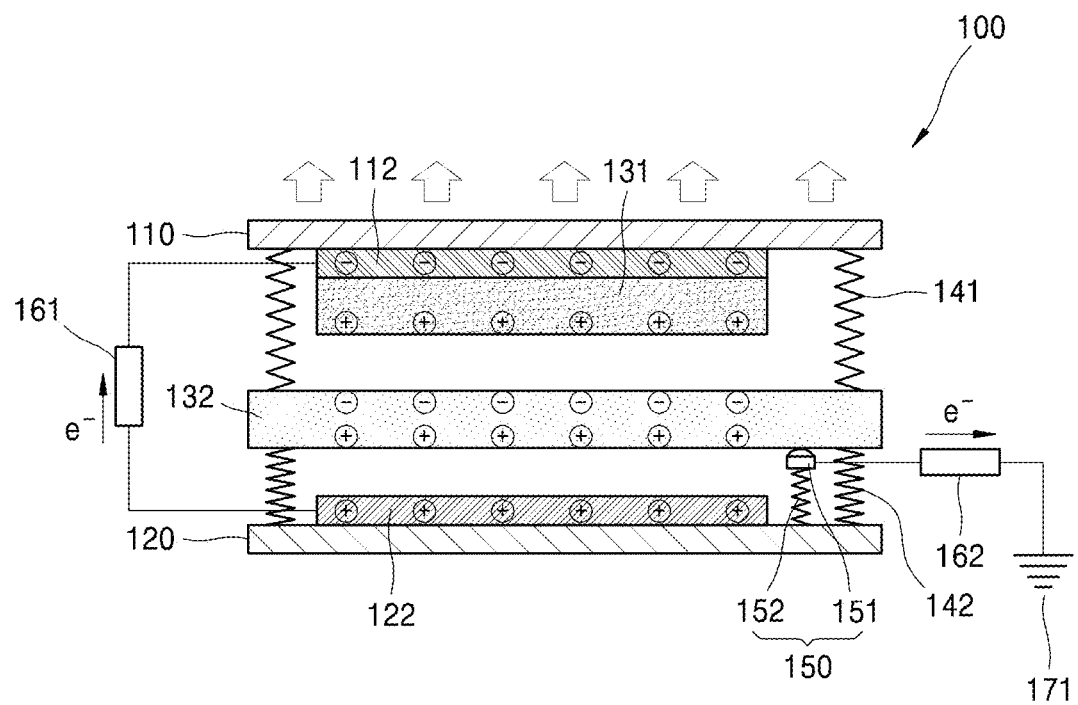

FIG. 3F illustrates a state in which the second charging object 132 and the second electrode 122 are separated from each other and the first and second charging objects 131 and 132 are separated from each other. Referring to FIG. 3F, when the force applied to the first substrate 110 is released, the second charging object 132 is separated from the second electrode 122, and the first charging object 131 is separated from the second charging object 132. Herein, the second charging object 132 constantly contacts the conductive member 151 of the grounding unit 150. In this state, electrons move from the second charging object 132, which is a negatively charged object, to the charge reservoir 171 to achieve charge equilibration in the second charging object 132, and thus a current flows through the second load 162. In addition, positive charges in a surface of the first charging object 131, which is a positively charged object, induce negative charges in the first electrode 112, which is an upper electrode. As such, electrons move from the second electrode 122 to the first electrode 112 and thus a current flows through the first load 161.

Figure 3G:
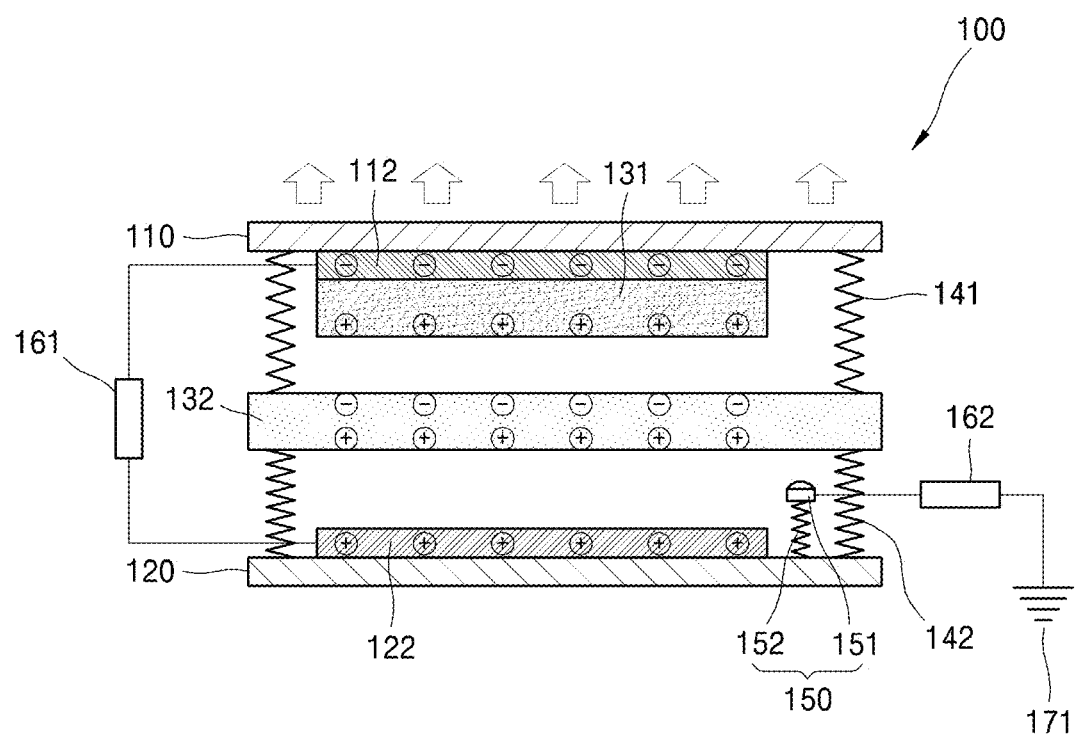
Figure 3H:
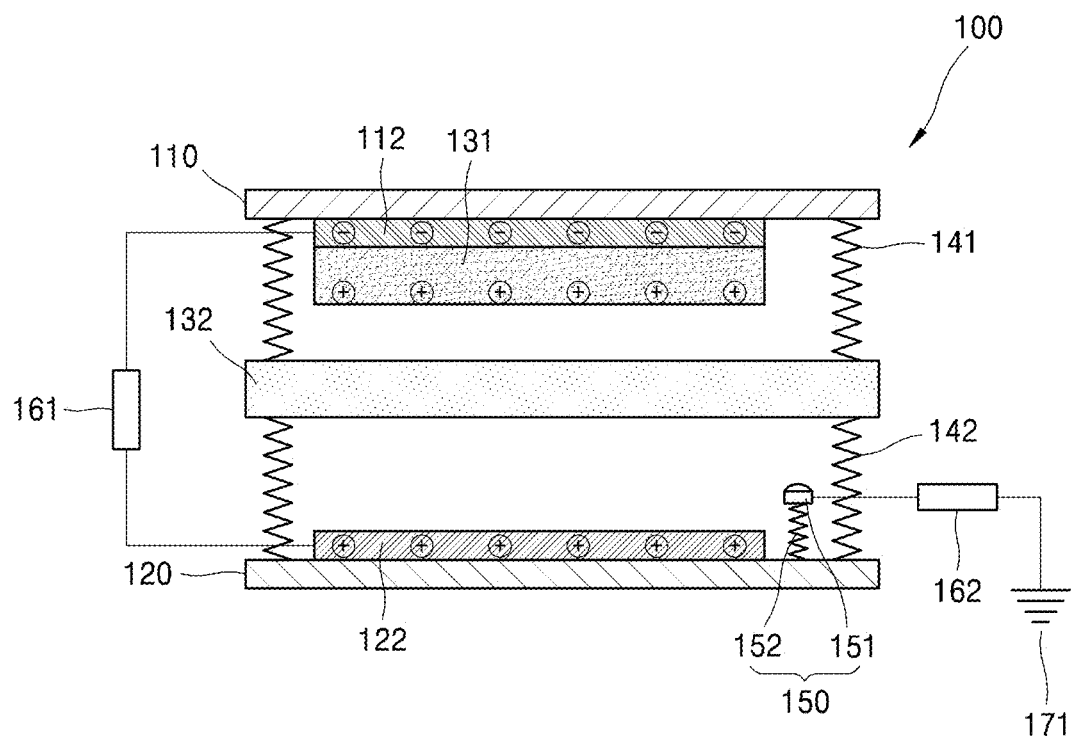

When the force applied to the first substrate 110 is continuously released, the second charging object 132 is separated from the conductive member 151 of the grounding unit 150 as illustrated in FIG. 3G, and then the triboelectric generator 100 returns to an initial state thereof as illustrated in FIG. 3H. In the state of FIG. 3H, the first and second electrodes 112 and 122 are maintained in negatively and positively charged states, respectively, and the first charging object 131 is maintained in a positively charged state. Positive and negative charges in the second charging object 132 move an thus the second charging object 132 is maintained in a neutral state.

FIGS. 4A to 4H are cross-sectional views for describing a second cycle operating mechanism of the triboelectric generator 100.

Figure 4A:
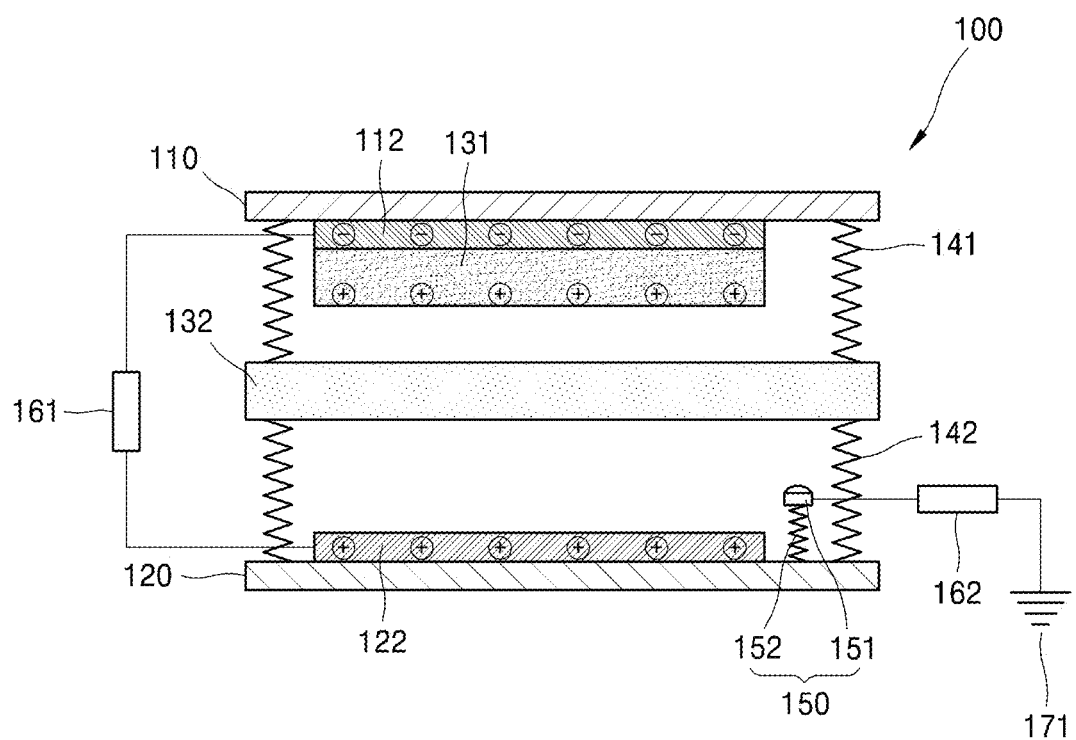
FIGS. 4A to 4H are cross-sectional views for describing a second cycle operating mechanism of the triboelectric generator illustrated in FIG. 1.

FIG. 4A illustrates the same state as FIG. 3H, in which the first and second electrodes 112 and 122 are maintained in negatively and positively charged states, respectively, the first charging object 131 is maintained in a positively charged state, and the second charging object 132 is maintained in a neutral state.

Figure 4B:
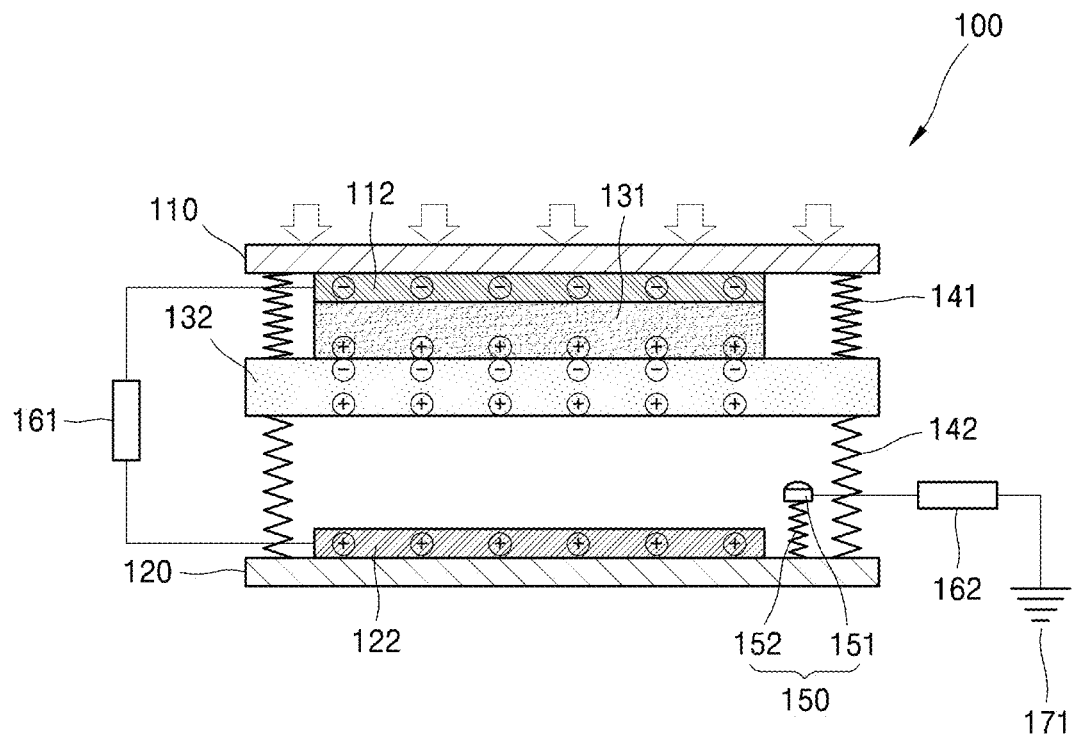

FIG. 4B illustrates a state in which the first and second charging objects 131 and 132 contact each other. Referring to FIG. 4B, when a pressing force is applied to the first substrate 110, initially, the distance between the first substrate 110 and the second charging object 132 is reduced and thus the first and second charging objects 131 and 132 contact each other. When the positively charged first charging object 131 contacts the second charging object 132 including a conductive material as described above, a contact surface (e.g., a top surface) of the second charging object 132 is negatively charged, and a surface (e.g., a bottom surface) opposite to the contact surface of the second charging object 132 is positively charged.

Figure 4C:
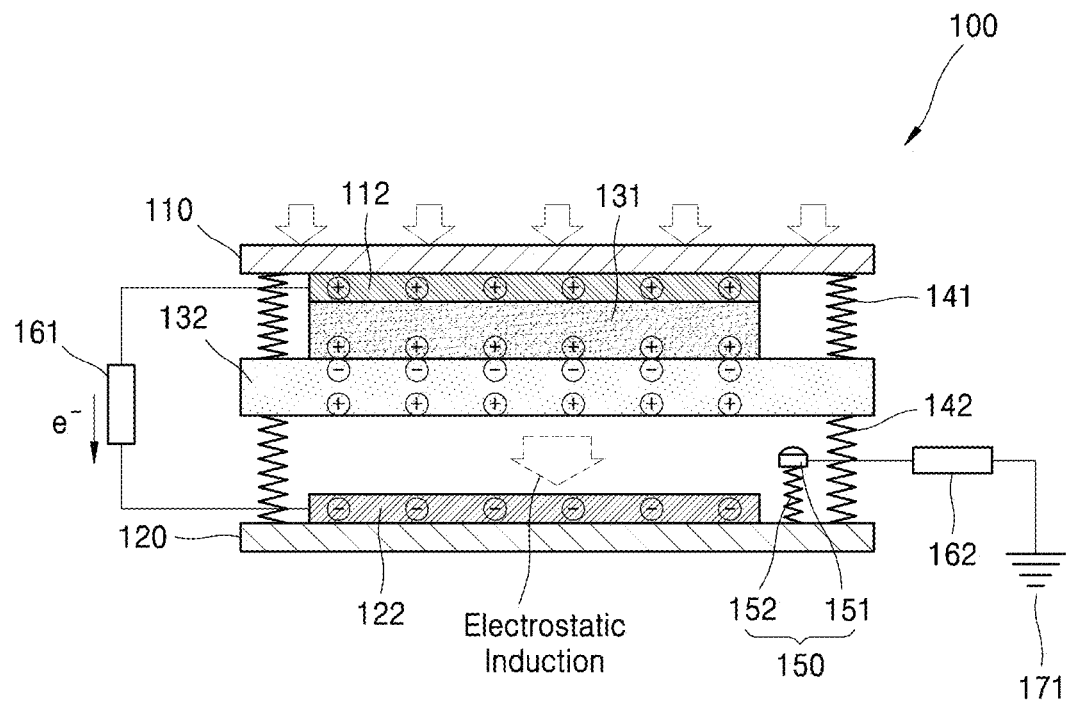

FIG. 4C illustrates a state in which electrostatic induction occurs between the second charging object 132 and the second electrode 122. Referring to FIG. 4C, when the pressing force is continuously applied to the first substrate 110, the second charging object 132 approaches the second electrode 122 while the first and second charging objects 131 and 132 contact each other. In the above-described state in which the second charging object 132 and the second electrode 122 are close to each other, positive charges in the bottom surface of the second charging object 132 induce negative charges in the second electrode 122 due to electrostatic induction. As such, electrons move from the first electrode 112 to the second electrode 122 and thus a current flows through the first load 161.

Figure 4D:
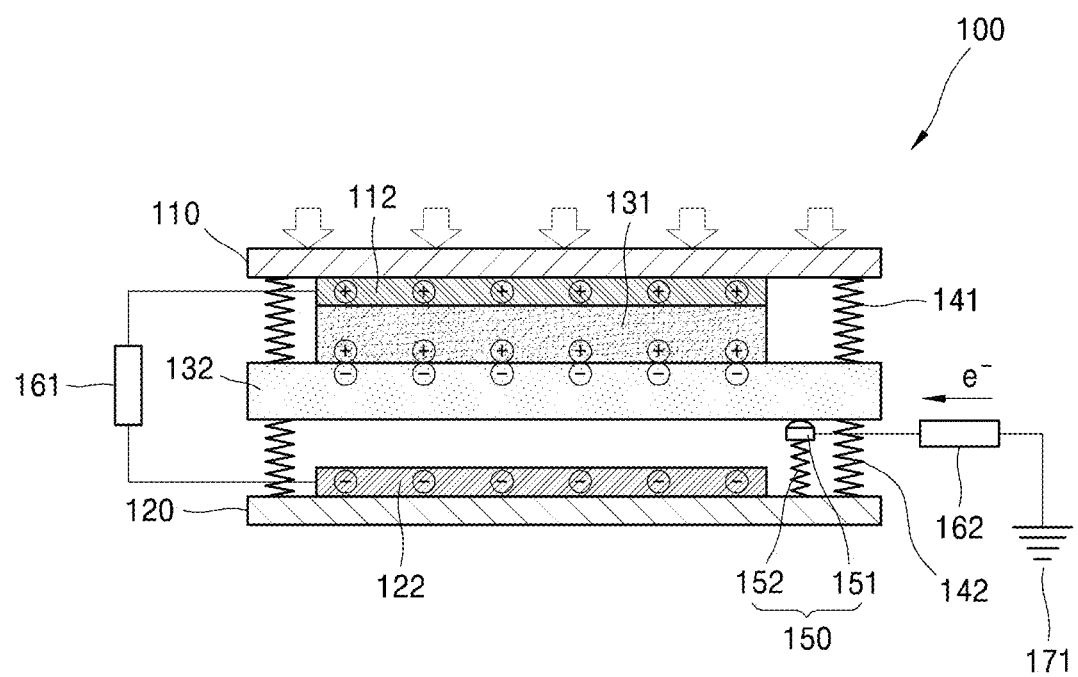

FIG. 4D illustrates a state in which the second charging object 132 contacts the grounding unit 150 while the first and second charging objects 131 and 132 contact each other. Referring to FIG. 4D, when the pressing force is continuously applied to the first substrate 110 while the first and second charging objects 131 and 132 contact each other, the second charging object 132 contacts the conductive member 151 of the grounding unit 150. Herein, the conductive member 151 is electrically connected to the charge reservoir 171. In this state, electrons move from the charge reservoir 171 to the second charging object 132 to achieve charge equilibration among the first electrode 112, the first charging object 131, the second charging object 132, and the second electrode 122, and thus a current flows through the second load 162.

Figure 4E:
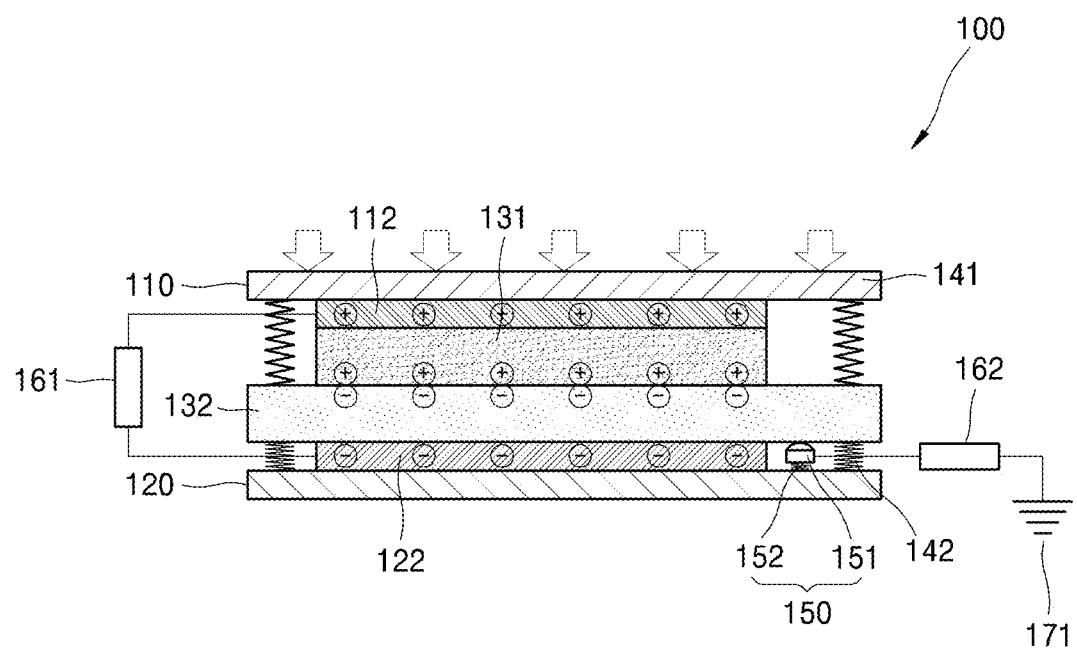

FIG. 4E illustrates a state in which the second charging object 132 contacts the second electrode 122 while the first and second charging objects 131 and 132 contact each other. Referring to FIG. 4E, when the pressing force is continuously applied to the first substrate 110 while the second charging object 132 contacts the conductive member 151 of the grounding unit 150, the second charging object 132 contacts the second electrode 122. Herein, the second charging object 132 constantly contacts the conductive member 151 of the grounding unit 150. In this state, although the first and second charging objects 131 and 132 contact each other and the second charging object 132 contacts the second electrode 122 and the conductive member 151 of the grounding unit 150, since charge equilibration is achieved, charge transfer does not occur between the second charging object 132 and the charge reservoir 171.

Figure 4F:
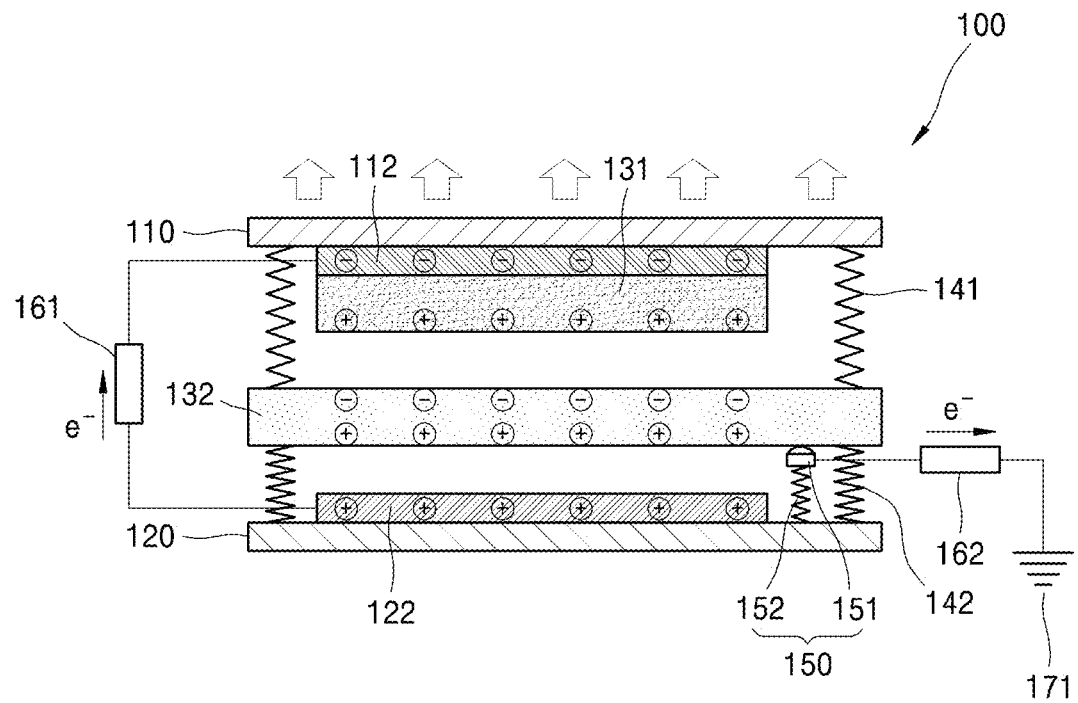

FIG. 4F illustrates a state in which the second charging object 132 and the second electrode 122 are separated from each other and the first and second charging objects 131 and 132 are separated from each other. Referring to FIG. 4F, when the force applied to the first substrate 110 is released, the second charging object 132 is separated from the second electrode 122, and the first charging object 131 is separated from the second charging object 132. Herein, the second charging object 132 constantly contacts the conductive member 151 of the grounding unit 150. In this state, electrons move from the second charging object 132, which is a negatively charged object, to the charge reservoir 171 to achieve charge equilibration in the second charging object 132, and thus a current flows through the second load 162. In addition, positive charges in a surface of the first charging object 131, which is a positively charged object, induce negative charges in the first electrode 112, which is an upper electrode. As such, electrons move from the second electrode 122 to the first electrode 112 and thus a current flows through the first load 161.

Figure 4G:
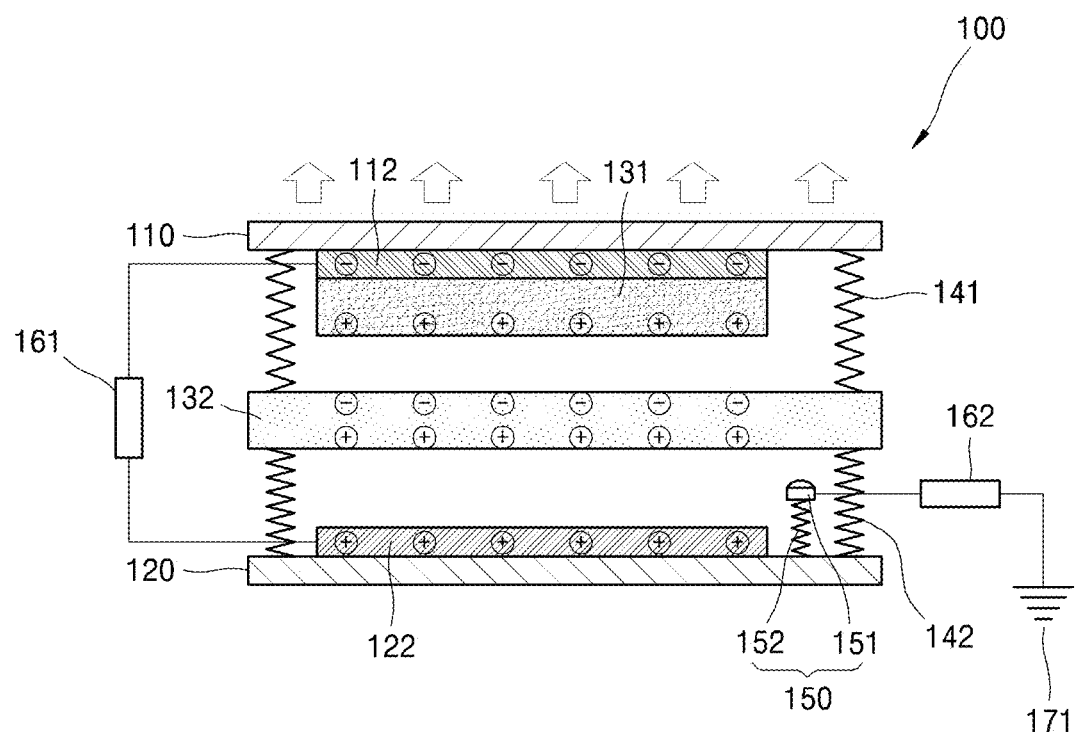
Figure 4H:
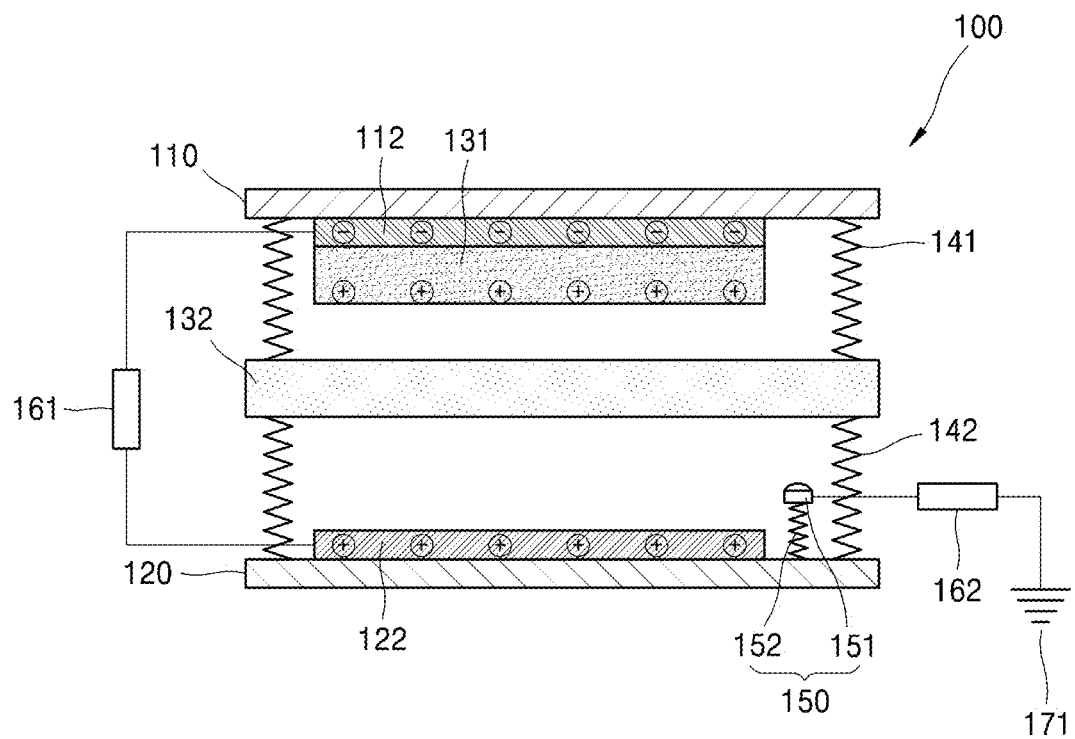

When the force applied to the first substrate 110 is continuously released, the second charging object 132 is separated from the conductive member 151 of the grounding unit 150 as illustrated in FIG. 4G, and then the triboelectric generator 100 returns to an initial state thereof as illustrated in FIG. 4H. Like the state of FIG. 4A, in the state of FIG. 4H, the first and second electrodes 112 and 122 are maintained in negatively and positively charged states, respectively, and the first charging object 131 is maintained in a positively charged state. Positive and negative charges in the second charging object 132 move an thus the second charging object 132 is maintained in a neutral state. Thereafter, when a pressing force is applied again to the first substrate 110, the triboelectric generator 100 repeats the above-described second cycle operation.

As described above, in the triboelectric generator 100 according to some example embodiments, electrical energy may be generated between the first and second electrodes 112 and 122 and between the second charging object 132 and the charge reservoir 171 by pressing the first substrate 110. Accordingly, when an external force is repeatedly applied to the triboelectric generator 100, electrical energy may be efficiently obtained.

Figure 5:
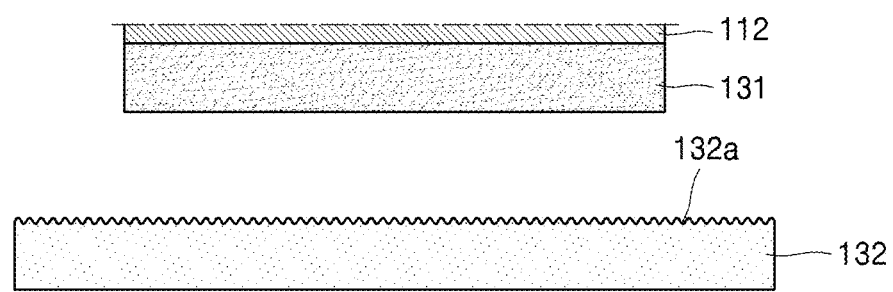
FIG. 5 is a cross-sectional view of a modified example of a second charging object of the triboelectric generator illustrated in FIG. 1.

FIG. 5 is a cross-sectional view of a modified example of the second charging object 132 of the triboelectric generator 100 illustrated in FIG. 1. Referring to FIG. 5, a plurality of protrusions 132a may be provided on a contact surface of the second charging object 132 contacting the first charging object 131. Herein, the protrusions 132a may have, for example, a wire shape or a pyramid shape, but are not limited thereto. When the protrusions 132a are provided on the contact surface of the second charging object 132 as described above, an area contacting the first charging object 131 may be increased and thus electrical energy may be more efficiently obtained. Although FIG. 5 illustrates an example in which the protrusions 132a are provided on the contact surface of the second charging object 132, the protrusions 132a are not limited thereto and may be provided on a contact surface of the first charging object 131 or on the contact surfaces of both the first and second charging objects 131 and 132.

Figure 6:
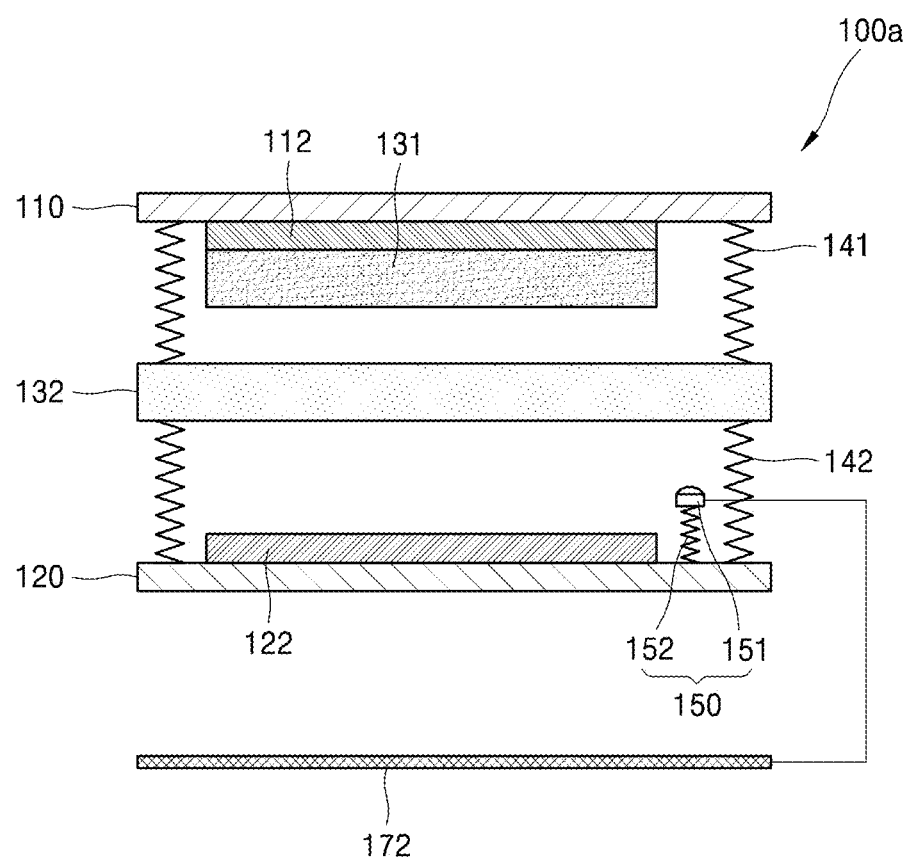
FIG. 6 is a cross-sectional view of a charge reservoir of a triboelectric generator modified from FIG. 1.

FIG. 6 is a cross-sectional view of a charge reservoir 172 of a triboelectric generator 100a modified from FIG. 1. Referring to FIG. 6, the charge reservoir 172 may be electrically connected to the conductive member 151 of the grounding unit 150, and may include a conductive member such as a metal film. FIG. 6 illustrates an example in which the conductive member configured as the charge reservoir 172 has a plate shape and is provided below the second substrate 120. However, the conductive member is not limited thereto and may have a variety of shapes and positions.

Figure 7:
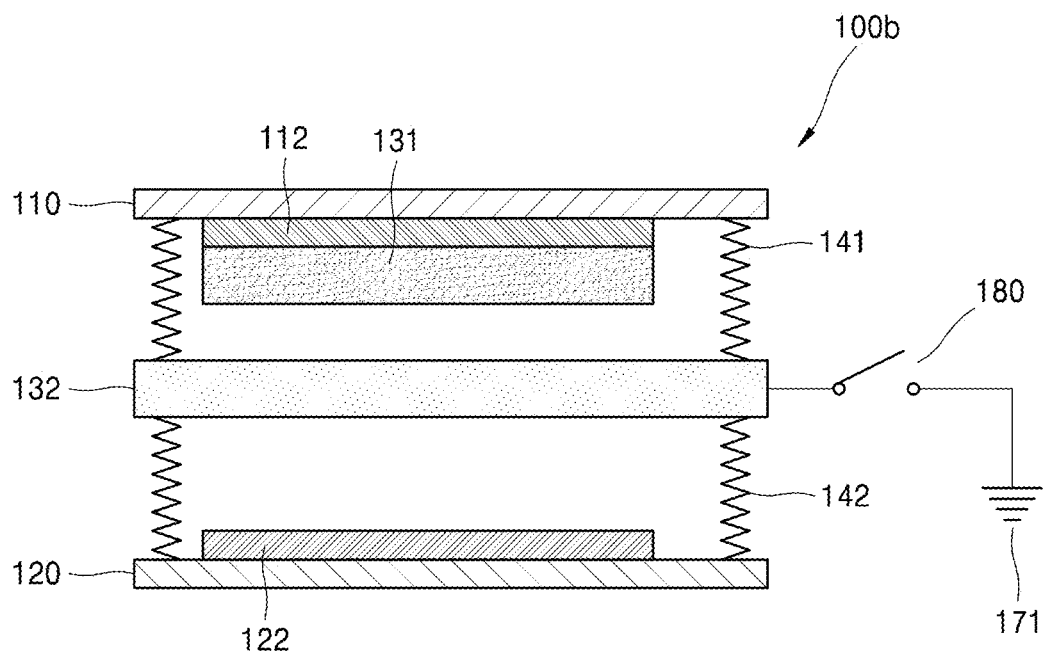
FIG. 7 is a cross-sectional view of a grounding unit of a triboelectric generator modified from FIG. 1.

FIG. 7 is a cross-sectional view of a grounding unit 180 of a triboelectric generator 100b modified from FIG. 1. Referring to FIG. 7, the grounding unit 180 may include a switching device configured to intermittently interconnect the second charging object 132 and the charge reservoir 171. The switching device may include, for example, a mechanical switch or a solid-state switch (e.g., complementary metal-oxide semiconductor (CMOS) device), but is not limited thereto. The switching device may electrically connect or insulate the second charging object 132 and the charge reservoir 171 to or from each other under certain conditions. For example, when the triboelectric generator 100b regularly operates, the switching device may establish and release electrical connection between the second charging object 132 and the charge reservoir 171 in a preset cycle. Alternatively, the switching device may establish and release electrical connection between the second charging object 132 and the charge reservoir 171 by receiving voltage and/or current information of the first and second electrodes 112 and 122.

Figure 8:
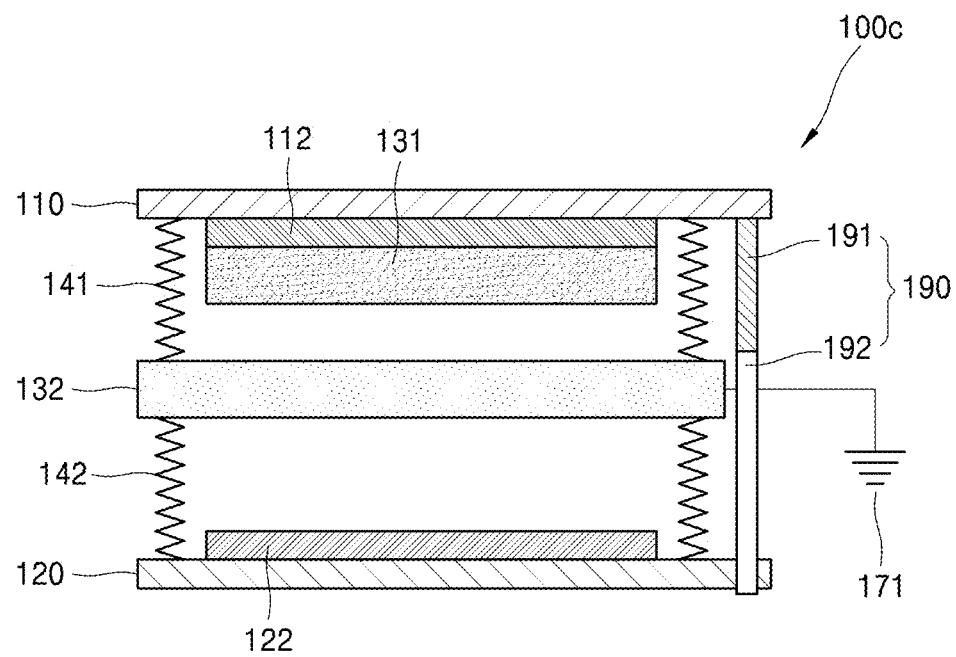
FIG. 8 is a cross-sectional view of a grounding unit of a triboelectric generator modified from FIG. 1.

FIG. 8 is a cross-sectional view of a grounding unit 190 of a triboelectric generator 100c modified from FIG. 1. Referring to FIG. 8, the grounding unit 190 may include a conductive member 191 configured to electrically connect the second charging object 132 and the charge reservoir 171 to each other, and an insulating member 192 configured to electrically insulate the second charging object 132 and the charge reservoir 171 from each other. For example, the grounding unit 190 may be provided at an edge between the first and second substrates 110 and 120, and may include the conductive member 191 fixed to the first substrate 110, and the insulating member 192 extending downward from the conductive member 191. Herein, due to motion of the first substrate 110, the conductive member 191 may electrically connect the second charging object 132 and the charge reservoir 171 to each other, and the insulating member 192 may electrically insulate the second charging object 132 and the charge reservoir 171 from each other.

Figure 9A:
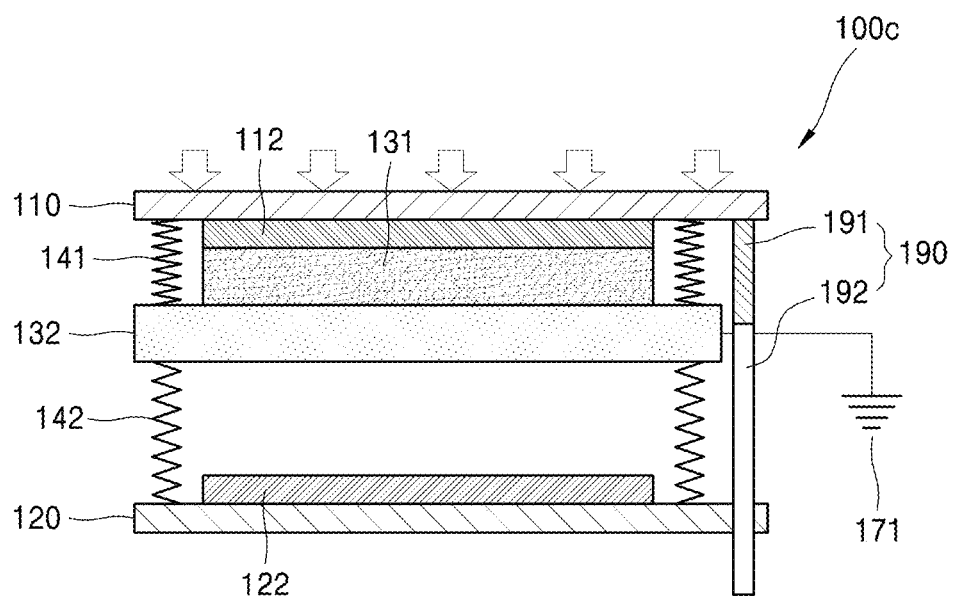
FIGS. 9A to 9C are cross-sectional views showing operation of the grounding unit illustrated in FIG. 8.
Figure 9B:
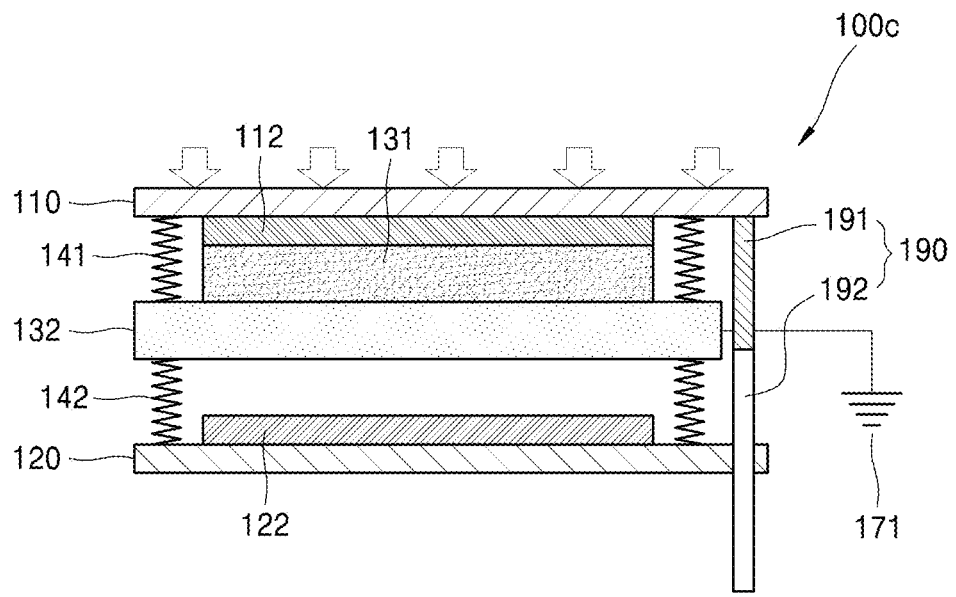
Figure 9C:
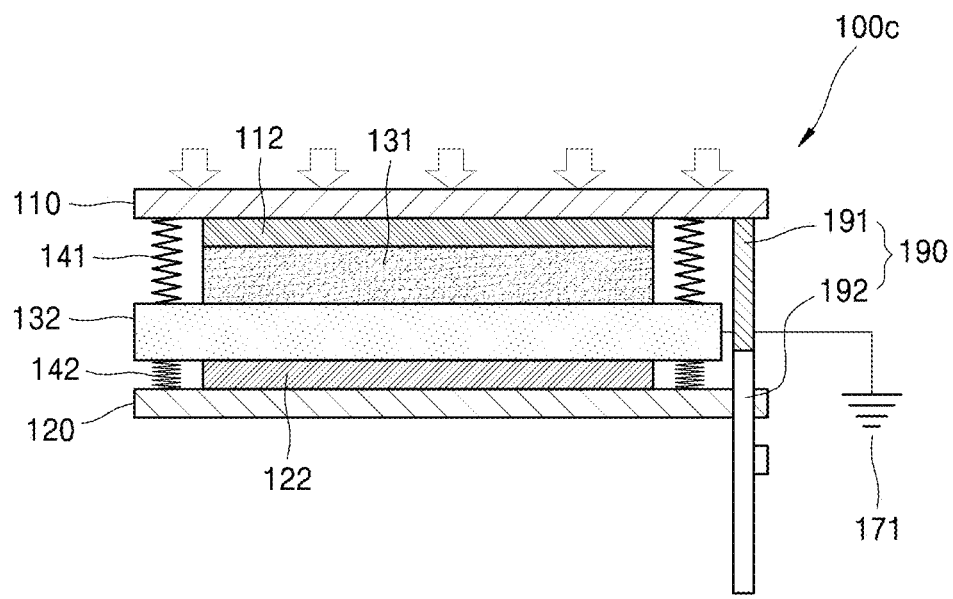

FIGS. 9A to 9C are cross-sectional views showing operation of the grounding unit 190 illustrated in FIG. 8.

Referring to FIG. 9A, when a pressing force is applied to the first substrate 110 and thus the first substrate 110 moves downward, the first and second charging objects 131 and 132 contact each other. In this process, the second charging object 132 may be constantly electrically insulated from the charge reservoir 171 by the insulating member 192 of the grounding unit 150. Referring to FIG. 9B, when the first substrate 110 continuously moves downward, the second charging object 132 may be electrically connected to the charge reservoir 171 by the conductive member 191 of the grounding unit 190 while the first and second charging objects 131 and 132 contact each other. Referring to FIG. 9C, when the first substrate 110 continuously moves downward, the second charging object 132 may contact the second electrode 122 while the second charging object 132 is electrically connected to the charge reservoir 171. As described above, electrical connection between the second charging object 132 and the charge reservoir 171 may be established and released using the conductive member 191 and the insulating member 192 of the grounding unit 190.

Figure 10:
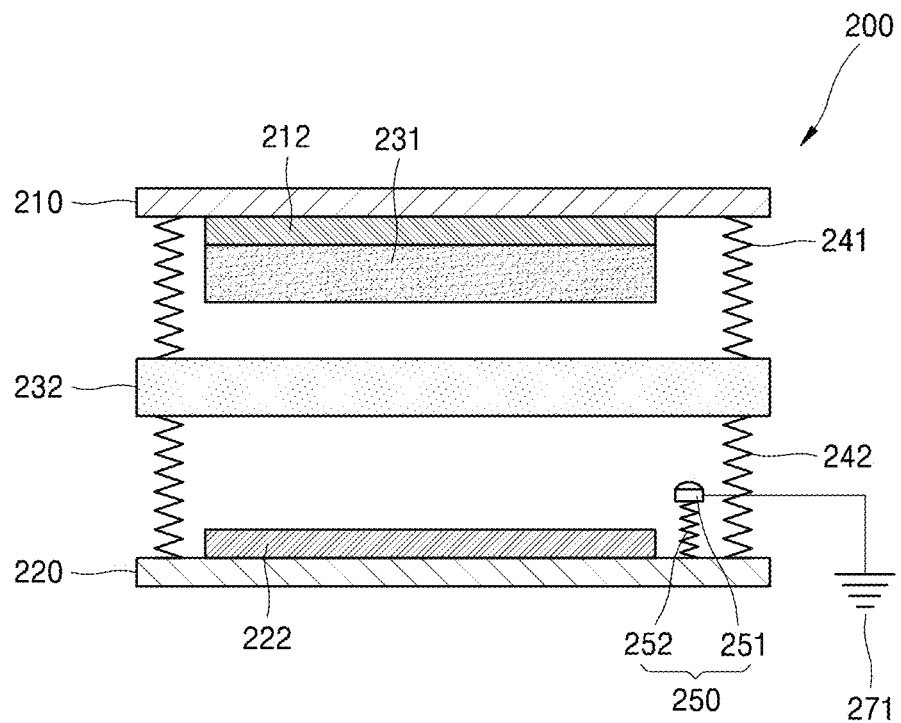
FIG. 10 is a cross-sectional view of a triboelectric generator according to some example embodiments.

FIG. 10 is a cross-sectional view of a triboelectric generator 200 according to some example embodiments. Except that first and second charging objects 231 and 232 are negatively and positively charged objects, respectively, the triboelectric generator 200 illustrated in FIG. 10 is the same as the triboelectric generator 100 illustrated in FIGS. 1 and 2. The following description is focused on differences from FIGS. 1 and 2.

Referring to FIG. 10, the triboelectric generator 200 includes first and second electrodes 212 and 222, a first charging object 231 provided on a surface of the first electrode 212, a second charging object 232 provided between the first charging object 231 and the second electrode 222, and a grounding unit 250 configured to intermittently interconnect the second charging object 232 and a charge reservoir 271.

First and second substrates 210 and 220 are spaced apart from each other by a certain distance. Each of the first and second substrates 210 and 220 may include a hard material or a flexible material. The first electrode 212 is provided on a bottom surface of the first substrate 210, and the second electrode 222 is provided on a top surface of the second substrate 220. Each of the first and second electrodes 212 and 222 may include a material having an excellent electrical conductivity. For example, the first and second electrodes 212 and 222 may include at least one of graphene, CNT, ITO, metal, and conductive polymer. Each of the first and second electrodes 212 and 222 may have a monolayer structure or a multilayer structure.

The first charging object 231 is provided on a bottom surface of the first electrode 212 facing the second electrode 222, and may be a negatively charged object. Herein, the first charging object 231 is provided to contact the bottom surface of the first electrode 212. The first charging object 231 is negatively charged due to contact with the second charging object 232 to be described below, and may include a material having a low electrical conductivity. For example, the first charging object 231 may include polytetrafluoroethylene (Teflon), polydimethylsiloxane (PDMS), polyvinyl chloride (PVC), polyimide (Kapton), polypropylene (PP), polyethylene (PE), or polystyrene (PS). However, the first charging object 231 is not limited thereto and may include a variety of materials configured to (or capable of) being negatively charged due to contact with the second charging object 232.

The second charging object 232 is provided between the first charging object 231 and the second electrode 222, and may be a positively charged object. Herein, the second charging object 232 may be provided to be spaced apart from the first charging object 231 and the second electrode 222 when no external force is applied to the triboelectric generator 200.

The second charging object 232 is positively charged due to contact with the first charging object 231, and may include a conductive material having a high electrical conductivity in order to facilitate charge transfer between the second charging object 232 and the charge reservoir 271. The second charging object 232 may include, for example, Al, Cu, Ag, Au, or steel. However, the second charging object 232 is not limited thereto and may include a variety of conductive materials configured to (or capable of) being positively charged due to contact with the first charging object 231. As described above, at least one of the first and second charging objects 231 and 232 may be doped with a p-type dopant or an n-type dopant to control surface charge characteristics thereof.

The grounding unit 250 is provided to intermittently contact the second charging object 232 due to motion of the second charging object 232. The grounding unit 250 is electrically connected to the charge reservoir 271. Herein, the charge reservoir 271 may be, for example, the ground. Accordingly, the grounding unit 250 may intermittently interconnect the second charging object 232 and the charge reservoir 271 due to motion of the second charging object 232.

The grounding unit 250 may be provided between the second charging object 232 and the second substrate 220 to be intermittently connected to the second charging object 232 due to motion of the second charging object 232. In this regard, the grounding unit 250 may include a conductive member 251 configured to intermittently contact the second charging object 232 due to motion of the second charging object 232, and an elastic member 252 configured to elastically support motion of the conductive member 251. Herein, the conductive member 251 is electrically connected to the charge reservoir 271.

One or more first elastic supporters 241 may be provided between the first substrate 210 and the second charging object 232, and one or more second elastic supporters 242 may be provided between the second charging object 232 and the second substrate 220. Each of the first elastic supporters 241 may have a modulus of elasticity less than that of each of the second elastic supporters 242.

A description is now given of an operating mechanism of the triboelectric generator 200 illustrated in FIG. 10.

FIGS. 11A to 11H are cross-sectional views for describing a first cycle operating mechanism of the triboelectric generator 200.

Figure 11A:
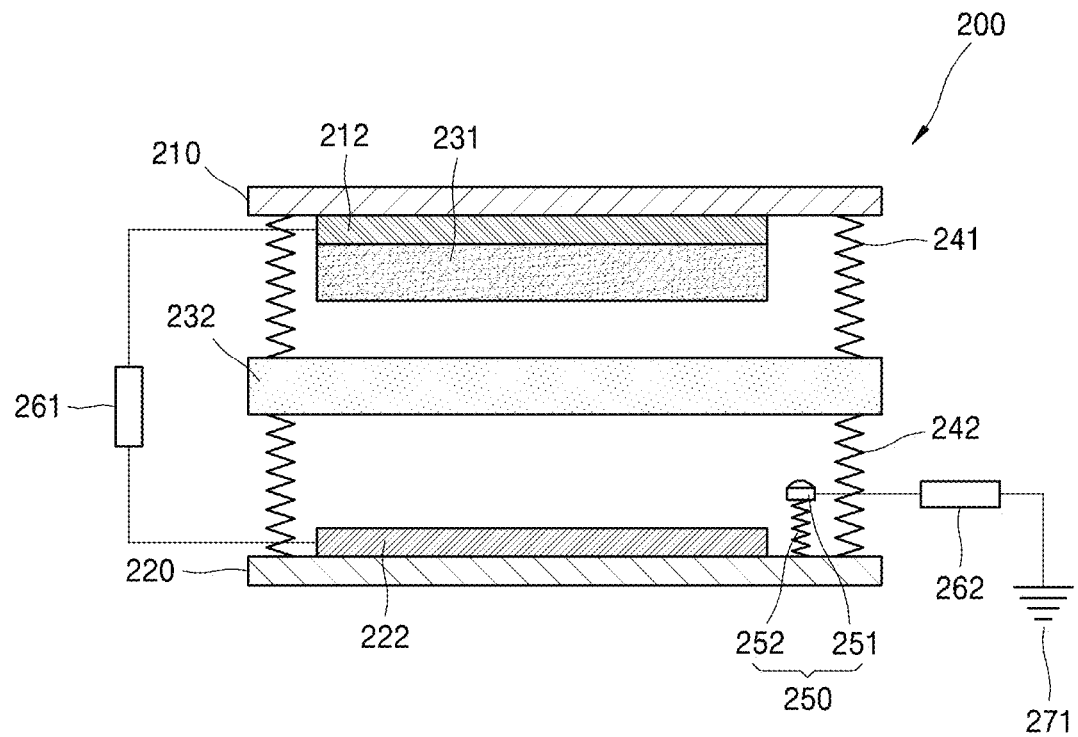
FIGS. 11A to 11H are cross-sectional views for describing a first cycle operating mechanism of the triboelectric generator illustrated in FIG. 10.

FIG. 11A illustrates a state when no external force is applied to the triboelectric generator 200. In FIG. 11A, reference numeral 261 denotes a first load for detecting the flow of electrons between the first and second electrodes 212 and 222, and reference numeral 262 denotes a second load for detecting the flow of electrons between the grounding unit 250 and the charge reservoir 271.

Figure 11B:
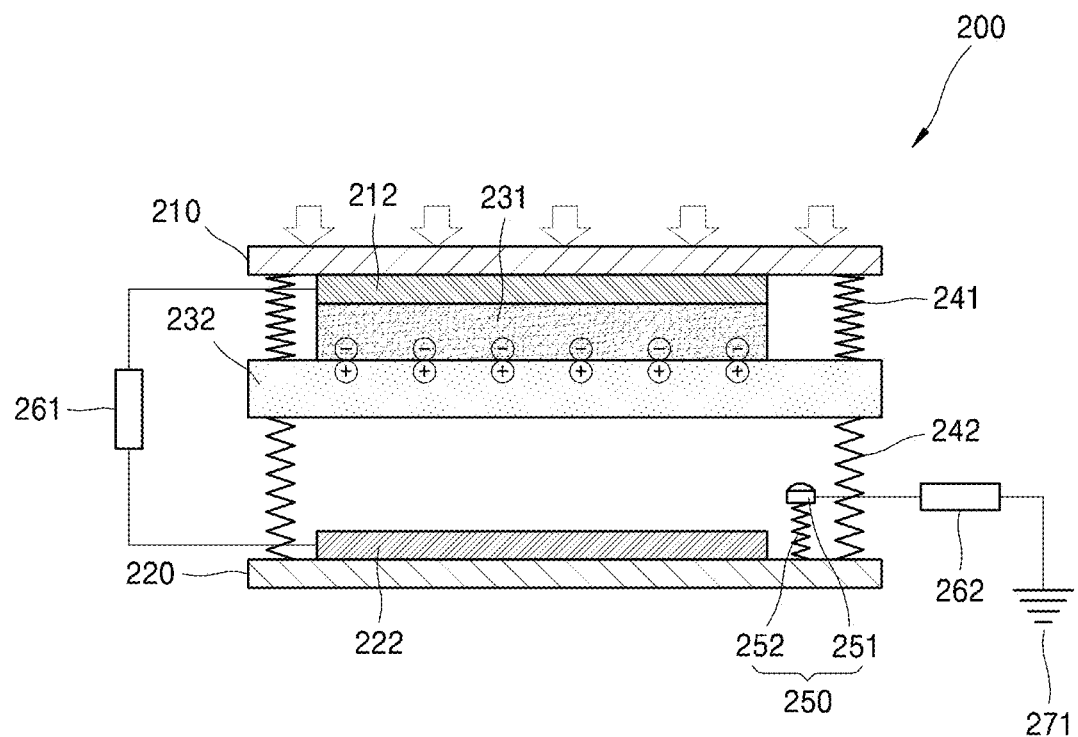
Figure 11C:
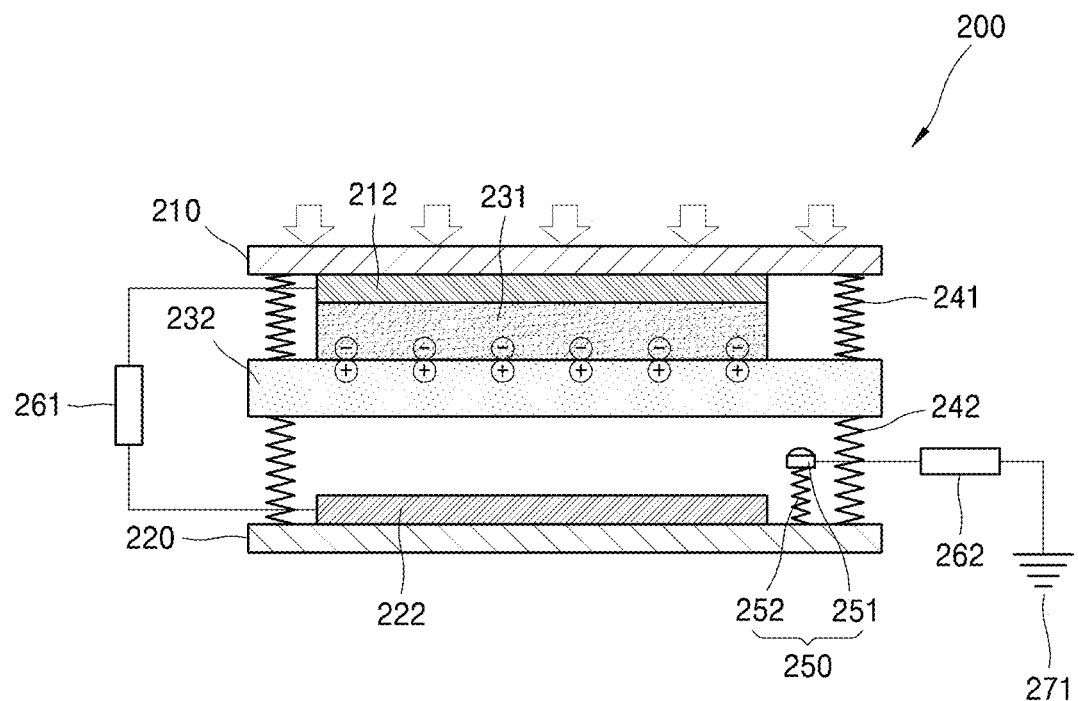

FIG. 11B illustrates a state in which the first and second charging objects 231 and 232 contact each other. Referring to FIG. 11B, when a pressing force is applied to the first substrate 210, initially, the first and second charging objects 231 and 232 contact each other. Herein, since the first and second charging objects 231 and 232 are negatively and positively charged objects, respectively, a contact surface of the first charging object 231 may be negatively charged, and a contact surface of the second charging object 232 may be positively charged. Subsequently, when the pressing force is continuously applied to the first substrate 210, as illustrated in FIG. 11C, the second charging object 232 moves toward the second electrode 222 while the first and second charging objects 231 and 232 contact each other.

Figure 11D:
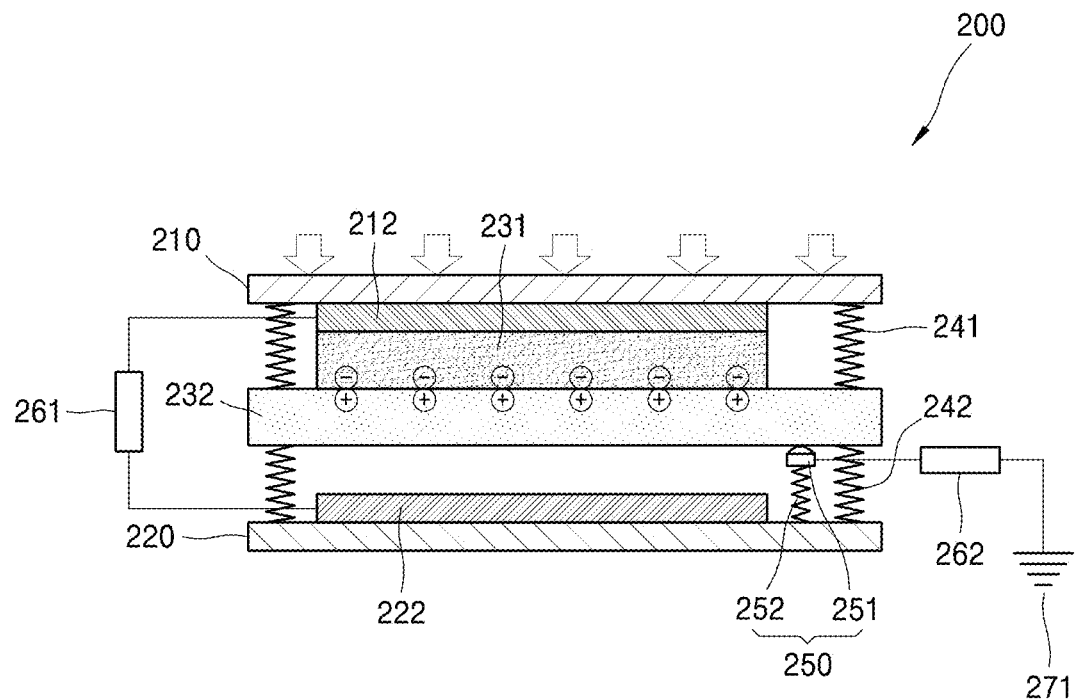

FIG. 11D illustrates a state in which the second charging object 232 contacts the grounding unit 250 while the first and second charging objects 231 and 232 contact each other. Referring to FIG. 11D, when the pressing force is continuously applied to the first substrate 210 while the first and second charging objects 231 and 232 contact each other, the second charging object 232 contacts the conductive member 251 of the grounding unit 250. Herein, the conductive member 251 is electrically connected to the charge reservoir 271, e.g., the ground. In this state, since the first and second charging objects 231 and 232 achieve charge equilibration therebetween, charge transfer does not occur between the second charging object 232 and the charge reservoir 271.

Figure 11E:
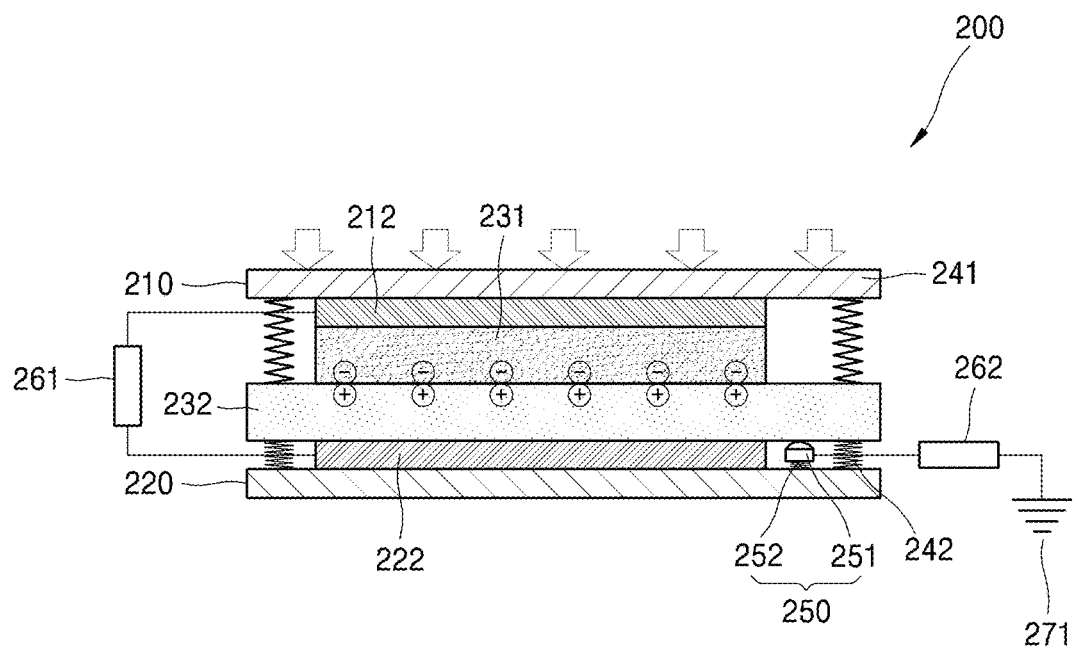

FIG. 11E illustrates a state in which the second charging object 232 contacts the second electrode 222 while the first and second charging objects 231 and 232 contact each other. Referring to FIG. 11E, when the pressing force is continuously applied to the first substrate 210 while the second charging object 232 contacts the conductive member 251 of the grounding unit 250, the second charging object 232 contacts the second electrode 222. Herein, the second charging object 232 constantly contacts the conductive member 251 of the grounding unit 250. In this state, although the first and second charging objects 231 and 232 contact each other and the second charging object 232 contacts the second electrode 222 and the conductive member 251 of the grounding unit 250, since charge equilibration is achieved, charge transfer does not occur between the second charging object 232 and the charge reservoir 271.

Figure 11F:
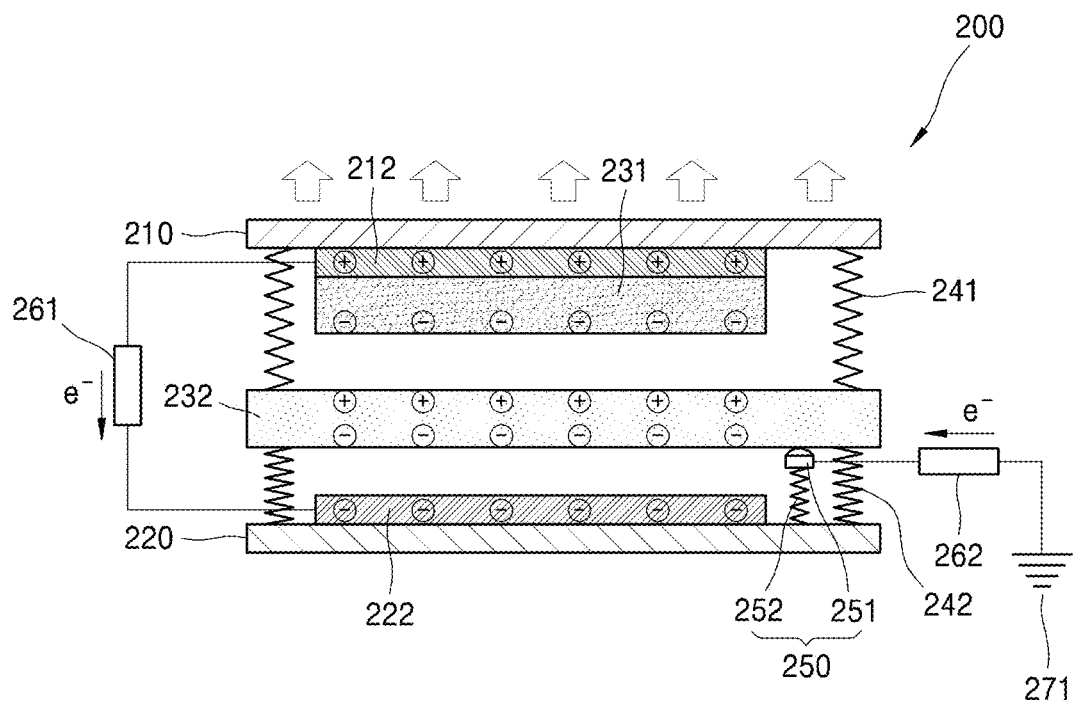

FIG. 11F illustrates a state in which the second charging object 232 and the second electrode 222 are separated from each other and the first and second charging objects 231 and 232 are separated from each other. Referring to FIG. 11F, when the force applied to the first substrate 210 is released, the second charging object 232 is separated from the second electrode 222, and the first charging object 231 is separated from the second charging object 232. Herein, the second charging object 232 constantly contacts the conductive member 251 of the grounding unit 250. In this state, electrons move from the charge reservoir 271 to the second charging object 232, which is a positively charged object, to achieve charge equilibration in the second charging object 232, and thus a current flows through the second load 262.

In addition, negative charges in a surface of the first charging object 231, which is a negatively charged object, induce positive charges in the first electrode 212, which is an upper electrode. As such, electrons move from the first electrode 212 to the second electrode 222 and thus a current flows through the first load 261.

Figure 11G:
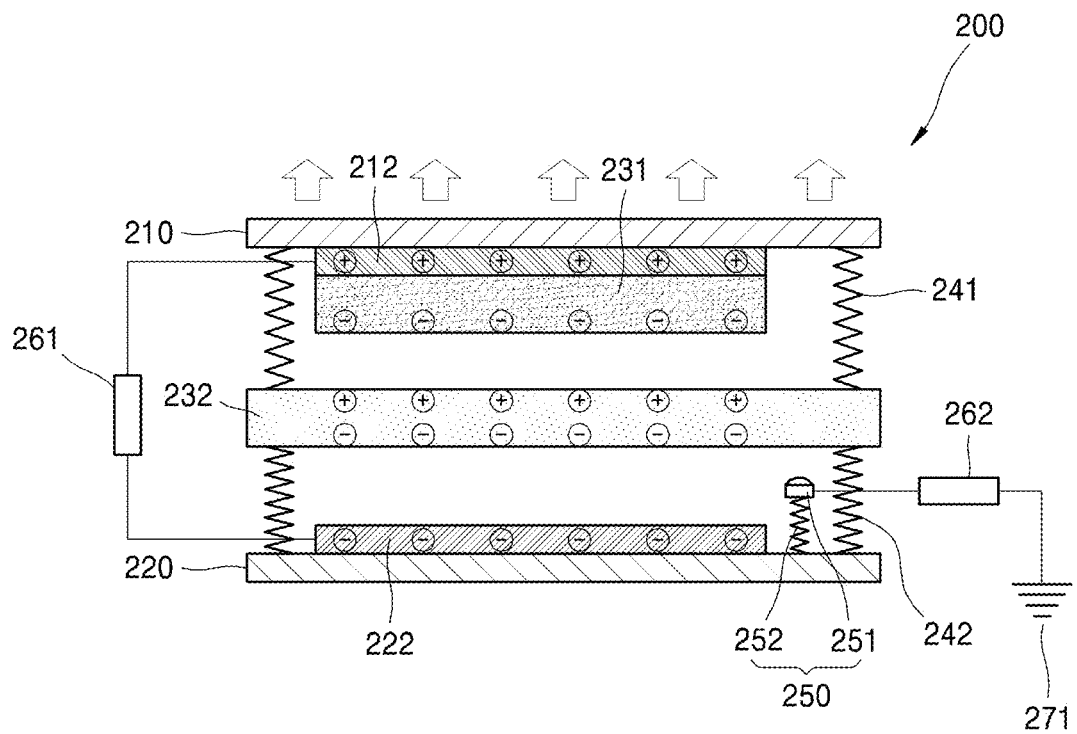
Figure 11H:
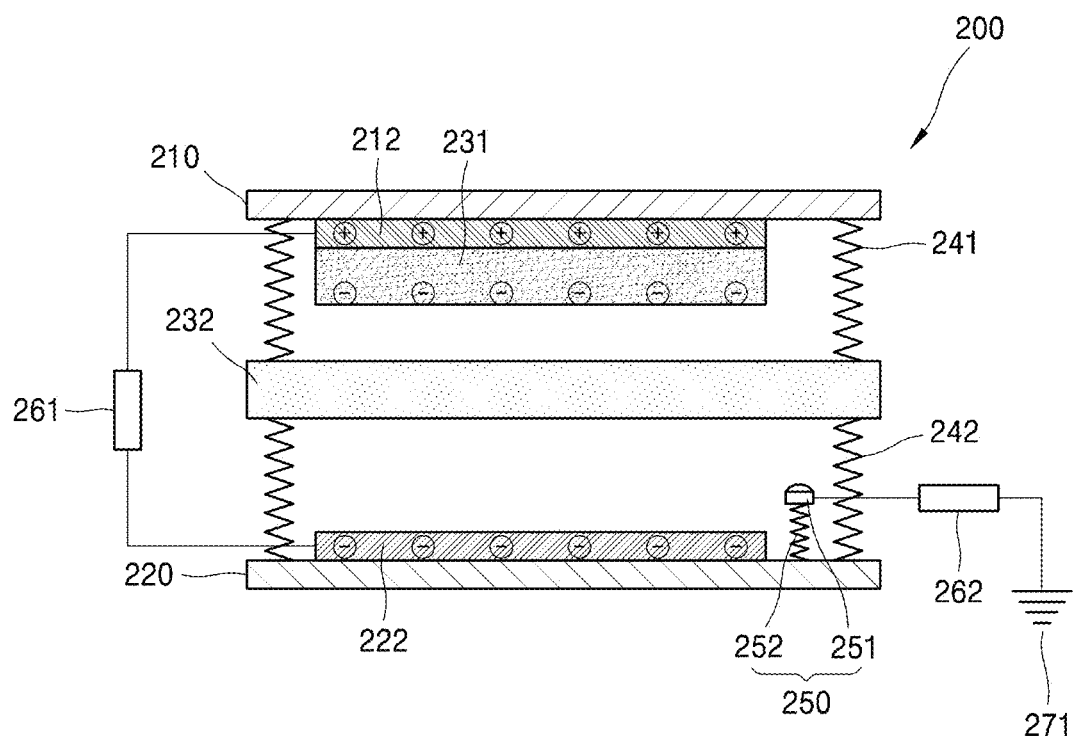

When the force applied to the first substrate 210 is continuously released, the second charging object 232 is separated from the conductive member 251 of the grounding unit 250 as illustrated in FIG. 11G, and then the triboelectric generator 200 returns to an initial state thereof as illustrated in FIG. 11H. In the state of FIG. 11H, the first and second electrodes 212 and 222 are maintained in positively and negatively charged states, respectively, and the first charging object 231 is maintained in a negatively charged state. Positive and negative charges in the second charging object 232 move an thus the second charging object 232 is maintained in a neutral state.

FIGS. 12A to 12H are cross-sectional views for describing a second cycle operating mechanism of the triboelectric generator 200.

Figure 12A:
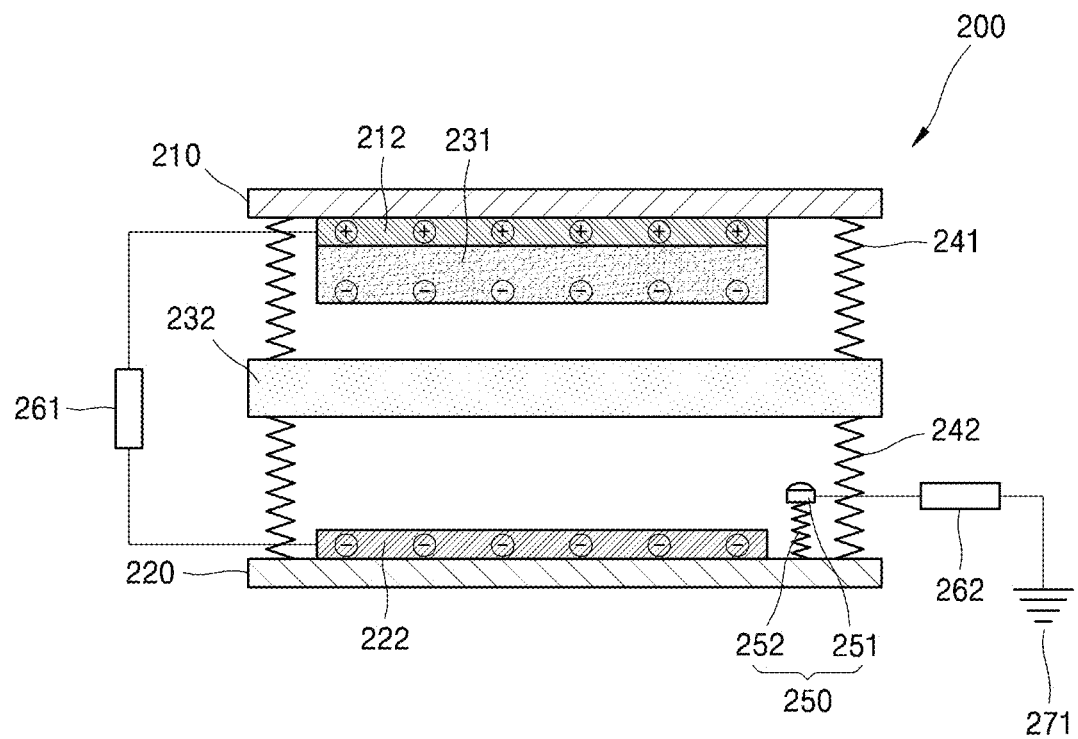
FIGS. 12A to 12H are cross-sectional views for describing a second cycle operating mechanism of the triboelectric generator illustrated in FIG. 10.

FIG. 12A illustrates the same state as FIG. 11H, in which the first and second electrodes 212 and 222 are maintained in positively and negatively charged states, respectively, the first charging object 231 is maintained in a negatively charged state, and the second charging object 232 is maintained in a neutral state.

Figure 12B:
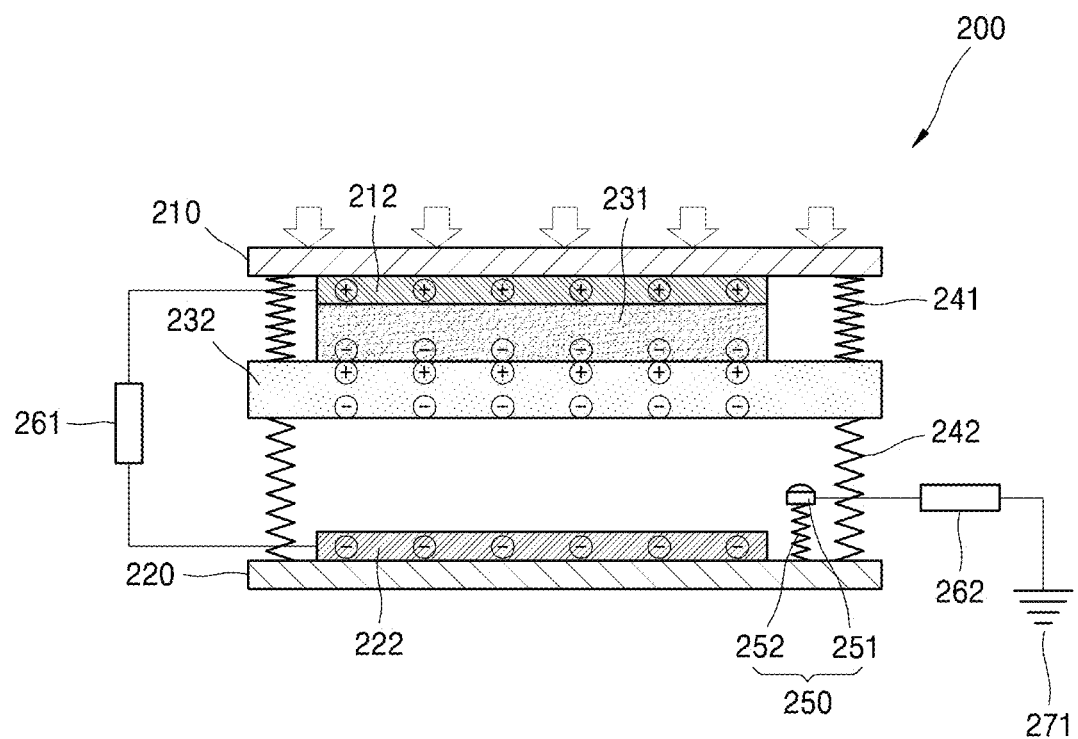

FIG. 12B illustrates a state in which the first and second charging objects 231 and 232 contact each other. Referring to FIG. 12B, when a pressing force is applied to the first substrate 210, initially, the distance between the first substrate 210 and the second charging object 232 is reduced and thus the first and second charging objects 231 and 232 contact each other. When the negatively charged first charging object 231 contacts the second charging object 232 including a conductive material as described above, a contact surface (e.g., a top surface) of the second charging object 232 is positively charged, and a surface (e.g., a bottom surface) opposite to the contact surface of the second charging object 232 is negatively charged.

Figure 12C:
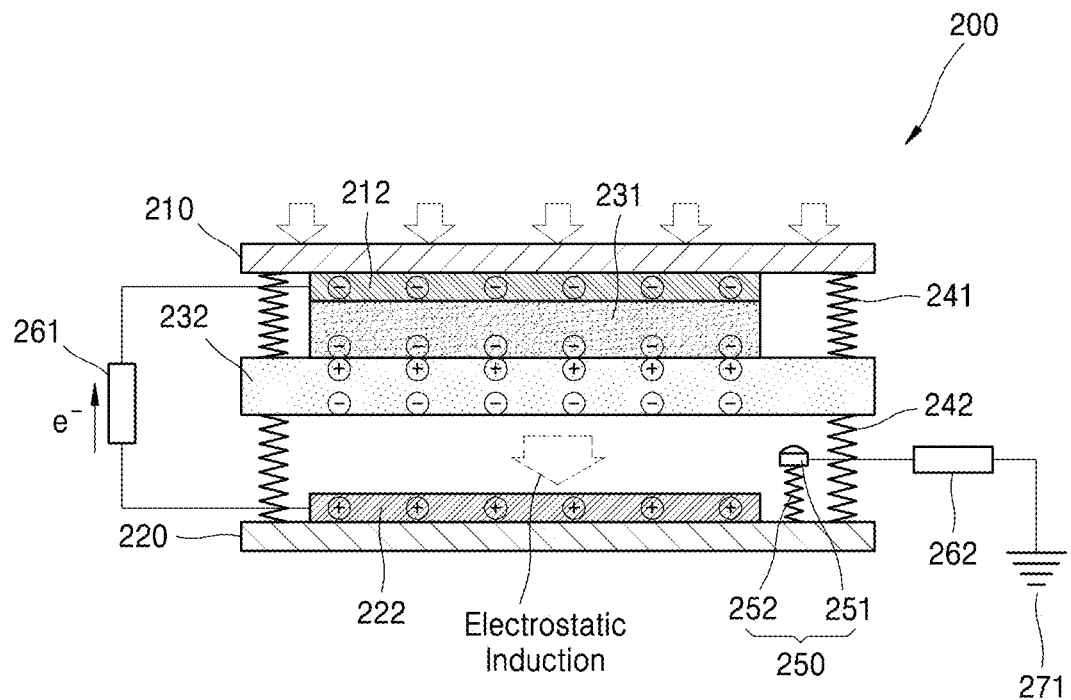

FIG. 12C illustrates a state in which electrostatic induction occurs between the second charging object 232 and the second electrode 222. Referring to FIG. 12C, when the pressing force is continuously applied to the first substrate 210, the second charging object 232 approaches the second electrode 222 while the first and second charging objects 231 and 232 contact each other. In the above-described state in which the second charging object 232 and the second electrode 222 are close to each other, negative charges in the bottom surface of the second charging object 232 induce positive charges in the second electrode 222 due to electrostatic induction. As such, electrons move from the second electrode 222 to the first electrode 212 and thus a current flows through the first load 261.

Figure 12D:
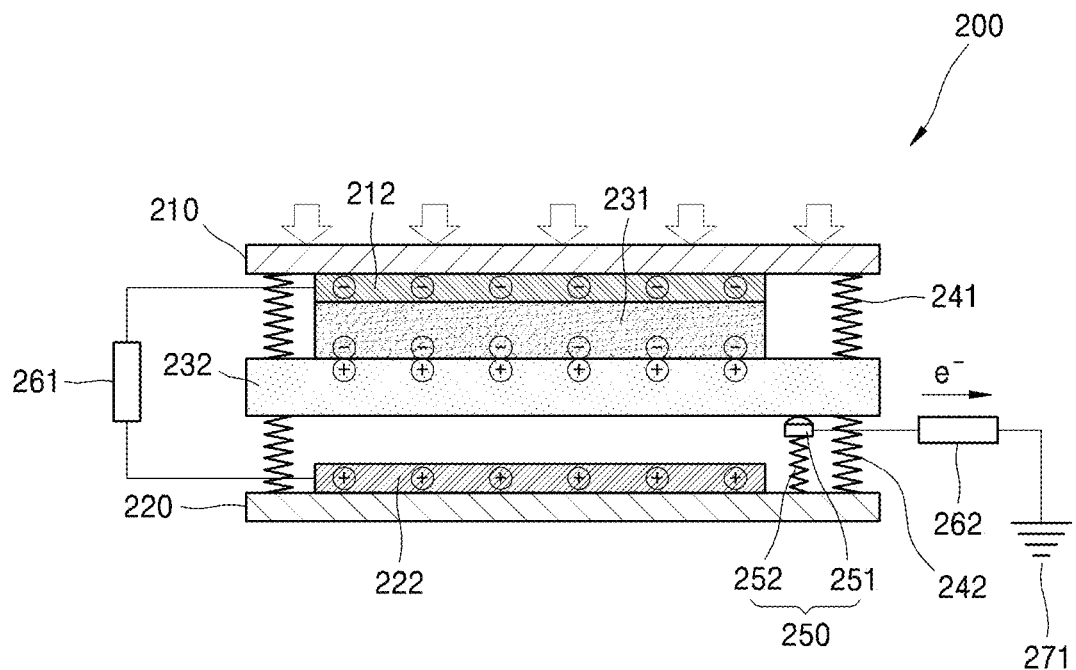

FIG. 12D illustrates a state in which the second charging object 232 contacts the grounding unit 250 while the first and second charging objects 231 and 232 contact each other. Referring to FIG. 12D, when the pressing force is continuously applied to the first substrate 210 while the first and second charging objects 231 and 232 contact each other, the second charging object 232 contacts the conductive member 251 of the grounding unit 250. In this state, electrons move from the second charging object 232 to the charge reservoir 271 to achieve charge equilibration among the first electrode 212, the first charging object 231, the second charging object 232, and the second electrode 222, and thus a current flows through the second load 262.

Figure 12E:
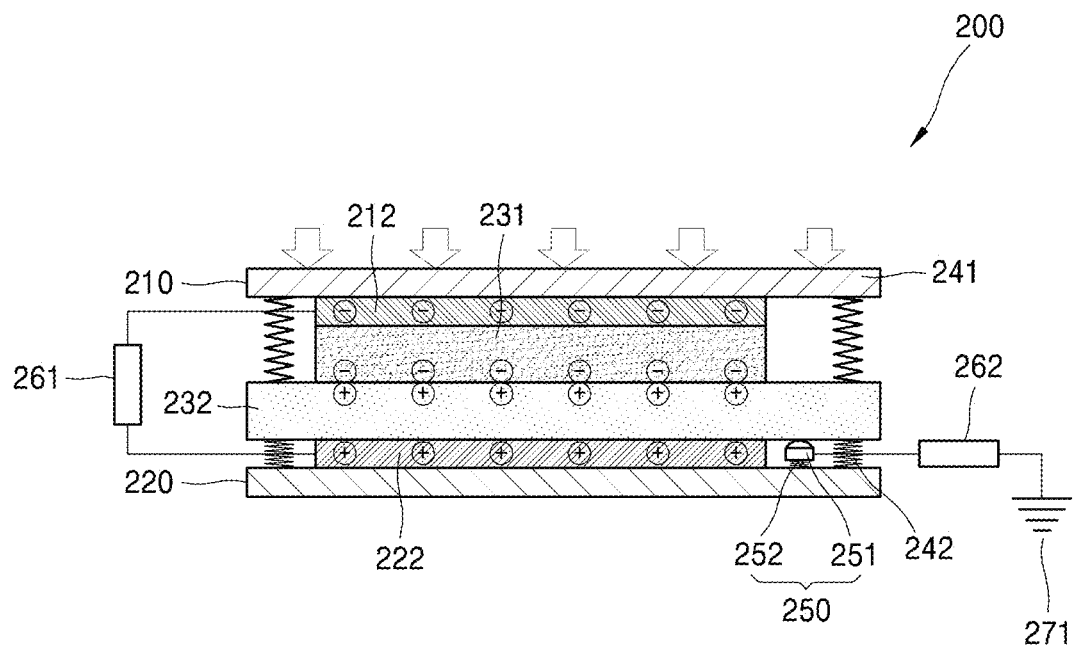

FIG. 12E illustrates a state in which the second charging object 232 contacts the second electrode 222 while the first and second charging objects 231 and 232 contact each other. Referring to FIG. 12E, when the pressing force is continuously applied to the first substrate 210 while the second charging object 232 contacts the conductive member 251 of the grounding unit 250, the second charging object 232 contacts the second electrode 222. Herein, the second charging object 232 constantly contacts the conductive member 251 of the grounding unit 250. In this state, although the first and second charging objects 231 and 232 contact each other and the second charging object 232 contacts the second electrode 222 and the conductive member 251 of the grounding unit 250, since charge equilibration is achieved, charge transfer does not occur between the second charging object 232 and the charge reservoir 271.

Figure 12F:
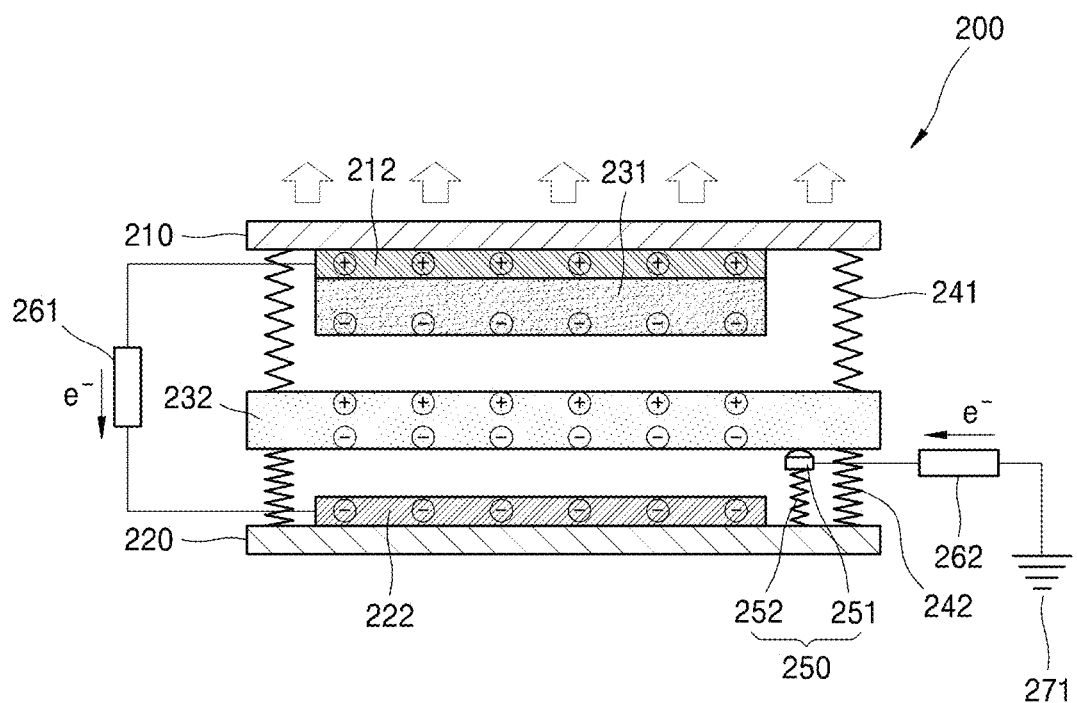

FIG. 12F illustrates a state in which the second charging object 232 and the second electrode 222 are separated from each other and the first and second charging objects 231 and 232 are separated from each other. Referring to FIG. 12F, when the force applied to the first substrate 210 is released, the second charging object 232 is separated from the second electrode 222, and the first charging object 231 is separated from the second charging object 232. Herein, the second charging object 232 constantly contacts the conductive member 251 of the grounding unit 250. In this state, electrons move from the charge reservoir 271 to the second charging object 232, which is a positively charged object, to achieve charge equilibration in the second charging object 232, and thus a current flows through the second load 262. In addition, negative charges in a surface of the first charging object 231, which is a negatively charged object, induce positive charges in the first electrode 212, which is an upper electrode. As such, electrons move from the first electrode 212 to the second electrode 222 and thus a current flows through the first load 261.

Figure 12G:
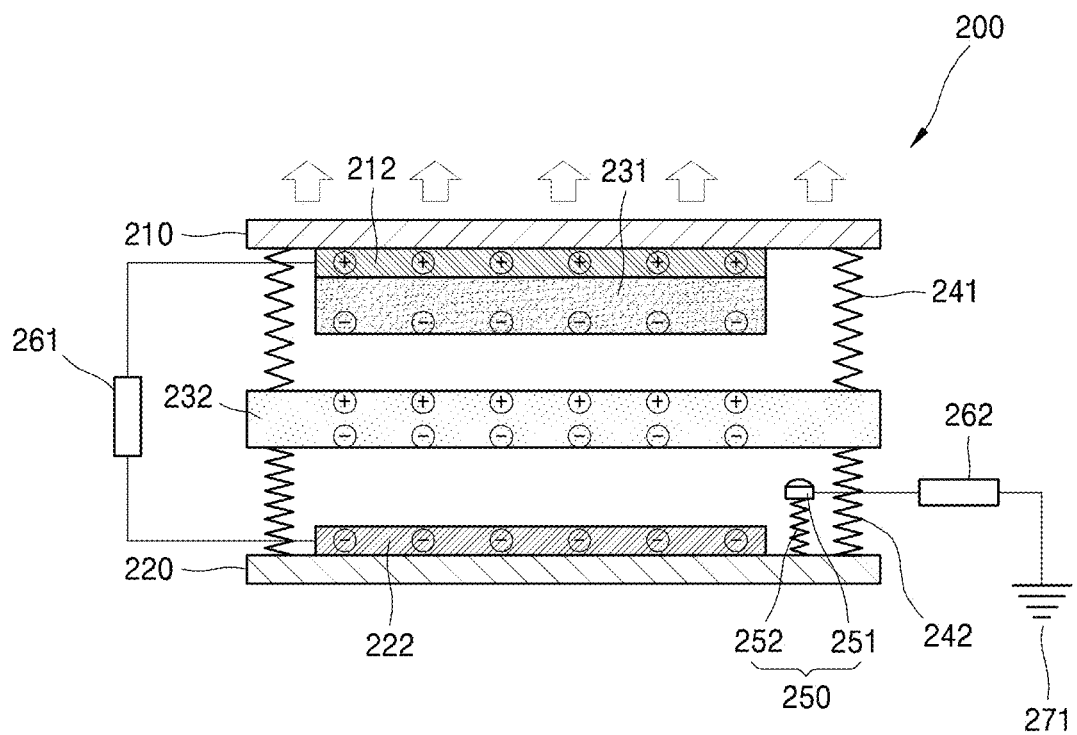
Figure 12H:
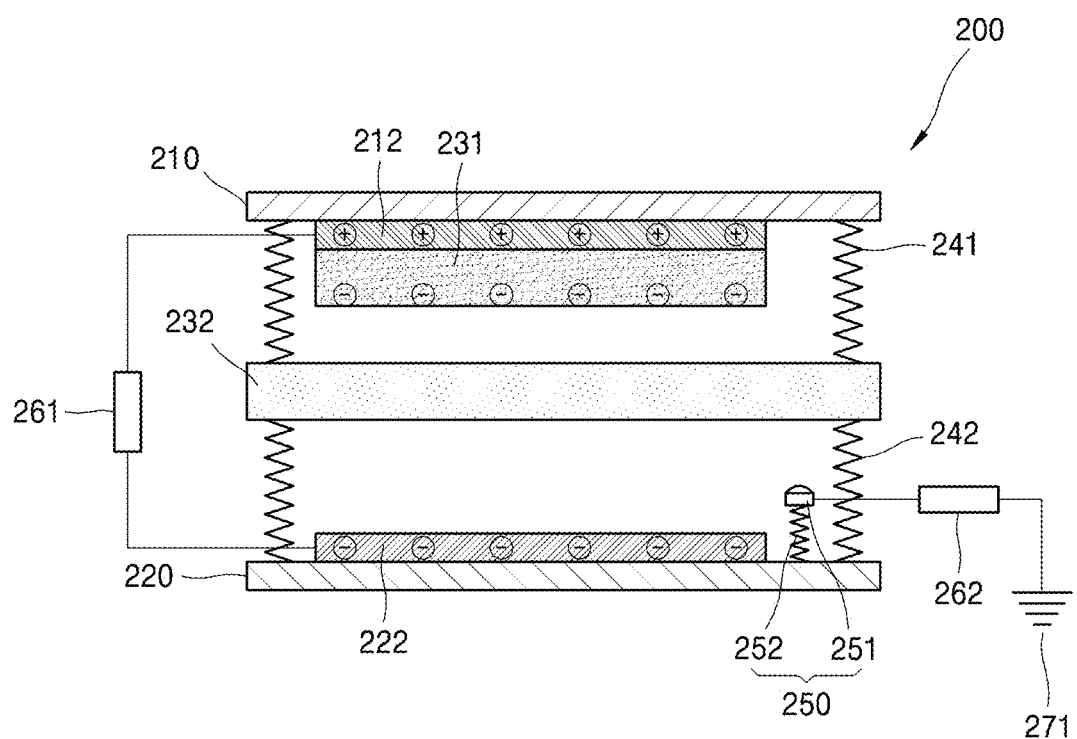

When the force applied to the first substrate 210 is continuously released, the second charging object 232 is separated from the conductive member 251 of the grounding unit 250 as illustrated in FIG. 12G, and then the triboelectric generator 200 returns to an initial state thereof as illustrated in FIG. 12H. Like the state of FIG. 12A, in the state of FIG. 12H, the first and second electrodes 212 and 222 are maintained in positively and negatively charged states, respectively, and the first charging object 231 is maintained in a negatively charged state. Positive and negative charges in the second charging object 232 move an thus the second charging object 232 is maintained in a neutral state. Thereafter, when a pressing force is applied again to the first substrate 210, the triboelectric generator 200 repeats the above-described second cycle operation.

As described above, in the triboelectric generator 200 according to some example embodiments, electrical energy may be generated between the first and second electrodes 212 and 222 and between the second charging object 232 and the charge reservoir 271 by pressing the first substrate 210. Accordingly, when an external force is repeatedly applied to the triboelectric generator 200, electrical energy may be efficiently obtained.

As described above, a plurality of protrusions may be provided on at least one of the contact surfaces of the first and second charging objects 231 and 232. The charge reservoir 271 may include a conductive member instead of the ground. The grounding unit 250 may include a switching device configured to establish or release electrical connection between the second charging object 232 and the charge reservoir 271. Alternatively, the grounding unit 250 may include a conductive member configured to electrically connect the second charging object 232 and the charge reservoir 271 to each other, and an insulating member configured to electrically insulate the second charging object 232 and the charge reservoir 271 from each other.

Figure 13:
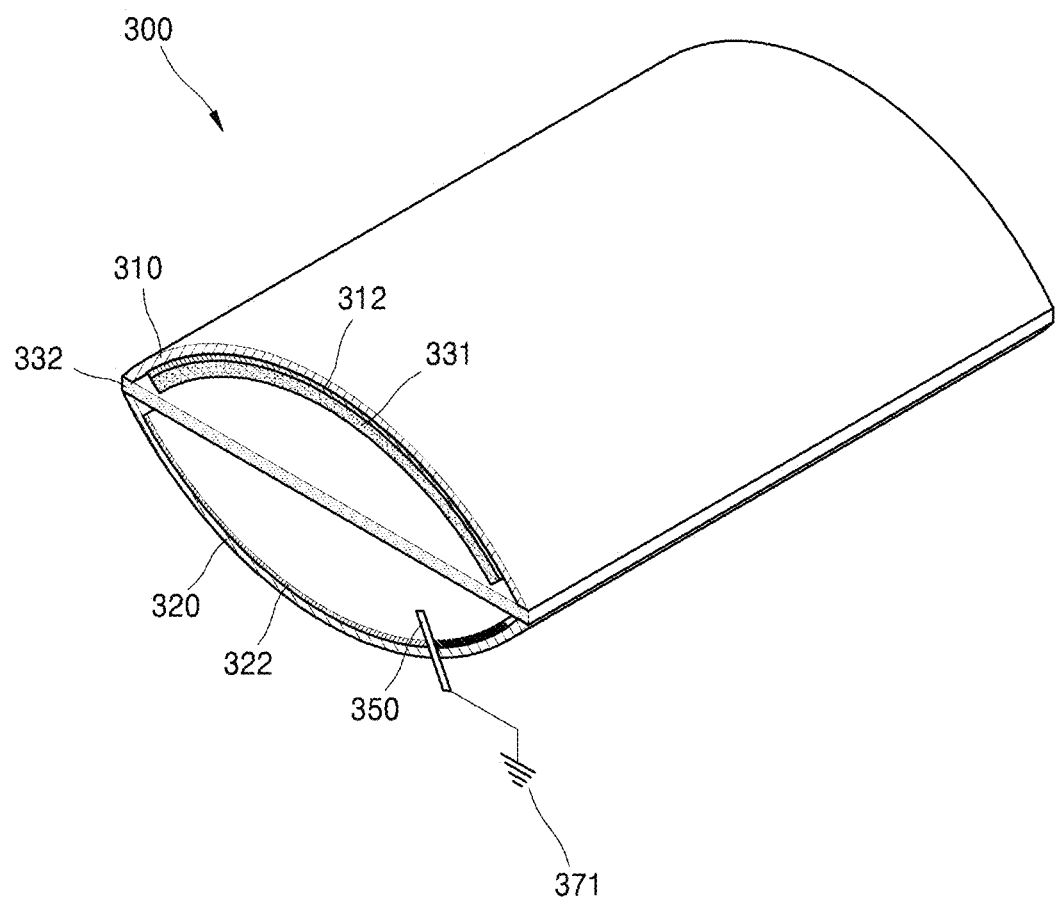
FIG. 13 is a perspective view of a triboelectric generator according to some example embodiments.

FIG. 13 is a perspective view of a triboelectric generator 300 according to some example embodiments.

Referring to FIG. 13, the triboelectric generator 300 includes first and second substrates 310 and 320, first and second electrodes 312 and 322, a first charging object 331 provided on a surface of the first electrode 312, a second charging object 332 provided between the first charging object 331 and the second electrode 322, and a grounding unit 350 configured to intermittently interconnect the second charging object 332 and a charge reservoir 371. The triboelectric generator 300 has a physical structure or mechanism in which the first charging object 331, the second charging object 332, and the second electrode 322 are spaced apart and separated from each other when no external force is applied thereto, and contact each other when an external force is applied thereto.

Each of the first and second substrates 310 and 320 may include a material having flexibility to be transformed due to an external force and having a restoring force to return to an original state thereof when the external force is removed. For example, each of the first and second substrates 310 and 320 may include polyester (PE), polyethersulfone (PES), polyethylene naphthalate (PEN), or Kapton, but is not limited thereto. The first and second substrates 310 and 320 are provided to face each other with respect to the second charging object 332 intervening therebetween. For example, the first substrate 310 may have a convex shape in an upward direction from the second charging object 332, and the second substrate 320 may have a convex shape in a downward direction from the second charging object 332. Herein, the first substrate 310 may include a material configured to (or capable of) being more easily transformed compared to the second substrate 320 in such a manner that the first substrate 310 is initially transformed when an external force is applied to the triboelectric generator 300.

The first electrode 312 is provided on a bottom surface of the first substrate 310, and the second electrode 322 is provided on a top surface of the second substrate 320. The first and second electrodes 312 and 322 may have flexibility corresponding to transformation of the first and second substrates 310 and 320. Each of the first and second electrodes 312 and 322 may include a material having an excellent electrical conductivity. For example, each of the first and second electrodes 312 and 322 may include at least one of graphene, CNT, ITO, metal, and conductive polymer. Herein, the metal may include at least one of, for example, Ag, Al, Cu, Au, Ni, Cr, and Pt, but is not limited thereto. Each of the first and second electrodes 312 and 322 may have a monolayer structure or a multilayer structure.

The first charging object 331 is provided on a bottom surface of the first electrode 312 facing the second electrode 322. The second charging object 332 is provided between the first charging object 331 and the second electrode 322. The first and second charging objects 331 and 332 may have flexibility corresponding to transformation of the first and second substrates 310 and 320. Herein, the first charging object 331 is provided to contact the bottom surface of the first electrode 312. The second charging object 332 is provided to be spaced apart from the first charging object 331 and the second electrode 322 when no external force is applied to the triboelectric generator 300. The first and second charging objects 331 and 332 may include materials to be charged with opposite polarities due to contact therebetween.

The first and second charging objects 331 and 332 may be positively and negatively charged objects, respectively. In this case, the first charging object 331 is positively charged due to contact with the second charging object 332, and may include a material having a low electrical conductivity. For example, the first charging object 331 may include polyformaldehyde, ethylcellulose, polyamide, melamine formol, wool, silk, mica, or nylon, but is not limited thereto. The second charging object 332 is negatively charged due to contact with the first charging object 331, and may include a conductive material having a high electrical conductivity in order to facilitate charge transfer between the second charging object 332 and the charge reservoir 371. The second charging object 332 may include, for example, Al, Cu, Ag, Au, or steel. However, the second charging object 332 is not limited thereto.

Alternatively, the first and second charging objects 331 and 332 may be negatively and positively charged objects, respectively. In this case, the first charging object 331 is negatively charged due to contact with the second charging object 332, and may include a material having a low electrical conductivity. For example, the first charging object 331 may include polytetrafluoroethylene (Teflon), polydimethylsiloxane (PDMS), polyvinyl chloride (PVC), polyimide (Kapton), polypropylene (PP), polyethylene (PE), or polystyrene (PS), but is not limited thereto. The second charging object 332 is positively charged due to contact with the first charging object 331, and may include a conductive material having a high electrical conductivity in order to facilitate charge transfer between the second charging object 332 and the charge reservoir 371. The second charging object 332 may include, for example, Al, Cu, Ag, Au, or steel, but is not limited thereto.

As described above, at least one of the first and second charging objects 331 and 332 may be doped with a p-type dopant or an n-type dopant to control surface charge characteristics thereof.

The grounding unit 350 is provided to intermittently interconnect the second charging object 332 and the charge reservoir 371. Herein, the charge reservoir 371 may be, for example, the ground or a conductive member. As such, the grounding unit 350 may intermittently interconnect the second charging object 332 and the charge reservoir 371 due to motion of the second charging object 332. Specifically, when the second charging object 332 moves toward the second electrode 322 and contacts the grounding unit 350, the second charging object 332 may be electrically connected to the charge reservoir 371. Otherwise, when the second charging object 332 moves away from the second electrode 322 and is separated from the grounding unit 350, the second charging object 332 may be insulated from the charge reservoir 371. Examples of the grounding unit 350 configured to (or capable of) implementing the above-described function have been described above, and thus a detailed description of the grounding unit 350 is not provided herein.

FIGS. 14A to 14E are cross-sectional views showing operation of the triboelectric generator 300 illustrated in FIG. 13.

Figure 14A:
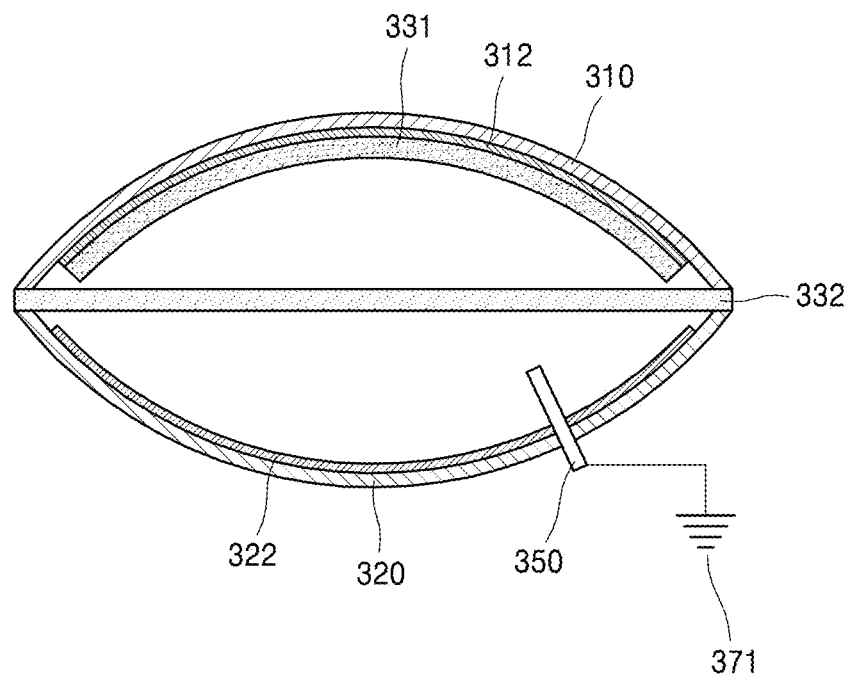
FIGS. 14A to 14E are cross-sectional views showing operation of the triboelectric generator illustrated in FIG. 13.
Figure 14B:
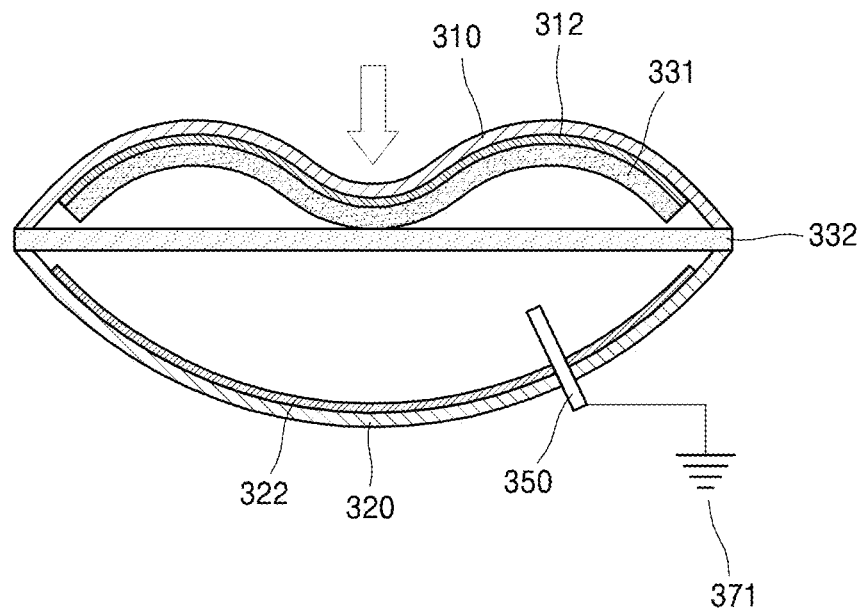

FIG. 14A illustrates an initial state of the triboelectric generator 300 before being transformed. As illustrated in FIG. 14B, when a pressing force is applied to the first substrate 310, initially, at least a part of the first substrate 310, which is an upper substrate, moves and is transformed toward the second charging object 332. In this process, the first charging object 331 may contact the second charging object 332.

Figure 14C:
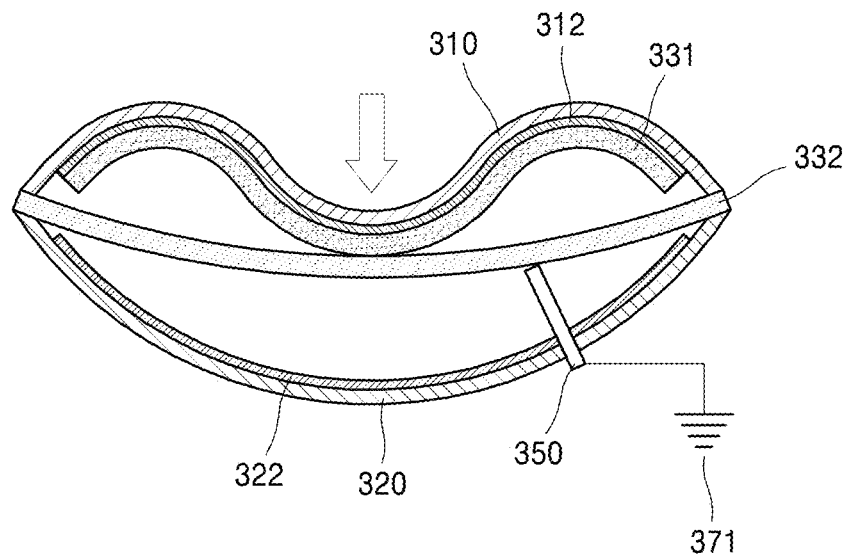
Figure 14D:
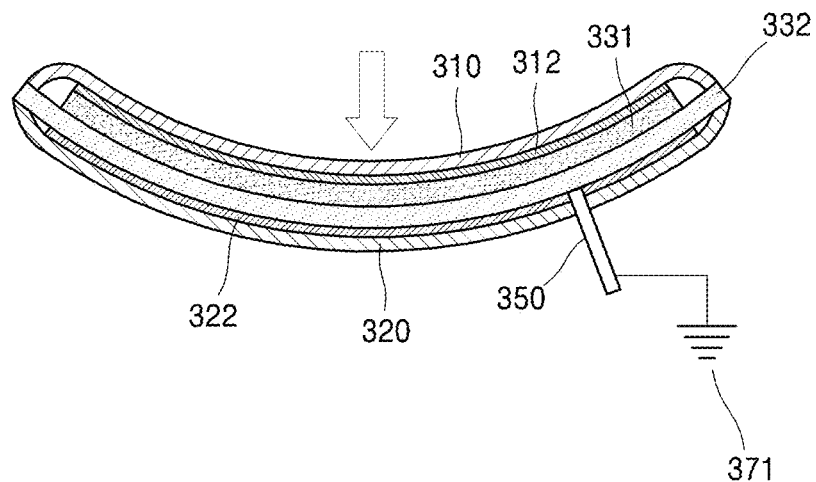

Referring to FIG. 14C, when the first substrate 310 is continuously pressed, the second charging object 332 moves and is transformed toward the second electrode 322 while the first and second charging objects 331 and 332 contact each other. In this process, the second charging object 332 may contact the grounding unit 350. Subsequently, referring to FIG. 14D, when the first substrate 310 is further pressed, the second charging object 332 contacts the second electrode 322 while the first and second charging objects 331 and 332 contact each other. In this state, the second charging object 332 constantly contacts the grounding unit 350.

Figure 14E:
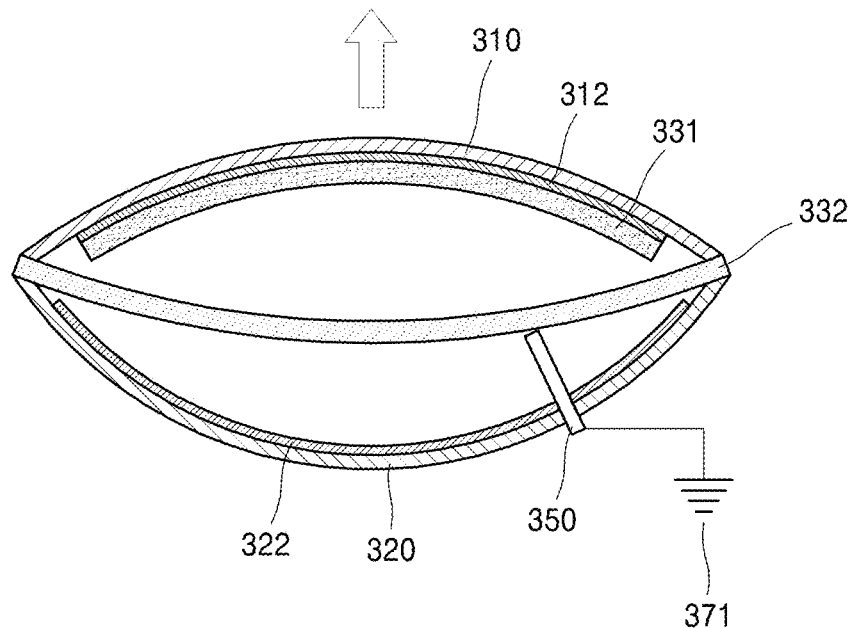

Then, referring to FIG. 14E, when the force applied to the first substrate 310 is released, the second charging object 332 is separated from the second electrode 322, and the first charging object 331 is separated from the second charging object 332. When the force applied to the first substrate 310 is continuously released, the triboelectric generator 300 returns to the initial state thereof as illustrated in FIG. 14A.

A mechanism of generating electrical energy due to the above-described operation of the triboelectric generator 300 has been described in detail above, and thus a description thereof is not provided herein. A plurality of protrusions may be provided on at least one of the contact surfaces of the first and second charging objects 331 and 332. Electrical energy may be efficiently obtained using a flexible material for the triboelectric generator 300.

Figure 15:
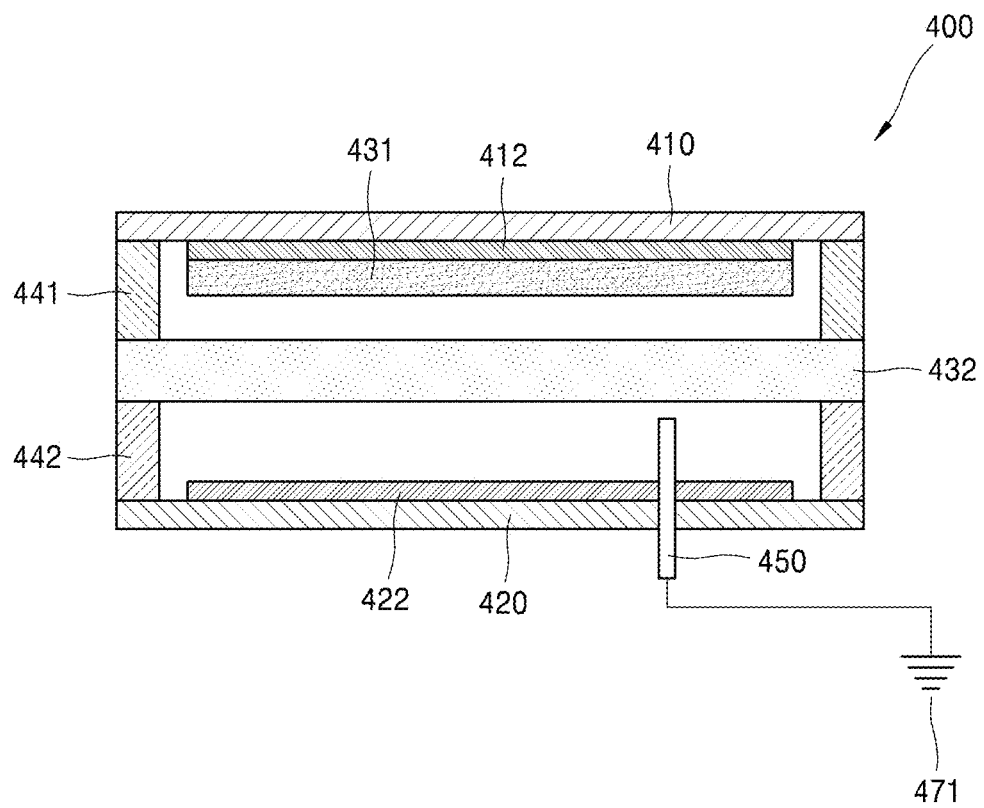
FIG. 15 is a cross-sectional view of a triboelectric generator according to some example embodiments.

FIG. 15 is a cross-sectional view of a triboelectric generator 400 according to some example embodiments.

Referring to FIG. 15, the triboelectric generator 400 includes first and second substrates 410 and 420, first and second electrodes 412 and 422, a first charging object 431 provided on a surface of the first electrode 412, a second charging object 432 provided between the first charging object 431 and the second electrode 422, and a grounding unit 450 configured to intermittently interconnect the second charging object 432 and a charge reservoir 471. First supporters 441 are provided between the first substrate 410 and the second charging object 432, and second supporters 442 are provided between the second charging object 432 and the second substrate 420.

Each of the first and second substrates 410 and 420 may include a material having flexibility to be transformed due to an external force and having stretchability to extend or contract. The first electrode 412 is provided on a bottom surface of the first substrate 410, and the second electrode 422 is provided on a top surface of the second substrate 420. The first and second electrodes 412 and 422 may have flexibility and stretchability corresponding to the first and second substrates 410 and 420. Each of the first and second electrodes 412 and 422 may include a material having an excellent electrical conductivity.

The first charging object 431 is provided on a bottom surface of the first electrode 412 facing the second electrode 422. The second charging object 432 is provided between the first charging object 431 and the second electrode 422. The first and second charging objects 431 and 432 may have flexibility and stretchability corresponding to the first and second substrates 410 and 420. Herein, the first charging object 431 is provided to contact the bottom surface of the first electrode 412. The second charging object 432 is provided to be spaced apart from the first charging object 431 and the second electrode 422 when no external force is applied to the triboelectric generator 400. Herein, the first and second charging objects 431 and 432 may include materials to be charged with opposite polarities due to contact therebetween.

The first and second charging objects 431 and 432 may be positively and negatively charged objects, respectively. In this case, the first charging object 431 is positively charged due to contact with the second charging object 432, and may include a material having a low electrical conductivity. The second charging object 432 is negatively charged due to contact with the first charging object 431, and may include a conductive material having a high electrical conductivity. Alternatively, the first and second charging objects 431 and 432 may be negatively and positively charged objects, respectively. In this case, the first charging object 431 is negatively charged due to contact with the second charging object 432, and may include a material having a low electrical conductivity. The second charging object 432 is positively charged due to contact with the first charging object 431, and may include a conductive material having a high electrical conductivity. As described above, at least one of the first and second charging objects 431 and 432 may be doped with a p-type dopant or an n-type dopant to control surface charge characteristics thereof.

The grounding unit 450 is provided to intermittently interconnect the second charging object 432 and the charge reservoir 471. Herein, the charge reservoir 471 may be, for example, the ground or a conductive member. As such, the grounding unit 450 may intermittently interconnect the second charging object 432 and the charge reservoir 471 due to motion of the second charging object 432. Specifically, when the second charging object 432 moves toward the second electrode 422 and contacts the grounding unit 450, the second charging object 432 may be electrically connected to the charge reservoir 471. Otherwise, when the second charging object 432 moves away from the second electrode 422 and is separated from the grounding unit 450, the second charging object 432 may be insulated from the charge reservoir 471. Examples of the grounding unit 450 configured to (or capable of) implementing the above-described function have been described above, and thus a detailed description of the grounding unit 450 is not provided herein.

The first supporters 441 may be provided at two edges between the first substrate 410 and the second charging object 432. The second supporters 442 may be provided at two edges between the second charging object 432 and the second substrate 420. Each of the first and second supporters 441 and 442 may include a hard material not to be easily transformed due to an external force.

FIGS. 16A to 16D are cross-sectional views showing operation of the triboelectric generator 400 illustrated in FIG. 15.

Figure 16A:
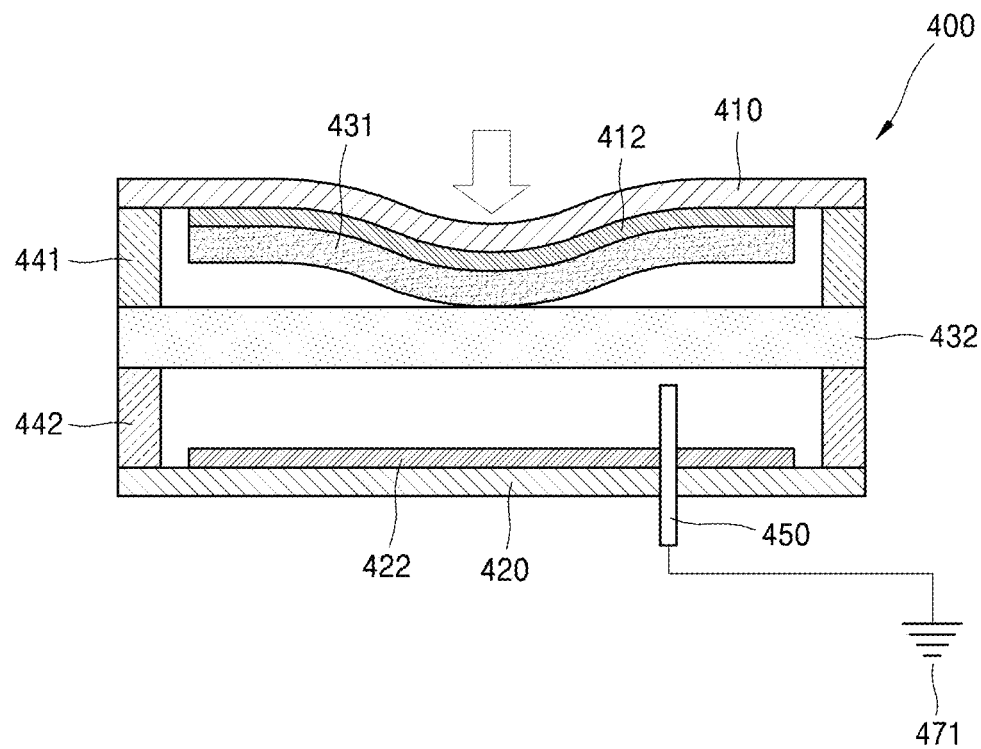
FIGS. 16A to 16D are cross-sectional views showing operation of the triboelectric generator illustrated in FIG. 15.
Figure 16B:
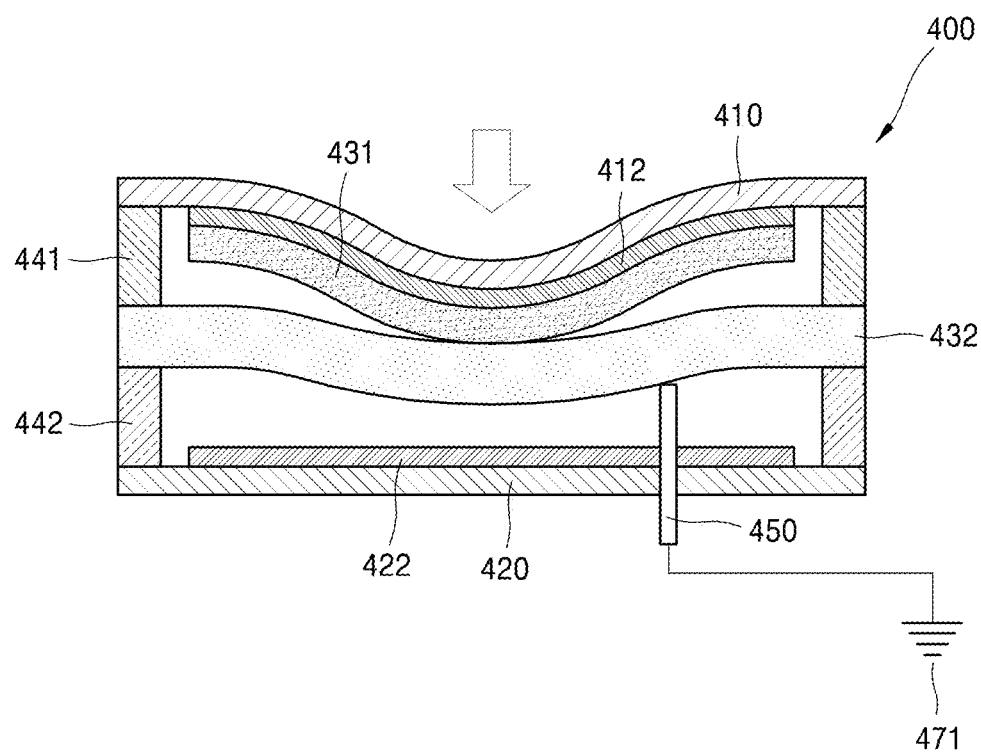

As illustrated in FIG. 16A, when a pressing force is applied to the first substrate 410, at least a part of the first substrate 410, which is an upper substrate, extends and is transformed toward the second charging object 432. In this process, the first charging object 431 may contact the second charging object 432. Referring to FIG. 16B, when the first substrate 410 is continuously pressed, the second charging object 432 extends, is transformed, and moves toward the second electrode 422 while the first and second charging objects 431 and 432 contact each other. In this process, the second charging object 432 may contact the grounding unit 450.

Figure 16C:
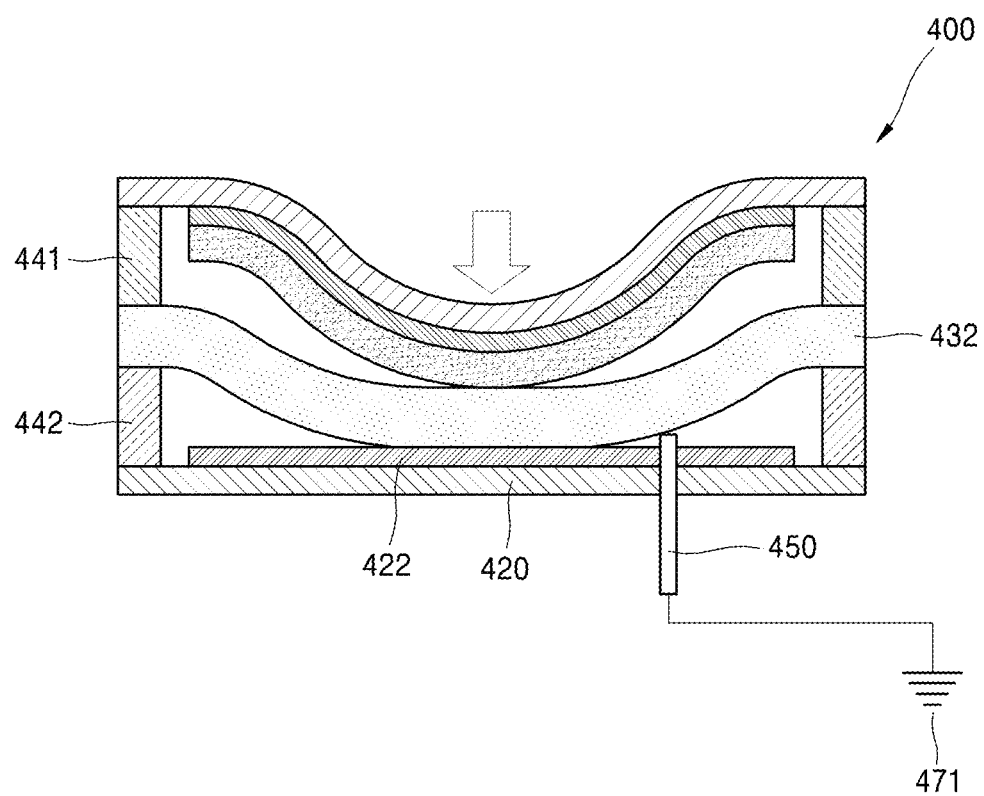
Figure 16D:
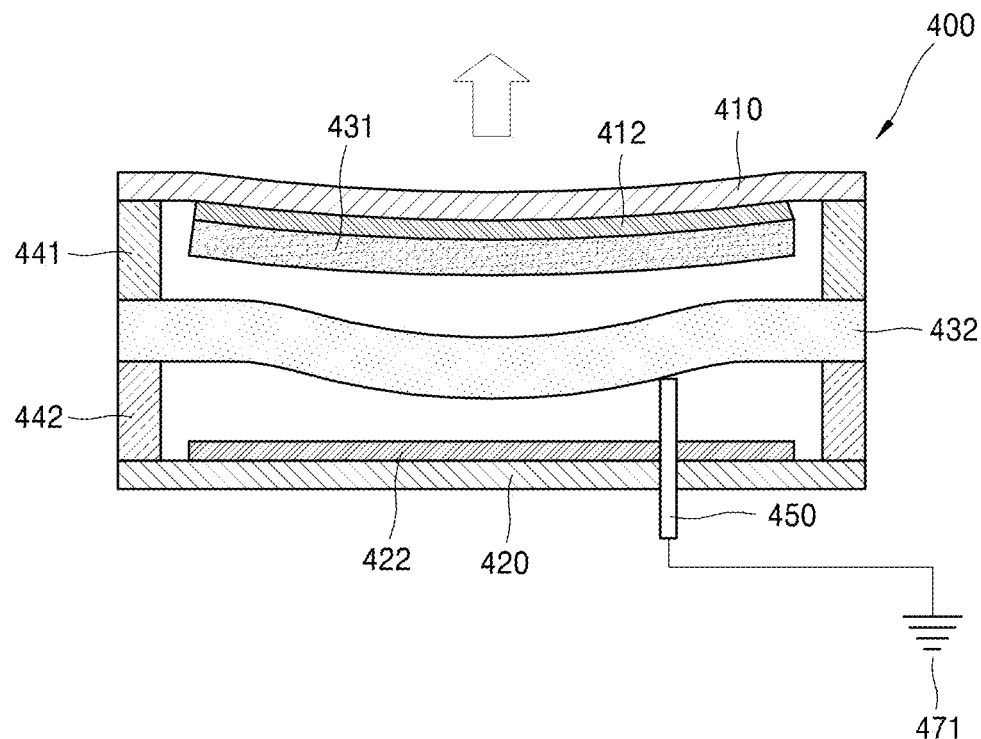

Referring to FIG. 16C, when the first substrate 410 is further pressed, the second charging object 432 further extends, is transformed, and contacts the second electrode 422 while the first and second charging objects 431 and 432 contact each other. In this state, the second charging object 432 constantly contacts the grounding unit 450. Then, as illustrated in FIG. 16D, when the force applied to the first substrate 410 is released, the second charging object 432 is separated from the second electrode 422, and the first charging object 431 is separated from the second charging object 432. When the force applied to the first substrate 410 is continuously released, the triboelectric generator 400 returns to an initial state thereof in which no external force is applied thereto.

A mechanism of generating electrical energy due to the above-described operation of the triboelectric generator 400 has been described in detail above, and thus a description thereof is not provided herein. As described above, a plurality of protrusions may be provided on at least one of the contact surfaces of the first and second charging objects 431 and 432. Electrical energy may be efficiently obtained using a flexible and stretchable material for the triboelectric generator 400.

Figure 17:
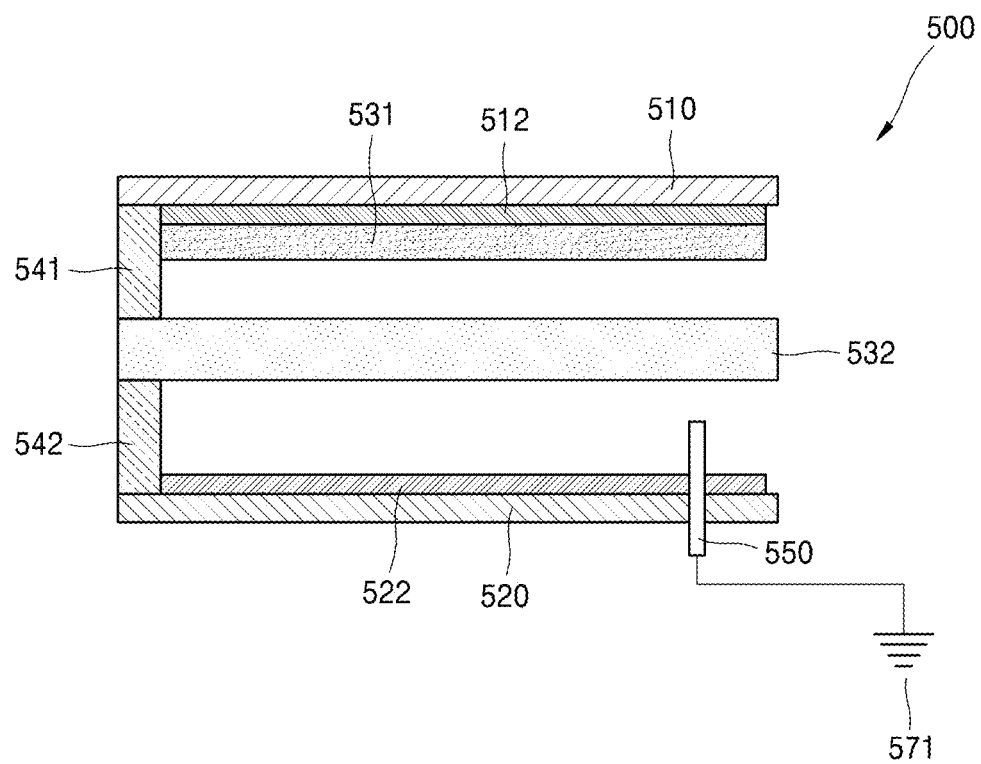
FIG. 17 is a cross-sectional view of a triboelectric generator according to some example embodiments.

FIG. 17 is a cross-sectional view of a triboelectric generator 500 according to some example embodiments.

Referring to FIG. 17, the triboelectric generator 500 includes first and second substrates 510 and 520, first and second electrodes 512 and 522, a first charging object 531 provided on a surface of the first electrode 512, a second charging object 532 provided between the first charging object 531 and the second electrode 522, and a grounding unit 550 configured to intermittently interconnect the second charging object 532 and a charge reservoir 571. A first supporter 541 is provided between the first substrate 510 and the second charging object 532, and a second supporter 542 is provided between the second charging object 532 and the second substrate 520.

Each of the first and second substrates 510 and 520 may include a material having flexibility to be transformed due to an external force and having stretchability to extend or contract. The first electrode 512 is provided on a bottom surface of the first substrate 510, and the second electrode 522 is provided on a top surface of the second substrate 520. The first and second electrodes 512 and 522 may have flexibility and stretchability corresponding to the first and second substrates 510 and 520. Each of the first and second electrodes 512 and 522 may include a material having an excellent electrical conductivity.

The first charging object 531 is provided on a bottom surface of the first electrode 512 facing the second electrode 522. The second charging object 532 is provided between the first charging object 531 and the second electrode 522. The first and second charging objects 531 and 532 may have flexibility and stretchability corresponding to the first and second substrates 510 and 520. Herein, the first charging object 531 is provided to contact the bottom surface of the first electrode 512. The second charging object 532 is provided to be spaced apart from the first charging object 531 and the second electrode 522 when no external force is applied to the triboelectric generator 500. Herein, the first and second charging objects 531 and 532 may include materials to be charged with opposite polarities due to contact therebetween.

The first and second charging objects 531 and 532 may be positively and negatively charged objects, respectively. In this case, the first charging object 531 is positively charged due to contact with the second charging object 532, and may include a material having a low electrical conductivity. The second charging object 532 is negatively charged due to contact with the first charging object 531, and may include a conductive material having a high electrical conductivity. Alternatively, the first and second charging objects 531 and 532 may be negatively and positively charged objects, respectively. In this case, the first charging object 531 is negatively charged due to contact with the second charging object 532, and may include a material having a low electrical conductivity. The second charging object 532 is positively charged due to contact with the first charging object 531, and may include a conductive material having a high electrical conductivity. As described above, at least one of the first and second charging objects 531 and 532 may be doped with a p-type dopant or an n-type dopant to control surface charge characteristics thereof.

The grounding unit 550 is provided to intermittently interconnect the second charging object 532 and the charge reservoir 571. Herein, the charge reservoir 571 may be, for example, the ground or a conductive member. As such, the grounding unit 550 may intermittently interconnect the second charging object 532 and the charge reservoir 571 due to motion of the second charging object 532. Specifically, when the second charging object 532 moves toward the second electrode 522 and contacts the grounding unit 550, the second charging object 532 may be electrically connected to the charge reservoir 571. Otherwise, when the second charging object 532 moves away from the second electrode 522 and is separated from the grounding unit 550, the second charging object 532 may be insulated from the charge reservoir 571. Examples of the grounding unit 550 configured to (or capable of) implementing the above-described function have been described above, and thus a detailed description of the grounding unit 550 is not provided herein.

The first supporter 541 may be provided at an edge between the first substrate 510 and the second charging object 532, and the second supporter 542 may be provided at an edge between the second charging object 532 and the second substrate 520. Herein, the first supporter 541 may be located above the second supporter 542. Each of the first and second supporters 541 and 542 may include a hard material not to be easily transformed due to an external force.

FIGS. 18A to 18D are cross-sectional views showing operation of the triboelectric generator 500 illustrated in FIG. 17.

Figure 18A:
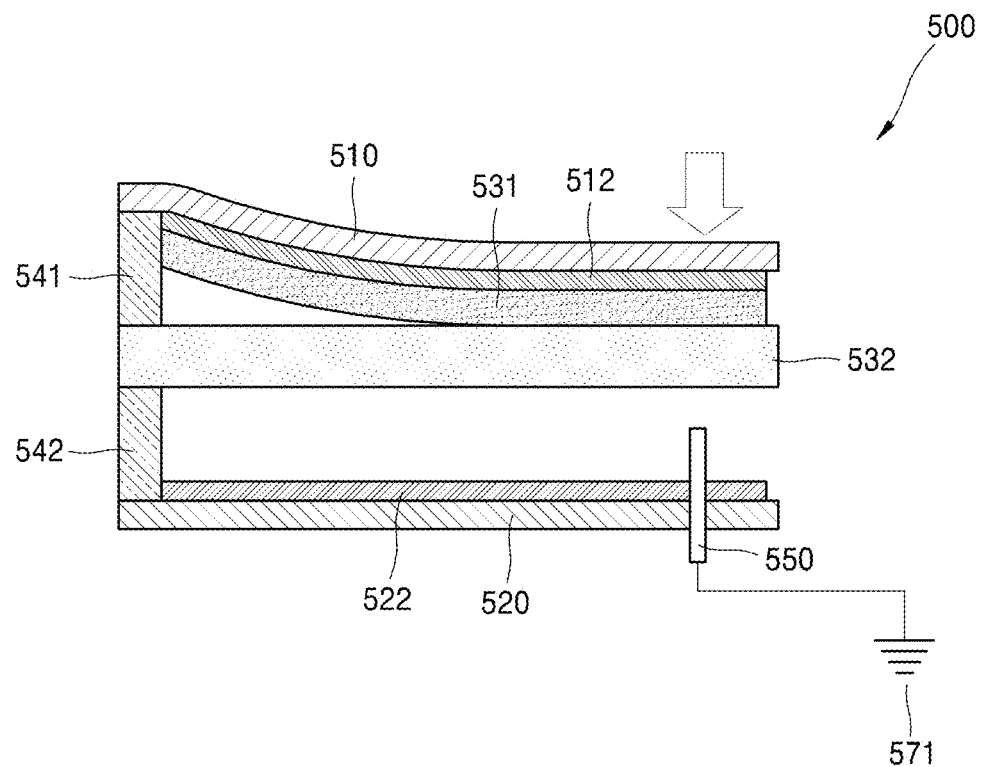
FIGS. 18A to 18D are cross-sectional views showing operation of the triboelectric generator illustrated in FIG. 17.
Figure 18B:
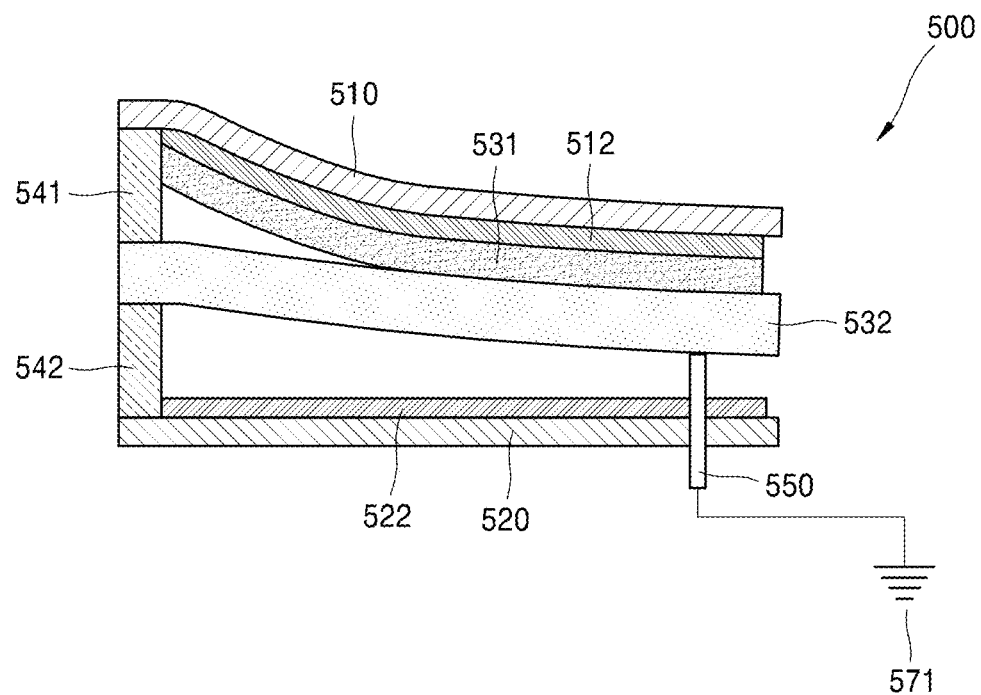

As illustrated in FIG. 18A, when a pressing force is applied to an end of the first substrate 510 not supported by the first and second supporters 541 and 542, the first substrate 510 extends, is transformed, and moves toward the second charging object 532. In this process, the first charging object 531 may contact the second charging object 532. Referring to FIG. 18B, when the end of the first substrate 510 is continuously pressed, an end of the second charging object 532 extends, is transformed, and moves toward the second electrode 522 while the first and second charging objects 531 and 532 contact each other. In this process, the second charging object 532 may contact the grounding unit 550.

Figure 18C:
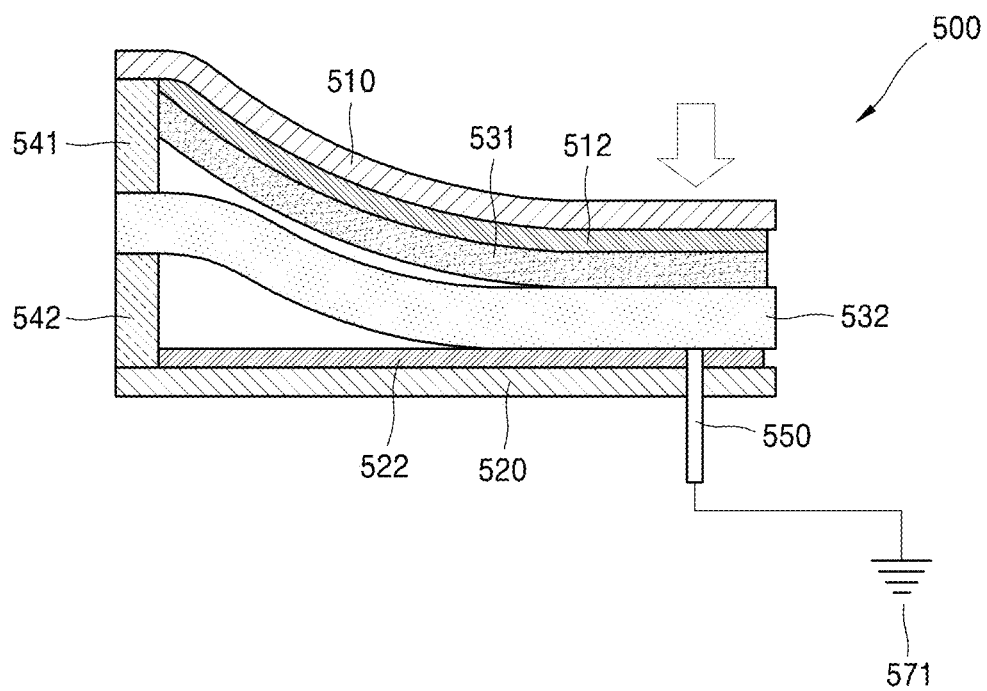
Figure 18D:
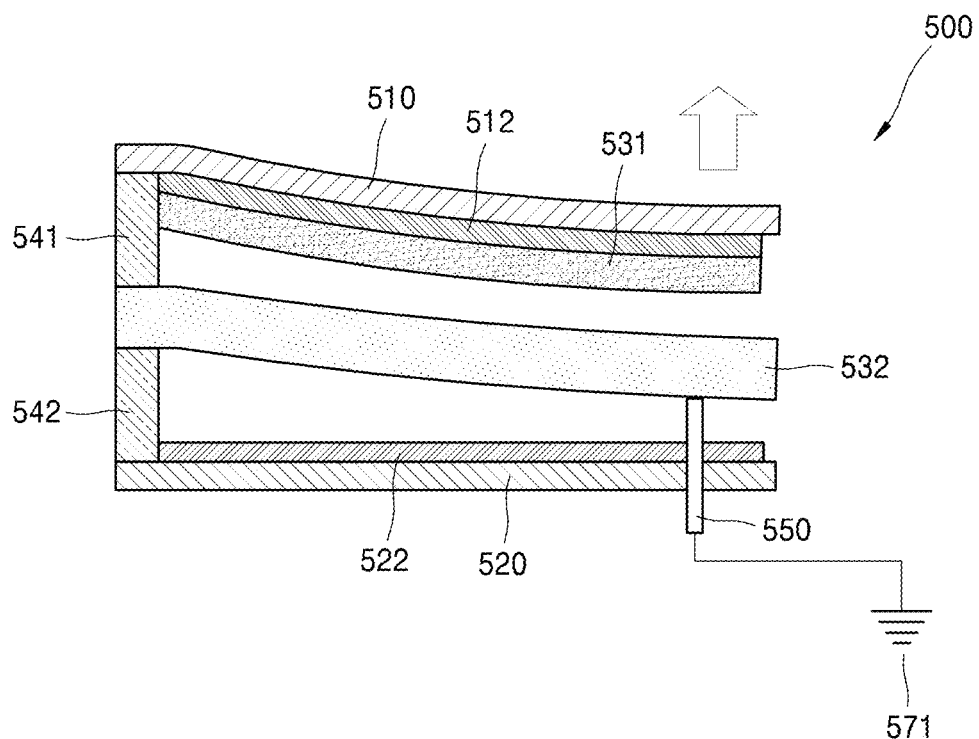

Referring to FIG. 18C, when the end of the first substrate 510 is further pressed, the second charging object 532 further extends, is transformed, and contacts the second electrode 522 while the first and second charging objects 531 and 532 contact each other. In this state, the second charging object 532 constantly contacts the grounding unit 550. Then, as illustrated in FIG. 18D, when the force applied to the first substrate 510 is released, the second charging object 532 is separated from the second electrode 522, and the first charging object 531 is separated from the second charging object 532. When the force applied to the first substrate 510 is continuously released, the triboelectric generator 500 returns to an initial state thereof in which no external force is applied thereto.

A mechanism of generating electrical energy due to the above-described operation of the triboelectric generator 500 has been described in detail above, and thus a description thereof is not provided herein. As described above, a plurality of protrusions may be provided on at least one of the contact surfaces of the first and second charging objects 531 and 532.

Figure 19:
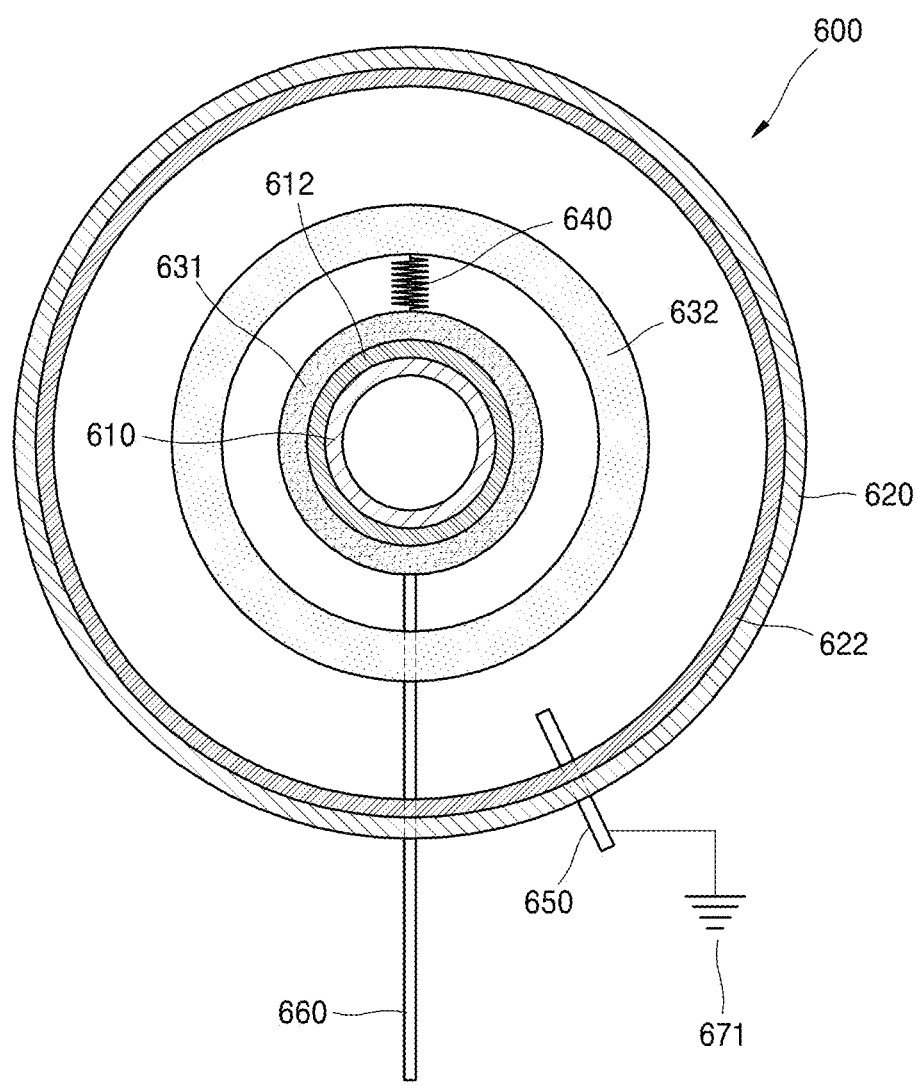
FIG. 19 is a cross-sectional view of a triboelectric generator according to some example embodiments.

FIG. 19 is a cross-sectional view of a triboelectric generator 600 according to some example embodiments.

Referring to FIG. 19, the triboelectric generator 600 includes first and second substrates 610 and 620, first and second electrodes 612 and 622, a first charging object 631 provided on a surface of the first electrode 612, a second charging object 632 provided between the first charging object 631 and the second electrode 622, and a grounding unit 650 configured to intermittently interconnect the second charging object 632 and a charge reservoir 671.

The first substrate 610 may have a spherical shape, and the second substrate 620 may have a spherical shape surrounding the first substrate 610. The first electrode 612 is provided on an outer surface of the first substrate 610, and the second electrode 622 is provided on an inner surface of the second substrate 620. Each of the first and second electrodes 612 and 622 may include a material having an excellent electrical conductivity.

The first charging object 631 is provided on an outer surface of the first electrode 612, and the second charging object 632 is provided between the first charging object 631 and the second electrode 622. Herein, the first charging object 631 is provided to contact the outer surface of the first electrode 612, and the second charging object 632 is provided to be spaced apart from the first charging object 631 and the second electrode 622 when no external force is applied to the triboelectric generator 600. The first and second charging objects 631 and 632 may include materials to be charged with opposite polarities due to contact therebetween.

The first and second charging objects 631 and 632 may be positively and negatively charged objects, respectively. In this case, the first charging object 631 is positively charged due to contact with the second charging object 632, and may include a material having a low electrical conductivity. The second charging object 632 is negatively charged due to contact with the first charging object 631, and may include a conductive material having a high electrical conductivity. Alternatively, the first and second charging objects 631 and 632 may be negatively and positively charged objects, respectively. In this case, the first charging object 631 is negatively charged due to contact with the second charging object 632, and may include a material having a low electrical conductivity. The second charging object 632 is positively charged due to contact with the first charging object 631, and may include a conductive material having a high electrical conductivity. As described above, at least one of the first and second charging objects 631 and 632 may be doped with a p-type dopant or an n-type dopant to control surface charge characteristics thereof.

An elastic supporter 640 is provided between the first and second charging objects 631 and 632. The elastic supporter 640 may be, for example, a spring provided between the first and second charging objects 631 and 632, but is not limited thereto. FIG. 19 illustrates an example in which the elastic supporter 640 is provided on the first charging object 631. A string 660 is connected to the first charging object 631 and is provided to penetrate through the second charging object 632, the second electrode 622, and the second substrate 620 and to be exposed outside. FIG. 19 illustrates an example in which the string 660 is provided under the first charging object 631.

The grounding unit 650 is provided to intermittently interconnect the second charging object 632 and the charge reservoir 671. Herein, the charge reservoir 671 may be, for example, the ground or a conductive member. As such, the grounding unit 650 may intermittently interconnect the second charging object 632 and the charge reservoir 671 due to motion of the second charging object 632. Specifically, when the second charging object 632 moves toward the second electrode 622 and contacts the grounding unit 650, the second charging object 632 may be electrically connected to the charge reservoir 671. Otherwise, when the second charging object 632 moves away from the second electrode 622 and is separated from the grounding unit 650, the second charging object 632 may be insulated from the charge reservoir 671. Examples of the grounding unit 650 configured to (or capable of) implementing the above-described function have been described above, and thus a detailed description of the grounding unit 650 is not provided herein.

FIGS. 20A to 20D are cross-sectional views showing operation of the triboelectric generator 600 illustrated in FIG. 19.

Figure 20A:
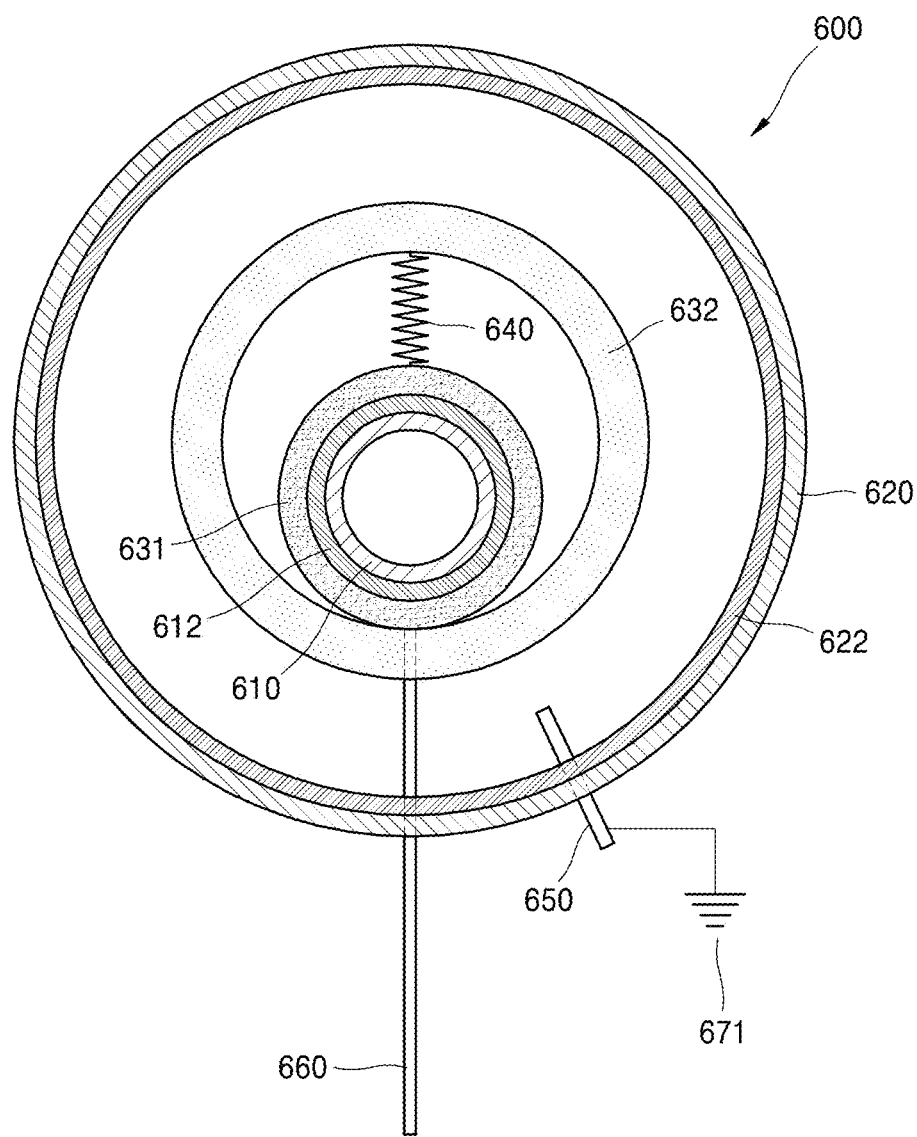
FIGS. 20A to 20D are cross-sectional views showing operation of the triboelectric generator illustrated in FIG. 19.
Figure 20B:
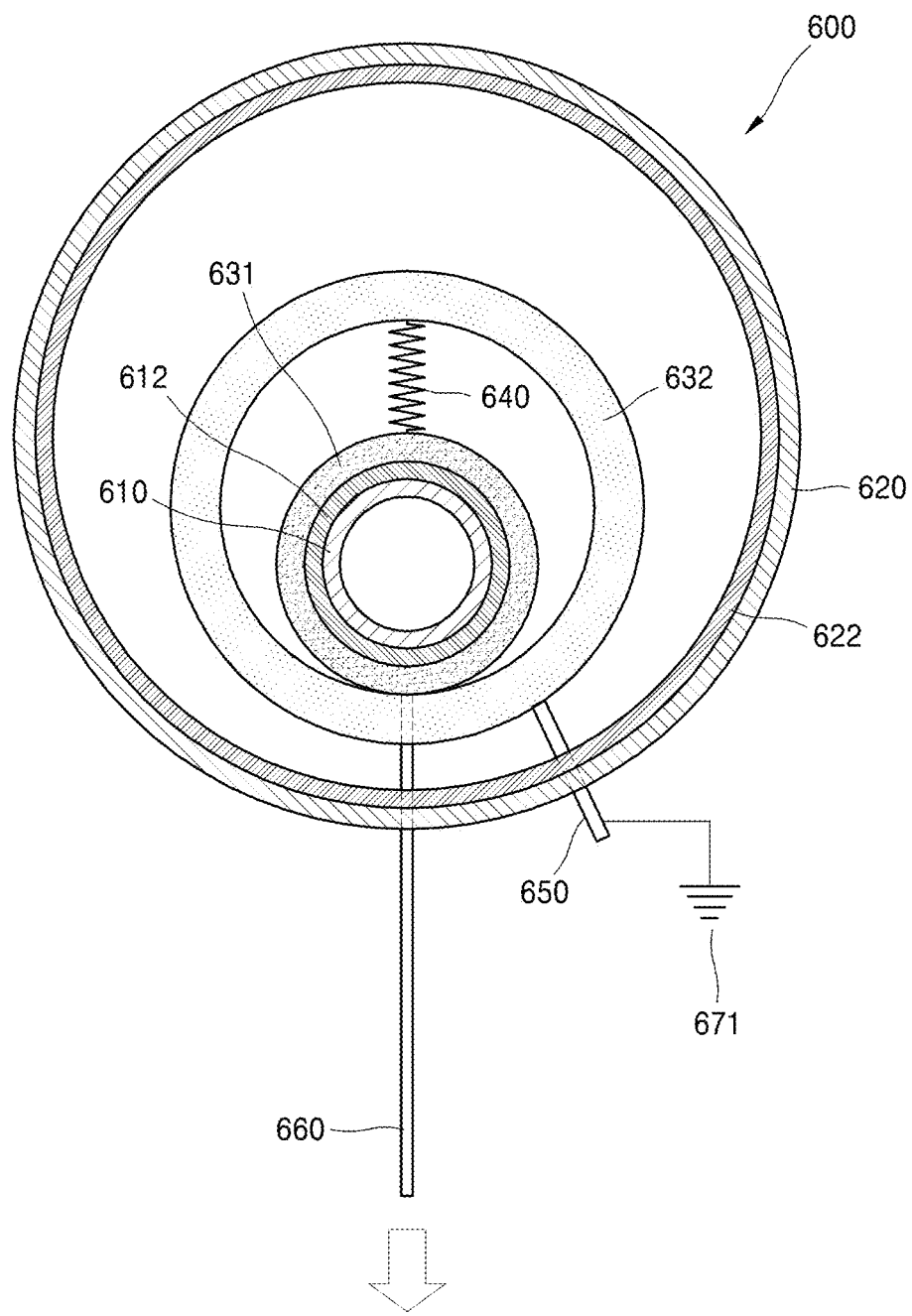

As illustrated in FIG. 20A, when the string 660 is pulled downward, the first substrate 610, the first electrode 612, and the first charging object 631 move downward. In this process, the first charging object 631 may contact the second charging object 632. Referring to FIG. 20B, when the string 660 is continuously pulled, the second charging object 632 moves toward the second electrode 622 while the first and second charging objects 631 and 632 contact each other. In this process, the second charging object 632 may contact the grounding unit 650.

Figure 20C:
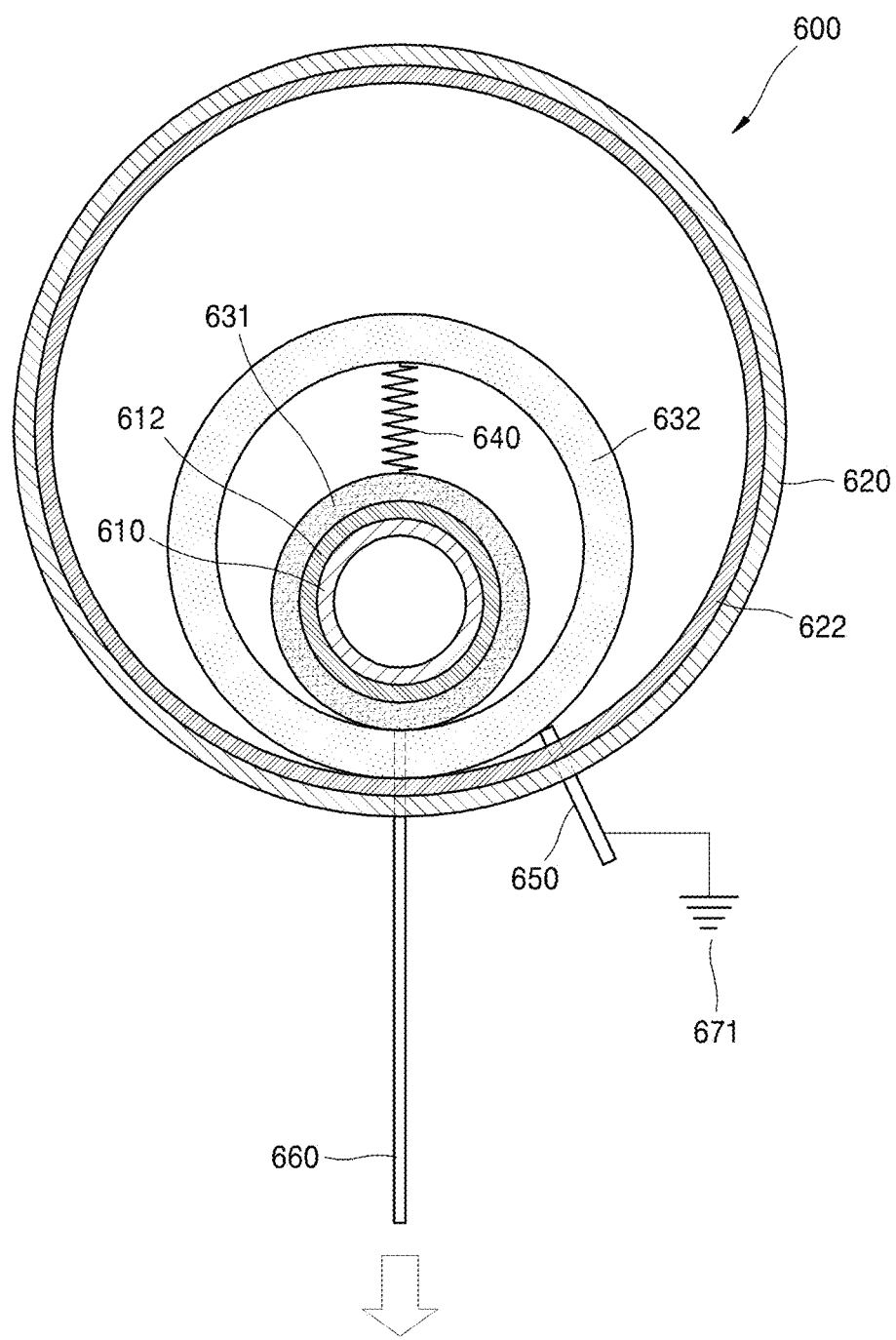
Figure 20D:
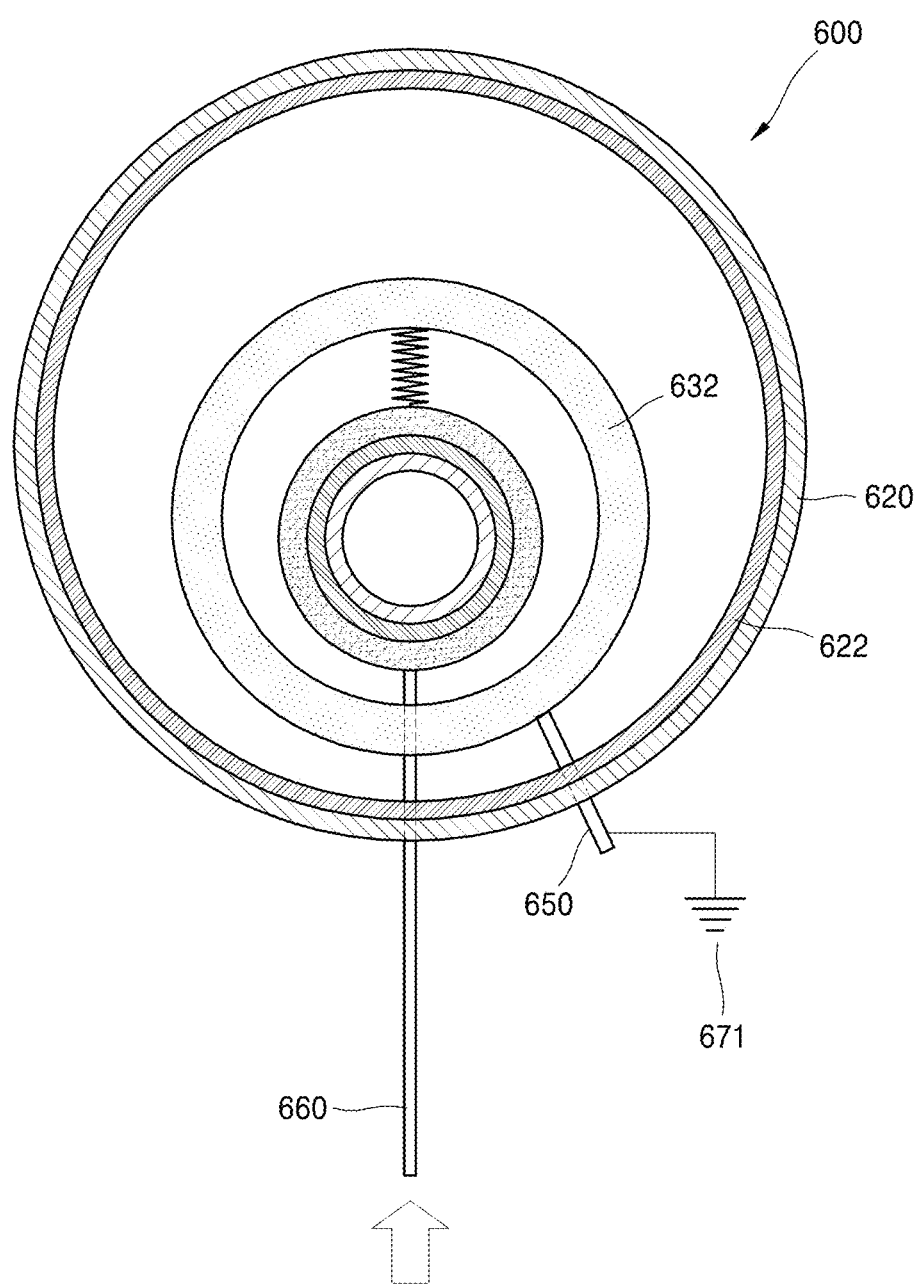

Referring to FIG. 20C, when the string 660 is further pulled, the second charging object 632 moves downward and contacts the second electrode 622 while the first and second charging objects 631 and 632 contact each other. In this state, the second charging object 632 constantly contacts the grounding unit 650. Then, as illustrated in FIG. 20D, when the force applied to the string 660 is released, the second charging object 632 is separated from the second electrode 622, and the first charging object 631 is separated from the second charging object 632. When the force applied to the string 660 is continuously released, the triboelectric generator 600 returns to an initial state thereof in which no external force is applied thereto.

A mechanism of generating electrical energy due to the above-described operation of the triboelectric generator 600 has been described in detail above, and thus a description thereof is not provided herein. As described above, a plurality of protrusions may be provided on at least one of the contact surfaces of the first and second charging objects 631 and 632.

Figure 21:
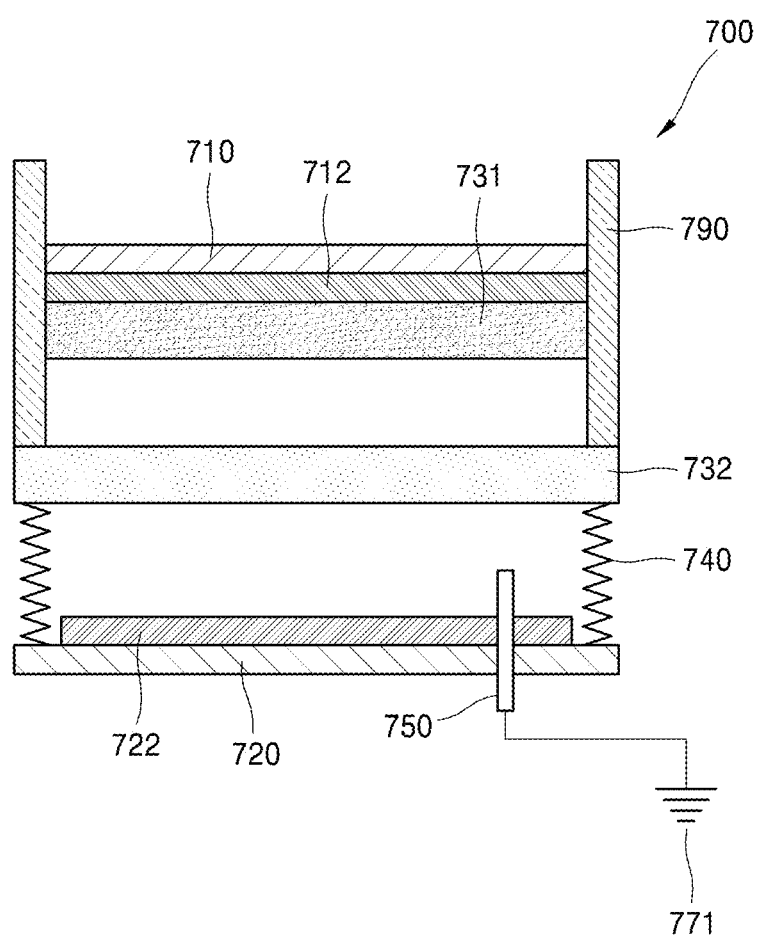
FIG. 21 is a cross-sectional view of a triboelectric generator according to some example embodiments.

FIG. 21 is a cross-sectional view of a triboelectric generator 700 according to some example embodiments.

Referring to FIG. 21, the triboelectric generator 700 includes first and second substrates 710 and 720, first and second electrodes 712 and 722, a first charging object 731 provided on a surface of the first electrode 712, a second charging object 732 provided between the first charging object 731 and the second electrode 722, and a grounding unit 750 configured to intermittently interconnect the second charging object 732 and a charge reservoir 771. Each of the first and second substrates 710 and 720 may have a flat structure and include a hard material or a flexible material. The first electrode 712 is provided on a bottom surface of the first substrate 710, and the second electrode 722 is provided on a top surface of the second substrate 720. Each of the first and second electrodes 712 and 722 may include a material having an excellent electrical conductivity.

The first charging object 731 is provided on a bottom surface of the first electrode 712, and the second charging object 732 is provided between the first charging object 731 and the second electrode 722. Herein, the first charging object 731 is provided to contact the bottom surface of the first electrode 712. The second charging object 732 is provided to be spaced apart from the first charging object 731 and the second electrode 722 when no external force is applied to the triboelectric generator 700. Herein, the first and second charging objects 731 and 732 may include materials to be charged with opposite polarities due to contact therebetween.

The first and second charging objects 731 and 732 may be positively and negatively charged objects, respectively. In this case, the first charging object 731 is positively charged due to contact with the second charging object 732, and may include a material having a low electrical conductivity. The second charging object 732 is negatively charged due to contact with the first charging object 731, and may include a conductive material having a high electrical conductivity. Alternatively, the first and second charging objects 731 and 732 may be negatively and positively charged objects, respectively. In this case, the first charging object 731 is negatively charged due to contact with the second charging object 732, and may include a material having a low electrical conductivity. The second charging object 732 is positively charged due to contact with the first charging object 731, and may include a conductive material having a high electrical conductivity. As described above, at least one of the first and second charging objects 731 and 732 may be doped with a p-type dopant or an n-type dopant to control surface charge characteristics thereof.

The grounding unit 750 is provided to intermittently interconnect the second charging object 732 and the charge reservoir 771. Herein, the charge reservoir 771 may be, for example, the ground or a conductive member. As such, the grounding unit 750 may intermittently interconnect the second charging object 732 and the charge reservoir 771 due to motion of the second charging object 732. Specifically, when the second charging object 732 moves toward the second electrode 722 and contacts the grounding unit 750, the second charging object 732 may be electrically connected to the charge reservoir 771. Otherwise, when the second charging object 732 moves away from the second electrode 722 and is separated from the grounding unit 750, the second charging object 732 may be insulated from the charge reservoir 771. Examples of the grounding unit 750 configured to (or capable of) implementing the above-described function have been described above, and thus a detailed description of the grounding unit 750 is not provided herein.

Guide members 790 configured to guide vertical motion of the first substrate 710, the first electrode 712, and the first charging object 731 may be provided on a top surface of the second charging object 732. The guide members 790 may be provided at two edges on the second charging object 732. Elastic supporters 740 may be provided between the second charging object 732 and the second substrate 720. The elastic supporters 740 may be provided at two edges between the second charging object 732 and the second substrate 720.

FIGS. 22A to 22D are cross-sectional views showing operation of the triboelectric generator 700 illustrated in FIG. 21.

Figure 22A:
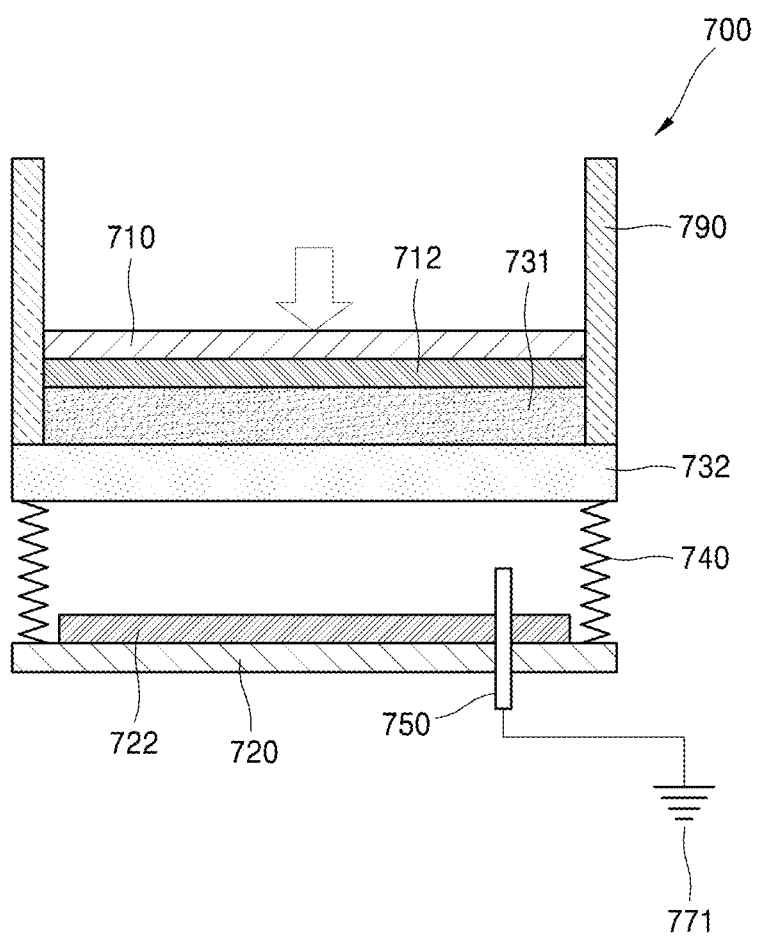
FIGS. 22A to 22D are cross-sectional views showing operation of the triboelectric generator illustrated in FIG. 21.
Figure 22B:
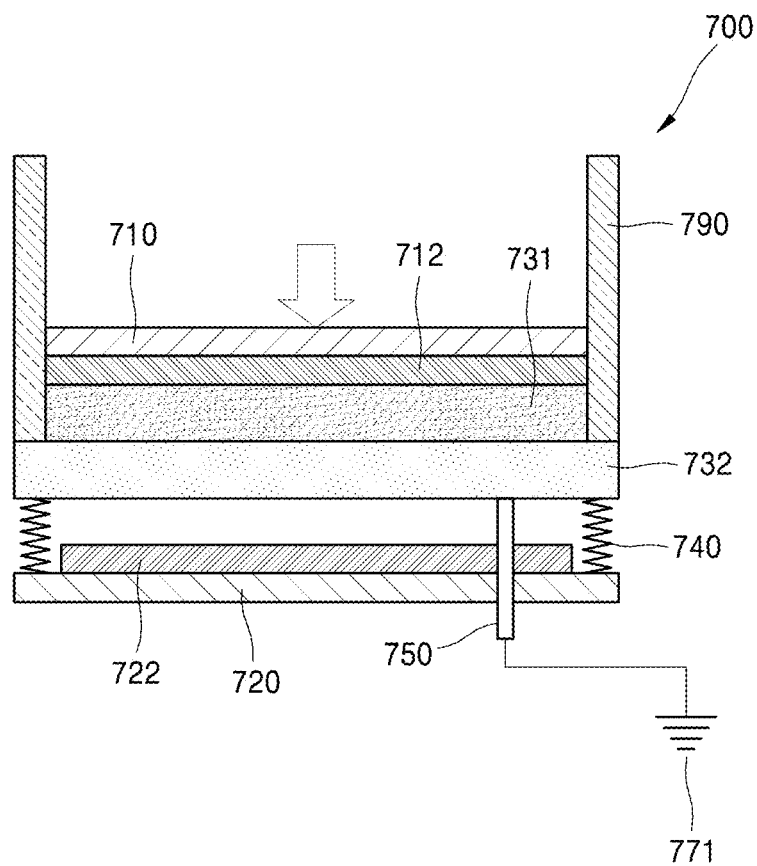

As illustrated in FIG. 22A, when a pressing force is applied to the first substrate 710, the first substrate 710 moves toward the second charging object 732. In this process, the first charging object 731 may contact the second charging object 732. Referring to FIG. 22B, when the first substrate 710 is continuously pressed, the second charging object 732 moves toward the second electrode 722 while the first and second charging objects 731 and 732 contact each other. In this process, the second charging object 732 may contact the grounding unit 750.

Figure 22C:
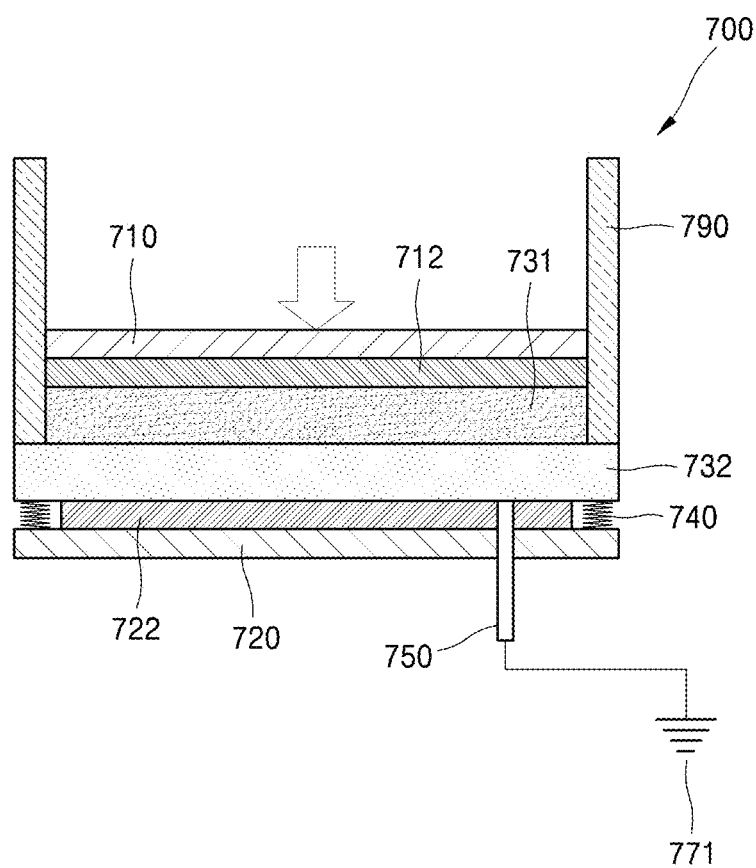
Figure 22D:
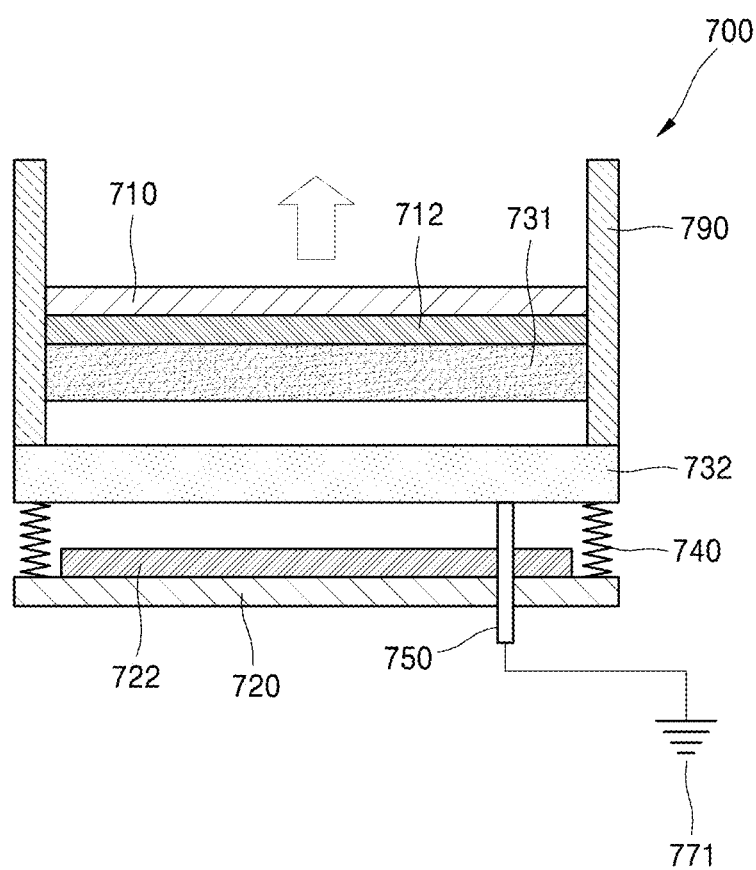

Referring to FIG. 22C, when the first substrate 710 is further pressed, the second charging object 732 contacts the second electrode 722 while the first and second charging objects 731 and 732 contact each other. In this state, the second charging object 732 constantly contacts the grounding unit 750. Then, as illustrated in FIG. 22D, when the force applied to the first substrate 710 is released, the second charging object 732 is separated from the second electrode 722, and the first charging object 731 is separated from the second charging object 732. When the force applied to the first substrate 710 is continuously released, the triboelectric generator 700 returns to an initial state thereof in which no external force is applied thereto.

A mechanism of generating electrical energy due to the above-described operation of the triboelectric generator 700 has been described in detail above, and thus a description thereof is not provided herein. A plurality of protrusions may be provided on at least one of the contact surfaces of the first and second charging objects 731 and 732.

Figure 23:
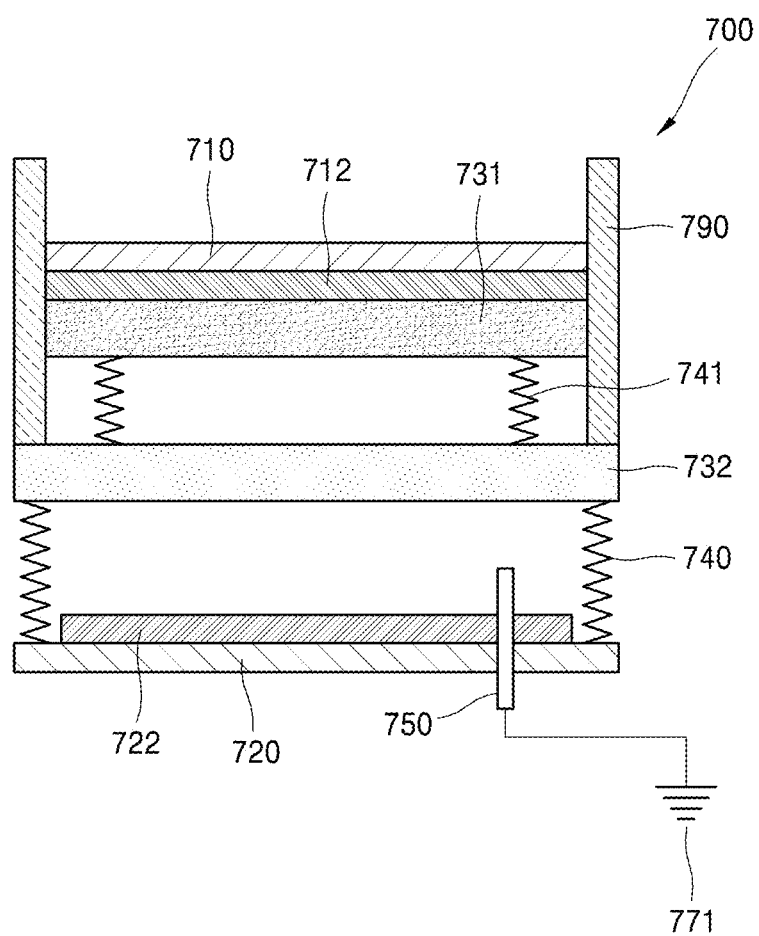
FIG. 23 is a cross-sectional view of a triboelectric generator according to some example embodiments.

FIG. 23 is a cross-sectional view of a triboelectric generator according to some example embodiments.

Referring to FIG. 23, the triboelectric generator 700' may be the same as the triboelectric generator 700 illustrated in FIG. 21, except the triboelectric generator 700' may further include one or more elastic supporters 741 provided between the first charging object 731 and the second charging object 732.

FIGS. 24A to 24D are cross-sectional views showing operation of the triboelectric generator illustrated in FIG. 23. The operation of the triboelectric generator 700' in FIGS. 24A to 24D may be the same as (or substantially the same as) the operation of the triboelectric generator 700 in FIGS. 22A to 22D.

Figure 24A:
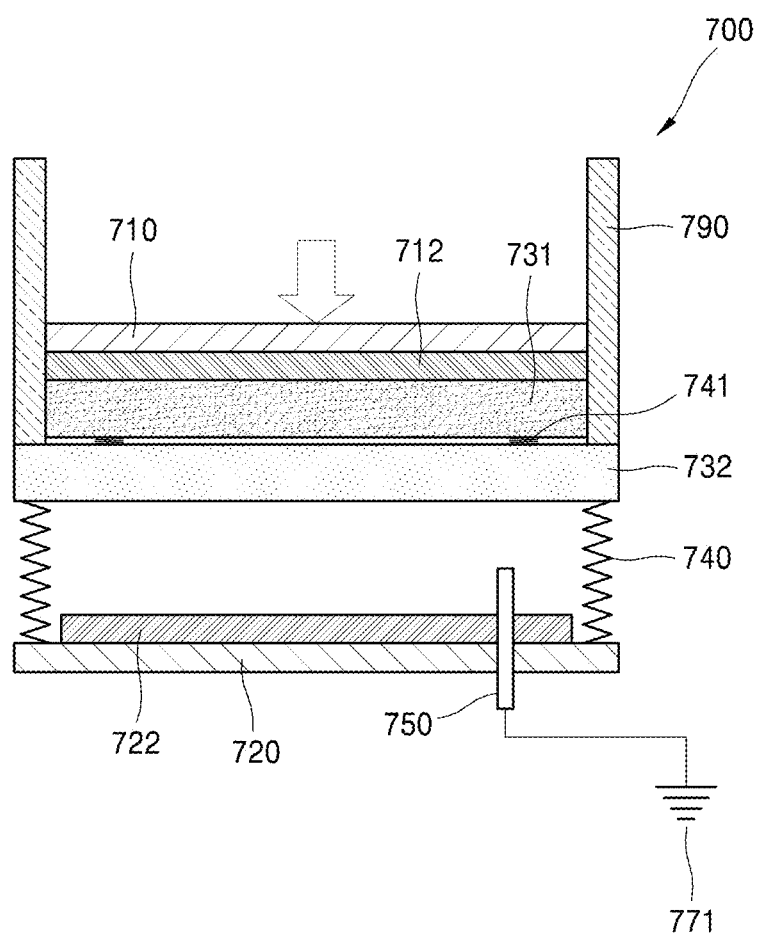
FIGS. 24A to 24D are cross-sectional views showing operation of the triboelectric generator illustrated in FIG. 23.
Figure 24B:
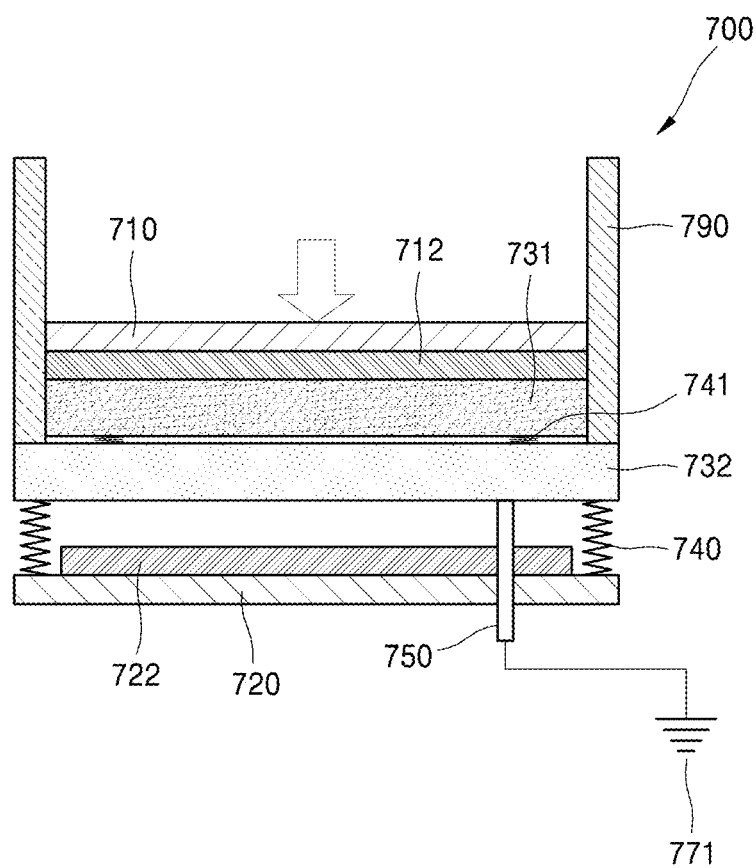

Referring to FIG. 24A, when a pressing force sufficient to compress the elastic supporters 741 is applied to the first substrate 710, the first substrate 710 moves toward the second charging object 732. In this process, the first charging object 731 may contact the second charging object 732, and the elastic supporters 741 may be compressed. Referring to FIG. 24B, when the first substrate 710 is continuously pressed, the second charging object 732 moves toward the second electrode 722 while the first and second charging objects 731 and 732 contact each other. In this process, the second charging object 732 may contact the grounding unit 750.

Figure 24C:
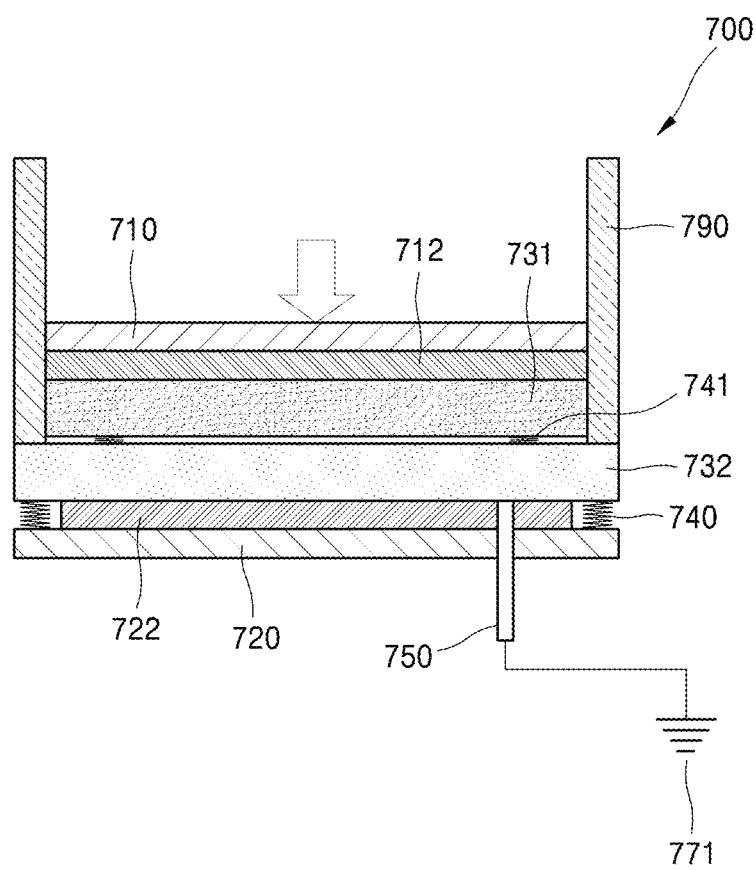
Figure 24D:
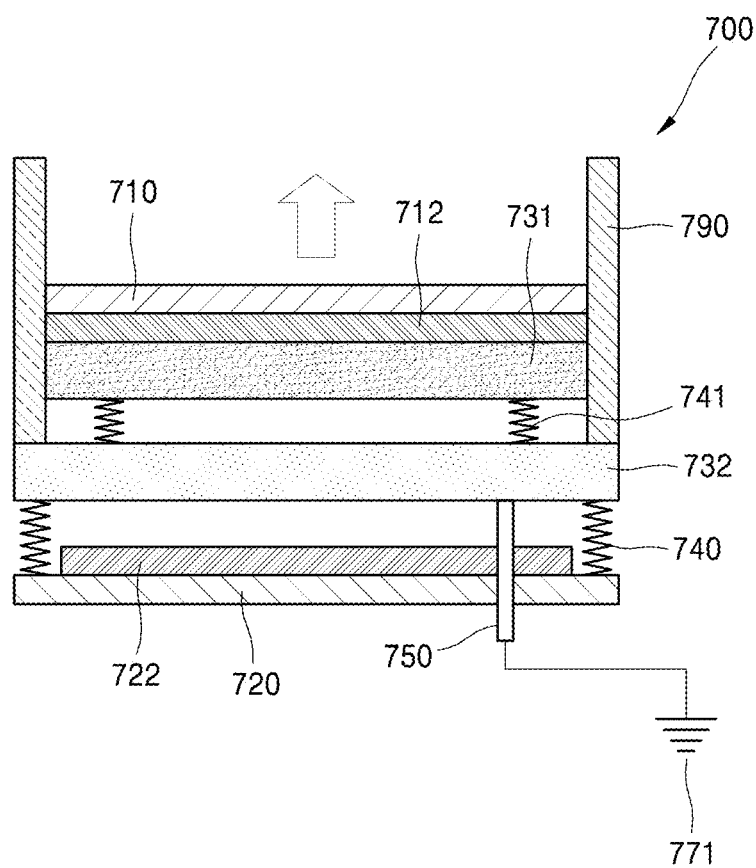

Referring to FIG. 24C, when the first substrate 710 is further pressed, the second charging object 732 contacts the second electrode 722 while the first and second charging objects 731 and 732 contact each other. In this state, the second charging object 732 constantly contacts the grounding unit 750. Then, as illustrated in FIG. 24D, when the force applied to the first substrate 710 is released, the elastic supporters 741 may return to their non-compressed state, and the triboelectric generator 700' returns to an initial state thereof in which no external force is applied thereto.

Figure 25:
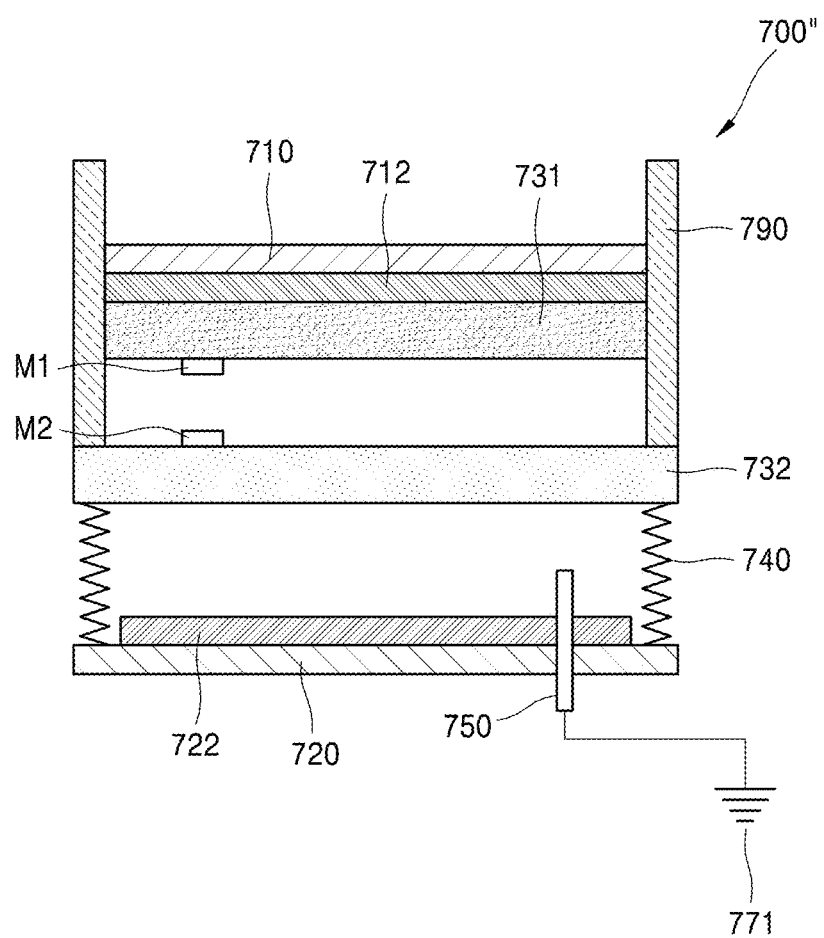
FIG. 25 is a cross-sectional view of a triboelectric generator according to some example embodiments.

FIG. 25 is a cross-sectional view of a triboelectric generator according to some example embodiments.

Referring to FIG. 25, the triboelectric generator 700" may be the same as the triboelectric generator 700 illustrated in FIG. 21, except the triboelectric generator 700" may further include one or more first magnets M1 attached to a surface of the first charging object 731 and/or one or more second magnets M2 attached to a surface of the second charging object 732. As shown in FIG. 25, the first magnet M1 may be on a surface of the first charging object 731 that faces the second charging object 732. The second magnet M2 may be on a surface of the second charging object 732 that faces the first charging object 731. The first magnet M1 and the second magnet M2 may repel each other. Thus, the repulsive force of the first magnet M1 and the second magnet M2 may keep the first charging object 731 and the second charging object 732 separated from each other unless a pressing force greater than the repulsive force of the first magnet M1 and the second magnet M2 is applied to the first substrate 110.

The operation of the triboelectric generator 700" may be the same as or similar to operation of the triboelectric generators 700 and 700' described in FIGS. 22A to 22D and 24A to 24D.

Figure 26:
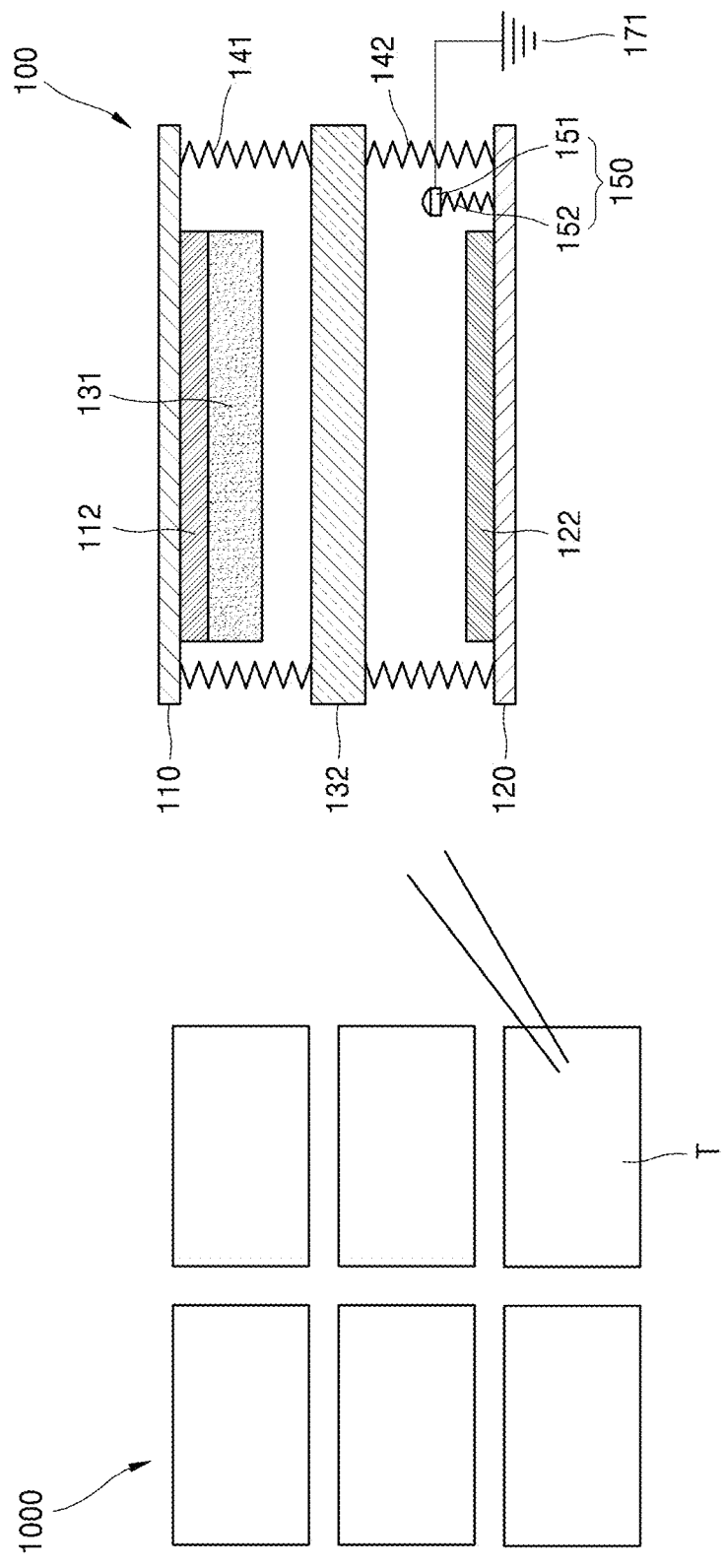
FIG. 26 is an illustration of a triboelectric system according to some example embodiments.

FIG. 26 is an illustration of a triboelectric system according to some example embodiments.

Referring to FIG. 26, a triboelectric system 1000 may include a plurality of tiles T spaced apart from each other in an array or other pattern. Each tile T may include a plurality of triboelectric generators 100 (or any type of the triboelectric generators described above) electrically connected to each other and embedded in the tiles T. Vibrations caused by environment factors (e.g., sound, persons walking on the tiles) may provide pressing forces to the triboelectric generators embedded in the tiles T for generating electricity using the embedded triboelectric generators 100.

As described above, a triboelectric generator configured to (or capable of) efficiently obtaining electrical energy may be implemented by preparing two charging objects to be charged with opposite polarities due to contact therebetween, and intermittently connecting one of the charging objects via a grounding unit to a charge reservoir, e.g., the ground.

It should be understood that example embodiments described herein should be considered in a descriptive sense only and not for purposes of limitation. Descriptions of features or aspects within each triboelectric generator according to example embodiment should typically be considered as available for other similar features or aspects in other triboelectric generators according to example embodiments.

While some example embodiments have been described with reference to the figures, it will be understood by those of ordinary skill in the art that various changes in form and details may be made therein without departing from the spirit and scope as defined by the following claims.

What is claimed is:

1. A triboelectric generator comprising:
   first and second electrodes spaced apart from each other;
   a first charging object and a second charging object,
      at least one of a contact surface of the first charging object and a contact surface of the second charging object including a plurality of protrusions,
      the first charging object being on a surface of the first electrode facing the second electrode,
      the first charging object configured to be positively charged due to contact with the second charging object,
      the second charging object being between the first charging object and the second electrode, the second charging object configured to be negatively charged due to contact with the first charging object; and
   a grounding unit configured to intermittently interconnect the second charging object and a charge reservoir due to motion of the second charging object, wherein
   the second charging object is configured to be spaced apart from the first charging object and the second electrode.

2. The triboelectric generator of claim 1, wherein the first charging object contacts the surface of the first electrode.

3. The triboelectric generator of claim 2, wherein,
   the first and second charging objects are configured contact each other in response to a first force being applied to at least one of the first and second electrodes,
   the second charging object and the second electrode are configured to contact each other in response to a second force being applied to the at least one of the first and second electrodes, and
   the second force is more than the first force.

4. The triboelectric generator of claim 3, wherein the second charging object is configured to electrically connect to the charge reservoir via the grounding unit in response to the second charging object moving towards the second electrode.

5. The triboelectric generator of claim 2, further comprising:
   first elastic supporters connected to a first surface of the second charging object; and
   second elastic supporters connected to a second surface of the second charging object that is opposite the first surface and faces the second electrode.

6. The triboelectric generator of claim 5, wherein each of the first elastic supporters has a modulus of elasticity that is less than a modulus of elasticity of each of the second elastic supporters.

7. The triboelectric generator of claim 2, wherein the first charging object includes at least one of polyformaldehyde, ethylcellulose, polyamide, melamine formol, wool, silk, mica, and nylon.

8. The triboelectric generator of claim 2, wherein the second charging object includes a conductive material.

9. The triboelectric generator of claim 1, wherein at least one of the first and second charging objects includes a dopant to control charge characteristics thereof.

10. The triboelectric generator of claim 1, wherein each of the first and second electrodes include at least one of graphene, carbon nanotubes (CNT), indium tin oxide (ITO), metal, and conductive polymer.

11. The triboelectric generator of claim 1, wherein the first and second electrodes are on first and second substrates, respectively.

12. The triboelectric generator of claim 11, wherein each of the first and second substrates include one of a hard material and a flexible material.

13. The triboelectric generator of claim 1, wherein the grounding unit includes a switching device configured to intermittently interconnect the second charging object and the charge reservoir.

14. The triboelectric generator of claim 1, wherein the charge reservoir includes one of a ground and a conductive member.

15. A triboelectric generator comprising:
   first and second electrodes spaced apart from each other;
   a first charging object and a second charging object,
      the first charging object being on a surface of the first electrode facing the second electrode,
      the first charging object configured to be positively charged due to contact with the second charging object,
      the second charging object being between the first charging object and the second electrode, the second charging object configured to be negatively charged due to contact with the first charging object; and
   a grounding unit configured to intermittently interconnect the second charging object and a charge reservoir due to motion of the second charging object,
   the grounding unit including a conductive member and an elastic member,
   the conductive member being between the second charging object and the second electrode,
   the conductive member being configured to intermittently contact the second charging object, and
   the elastic member being configured to elastically support the conductive member.

16. A triboelectric generator comprising:
   first and second electrodes spaced apart from each other;
   a first charging object and a second charging object,
      the first charging object being on a surface of the first electrode facing the second electrode,
      the first charging object configured to be positively charged due to contact with the second charging object,
      the second charging object being between the first charging object and the second electrode, the second charging object configured to be negatively charged due to contact with the first charging object; and
   a grounding unit configured to intermittently interconnect the second charging object and a charge reservoir due to motion of the second charging object,
   the grounding unit including a conductive member and an insulating member,
   the conductive member being configured to electrically connect the second charging object and the charge reservoir to each other, and
   the insulating member being configured to insulate the second charging object and the charge reservoir from each other.

* * * * *